US012793383B2

(12) United States Patent
Kawai et al.

(10) Patent No.: US 12,793,383 B2
(45) Date of Patent: Nov. 10, 2026

(54) IMAGE SELECTION APPARATUS, IMAGE SELECTION METHOD, AND NON-TRANSITORY COMPUTER-READABLE MEDIUM

(71) Applicant: NEC Corporation, Tokyo (JP)

(72) Inventors: Ryo Kawai, Tokyo (JP); Noboru Yoshida, Tokyo (JP); Yadong Pan, Tokyo (JP); Shoji Nishimura, Tokyo (JP); Jianquan Liu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 513 days.

(21) Appl. No.: 17/925,050

(22) PCT Filed: May 22, 2020

(86) PCT No.: PCT/JP2020/020248
§ 371 (c)(1),
(2) Date: Nov. 14, 2022

(87) PCT Pub. No.: WO2021/234935
PCT Pub. Date: Nov. 25, 2021

(65) Prior Publication Data
US 2023/0186597 A1 Jun. 15, 2023

(51) Int. Cl.
*G06V 10/74* (2022.01)
*G06F 16/532* (2019.01)
(Continued)

(52) U.S. Cl.
CPC .......... *G06V 10/761* (2022.01); *G06F 16/532* (2019.01); *G06F 16/538* (2019.01); *G06V 20/52* (2022.01)

(58) Field of Classification Search
CPC ..... G06F 16/54; G06F 16/583; G06V 10/764; G06V 40/103; G06T 1/00
See application file for complete search history.

(56) References Cited

U.S. PATENT DOCUMENTS

2003/0133159 A1* 7/2003 Grosso ............... H04N 1/00188 358/1.18
2004/0073543 A1* 4/2004 Kim .................. G06V 30/2504 707/E17.02
(Continued)

FOREIGN PATENT DOCUMENTS

JP 2003-016078 A 1/2003
JP 2003-150635 A 5/2003
(Continued)

OTHER PUBLICATIONS

International Search Report for PCT Application No. PCT/JP2020/020248, mailed on Jun. 23, 2020.
(Continued)

*Primary Examiner* — Akwasi M Sarpong
*Assistant Examiner* — Michael L Burleson
(74) *Attorney, Agent, or Firm* — Sughrue Mion, PLLC

(57) ABSTRACT

A query acquisition unit (610) acquires a plurality of pieces of query information. The query information is information generated for each of a plurality of query images, and indicates a feature of the query image. A similar image selection unit (620) selects, as a similar image by using the plurality of pieces of query information, an image whose degree of similarity to at least one of the query images satisfies a reference. A display control unit (630) displays the similar image selected by the similar image selection unit (620) on a display unit. When the similar image selection unit (620) selects a plurality of the similar images, the display control unit (630) sets a display position or a display order of each of the plurality of similar images on the display unit by using the number of the query images in which the similar image satisfies a reference.

12 Claims, 46 Drawing Sheets

(51) Int. Cl.
*G06F 16/538* (2019.01)
*G06V 20/52* (2022.01)

(56) References Cited

U.S. PATENT DOCUMENTS

| | | | | |
|---|---|---|---|---|
| 2006/0023100 | A1 | 2/2006 | Chosa | |
| 2007/0143272 | A1* | 6/2007 | Kobayashi | G06F 16/583 707/E17.02 |
| 2010/0232661 | A1* | 9/2010 | Hisanaga | G06F 16/5854 382/128 |
| 2013/0028517 | A1* | 1/2013 | Yoo | G06V 40/107 382/173 |
| 2014/0112598 | A1 | 4/2014 | Yamashita et al. | |
| 2016/0217158 | A1* | 7/2016 | Watanabe | G06F 16/5838 |
| 2016/0321300 | A1* | 11/2016 | Kamath | G06F 18/22 |
| 2017/0213388 | A1* | 7/2017 | Margolis | G06T 13/00 |
| 2019/0147292 | A1* | 5/2019 | Watanabe | G06F 16/5838 382/103 |
| 2020/0215434 | A1* | 7/2020 | Goldman | A63F 13/213 |
| 2022/0104878 | A1* | 4/2022 | Weiss | G16H 20/40 |
| 2022/0138249 | A1* | 5/2022 | Xie | G06F 16/56 707/737 |
| 2022/0156311 | A1* | 5/2022 | Akimoto | G06F 16/538 |

FOREIGN PATENT DOCUMENTS

| | | | |
|---|---|---|---|
| JP | 2006-050095 | A | 2/2006 |
| JP | 2006-221446 | A | 8/2006 |
| JP | 2006-260405 | A | 9/2006 |
| JP | 2010-250426 | A | 11/2010 |
| JP | 2012-190349 | A | 10/2012 |
| JP | 2014-522035 | A | 8/2014 |
| JP | 2017-097549 | A | 6/2017 |

OTHER PUBLICATIONS

Zhe Cao, Tomas Simon, Shih-En Wei, Yaser Sheikh, “Realtime Multi-Person 2D Pose Estimation using Part Affinity Fields”, The IEEE Conference on Computer Vision and Pattern Recognition (CVPR), 2017, p. 7291-7299.

* cited by examiner

301

IMAGE SELECTION APPARATUS, IMAGE SELECTION METHOD, AND NON-TRANSITORY COMPUTER-READABLE MEDIUM

This application is a National Stage Entry of PCT/JP2020/020248 filed on May 22, 2020, the contents of all of which are incorporated herein by reference, in their entirety.

TECHNICAL FIELD

The present invention relates to an image selection apparatus, an image selection method, and a program.

BACKGROUND ART

In recent years, in a surveillance system and the like, a technique for detecting and searching for a state such as a pose and behavior of a person from an image of a surveillance camera is used. For example, Patent Documents 1 and 2 have been known as related techniques. Patent Document 1 describes that a pose of a person is indicated by joint position coordinates, and an image of a person having a pose similar to the pose of the person captured in an input image is selected by using the joint position coordinates. Patent Document 2 discloses a technique for searching for a similar pose of a person, based on a key joint of a head, a hand, a foot, and the like of the person included in a depth video. Patent Document 3 discloses a technique for searching for a similar image by using pose information such as a tilt provided to an image, which is not related to a pose of a person. Note that, in addition, Non-Patent Document 1 has been known as a technique related to a skeleton estimation of a person.

RELATED DOCUMENT

Patent Document

Patent Document 1: Japanese Patent Application Publication No. 2017-097549

Patent Document 2: Japanese Patent Application Publication (Translation of PCT Application) No. 2014-522035

Patent Document 3: Japanese Patent Application Publication No. 2006-260405

Non-Patent Document

Non-Patent Document 1: Zha Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, P. 7291-7299

SUMMARY OF THE INVENTION

Technical Problem

The present inventor has considered that an image is searched with a plurality of images as queries. In this case, the queries are plural, and thus information related to a search result increases. One of challenges to be solved by the present invention is to efficiently notify a user of information related to a search result when an image is searched with a plurality of images as queries.

Solution to Problem

The present invention provides an image selection apparatus including:

- a query acquisition unit that acquires a plurality of pieces of query information that are information generated for each of a plurality of query images and indicate a feature of the query image;
- a similar image selection unit that selects, by using the plurality of pieces of query information, a plurality of similar images whose degree of similarity to at least one of the query images satisfies a reference; and
- a display control unit that displays the plurality of similar images on a display unit, and also sets a display position or a display order of each of the plurality of similar images on the display unit by using a number of the query images in which the similar image satisfies the reference.

The present invention provides an image selection apparatus including:

- a query acquisition unit that acquires a plurality of pieces of query information that are information generated for each of a plurality of query images and indicate a feature of the query image;
- a similar image selection unit that selects, by using the plurality of pieces of query information, a plurality of similar images whose degree of similarity to at least one of the query images satisfies a reference; and
- a display control unit that displays, on a display unit, the plurality of similar images together with information that can determine a number of the query images in which the similar image satisfies the reference or determine the query image.

The present invention provides an image selection apparatus including:

- a query acquisition unit that acquires a plurality of pieces of query information that are information generated for each of a plurality of query images and indicate a feature of the query image;
- a similar image selection unit that selects, by using the plurality of pieces of query information, a similar image whose degree of similarity to a reference number or more of the query images satisfies a reference; and
- a display control unit that displays the similar image on a display unit.

The present invention provides an image selection method including,

- executing by a computer:
- query acquisition processing of acquiring a plurality of pieces of query information that are information generated for each of a plurality of query images and indicate a feature of the query image;
- similar image selection processing of selecting, by using the plurality of pieces of query information, a plurality of similar images whose degree of similarity to at least one of the query images satisfies a reference; and
- display control processing of displaying the plurality of similar images on a display unit, and also setting a display position or a display order of each of the plurality of similar images on the display unit by using a number of the query images in which the similar image satisfies the reference.

The present invention provides an image selection method including,

- executing by a computer:
- query acquisition processing of acquiring a plurality of pieces of query information that are information generated for each of a plurality of query images and indicate a feature of the query image;

similar image selection processing of selecting, by using the plurality of pieces of query information, a plurality of similar images whose degree of similarity to at least one of the query images satisfies a reference; and display control processing of displaying, on a display unit, the plurality of similar images together with information that can determine a number of the query images in which the similar image satisfies the reference or determine the query image.

The present invention provides an image selection method including, by a computer:

query acquisition processing of acquiring a plurality of pieces of query information that are information generated for each of a plurality of query images and indicate a feature of the query image;

similar image selection processing of selecting, by using the plurality of pieces of query information, a similar image whose degree of similarity to a reference number or more of the query images satisfies a reference; and display control processing of displaying the similar image on a display unit.

The present invention provides a program causing a computer to include:

a query acquisition function of acquiring a plurality of pieces of query information that are information generated for each of a plurality of query images and indicate a feature of the query image;

a similar image selection function of selecting, by using the plurality of pieces of query information, a plurality of similar images whose degree of similarity to at least one of the query images satisfies a reference; and a display control function of displaying the plurality of similar images on a display unit, and also setting a display position or a display order of each of the plurality of similar images on the display unit by using a number of the query images in which the similar image satisfies the reference.

The present invention provides a program causing a computer to include:

a query acquisition function of acquiring a plurality of pieces of query information that are information generated for each of a plurality of query images and indicate a feature of the query image;

a similar image selection function of selecting, by using the plurality of pieces of query information, a plurality of similar images whose degree of similarity to at least one of the query images satisfies a reference; and a display control function of displaying, on a display unit, the plurality of similar images together with information that can determine a number of the query images in which the similar image satisfies the reference or determine the query image.

The present invention provides a program causing a computer to include:

a query acquisition function of acquiring a plurality of pieces of query information that are information generated for each of a plurality of query images and indicate a feature of the query image;

a similar image selection function of selecting, by using the plurality of pieces of query information, a similar image whose degree of similarity to a reference number or more of the query images satisfies a reference; and a display control function of displaying the similar image on a display unit.

Advantageous Effects of Invention

According to the present invention, information related to a search result can be efficiently notified to a user when an image is searched with a plurality of images as queries.

BRIEF DESCRIPTION OF THE DRAWINGS

The above-described object, the other objects, features, and advantages will become more apparent from suitable example embodiments described below and the following accompanying drawings.

DESCRIPTION OF EMBODIMENTS

Hereinafter, example embodiments of the present invention will be described with reference to the drawings. Note that, in all of the drawings, a similar component has a similar reference sign, and description thereof will not be appropriately repeated.

(Consideration for Example Embodiment)

In recent years, an image recognition technique using machine learning such as deep learning is applied to various systems. For example, application to a surveillance system for performing surveillance by an image of a surveillance camera has been advanced. By using machine learning for the surveillance system, a state such as a pose and behavior of a person is becoming recognizable from an image to some extent.

However, in such a related technique, a state of a person desired by a user may not be necessarily recognizable on demand. For example, there is a case where a state of a person desired to be searched for and recognized by a user can be determined in advance, or there is a case where a determination cannot be specifically made as in an unknown state. Thus, in some cases, a state of a person desired to be searched for by a user cannot be specified in detail. Further, a search or the like cannot be performed when a part of a body of a person is hidden. In the related technique, a state of a person can be searched for only from a specific search condition, and thus it is difficult to flexibly search for and classify a desired state of a person.

Thus, the inventors have considered a method using a skeleton estimation technique such as Non-Patent Document 1 and the like in order to recognize a state of a person desired by a user from an image on demand. Similarly to Open Pose disclosed in Non-Patent Document 1, and the like, in the related skeleton estimation technique, a skeleton of a person is estimated by learning image data in which correct answers in various patterns are set. In the following example embodiments, a state of a person can be flexibly recognized by using such a skeleton estimation technique.

Note that, a skeleton structure estimated by the skeleton estimation technique such as Open Pose is formed of a "keypoint" being a characteristic point such as a joint and a "bone (bone link)" indicating a link between keypoints. Thus, in the following example embodiments, the words "keypoint" and "bone" will be used to describe a skeleton structure, and "keypoint" is associated with a "joint" of a person and "bone" is associated with a "bone" of a person unless otherwise specified. Then, a position of the "keypoint" is one example of joint information.

(Overview of Example Embodiment)

Figure 1:
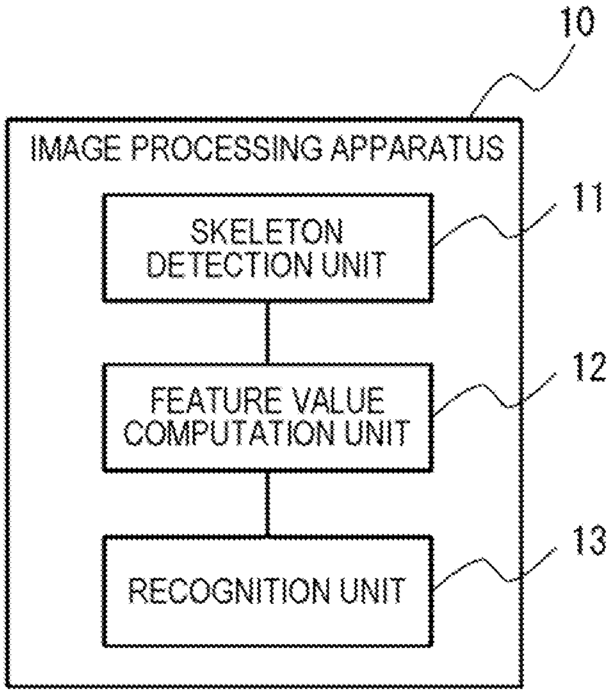
FIG. 1 is a configuration diagram illustrating an outline of an image processing apparatus according to an example embodiment.

FIG. 1 illustrates an outline of an image processing apparatus 10 according to an example embodiment. As illustrated in FIG. 1, the image processing apparatus 10 includes a skeleton detection unit 11, a feature value computation unit 12, and a recognition unit 13. The skeleton detection unit 11 detects two-dimensional skeleton structures of a plurality of persons, based on a two-dimensional image acquired from a camera and the like. The feature value computation unit 12 computes feature values of the plurality of two-dimensional skeleton structures detected by the skeleton detection unit 11. The recognition unit 13 performs recognition processing of a state of the plurality of persons, based on a degree of similarity between the plurality of feature values computed by the feature value computation unit 12. The recognition processing is classification processing, search processing (selection processing), and the like of a state of a person. Thus, the image processing apparatus 10 also functions as an image selection apparatus.

In this way, in the example embodiment, a two-dimensional skeleton structure of a person is detected from a two-dimensional image, and the recognition processing such as classification and search of a state of a person is performed based on a feature value computed from the two-dimensional skeleton structure, and thus a desired state of a person can be flexibly recognized.

Figure 2:
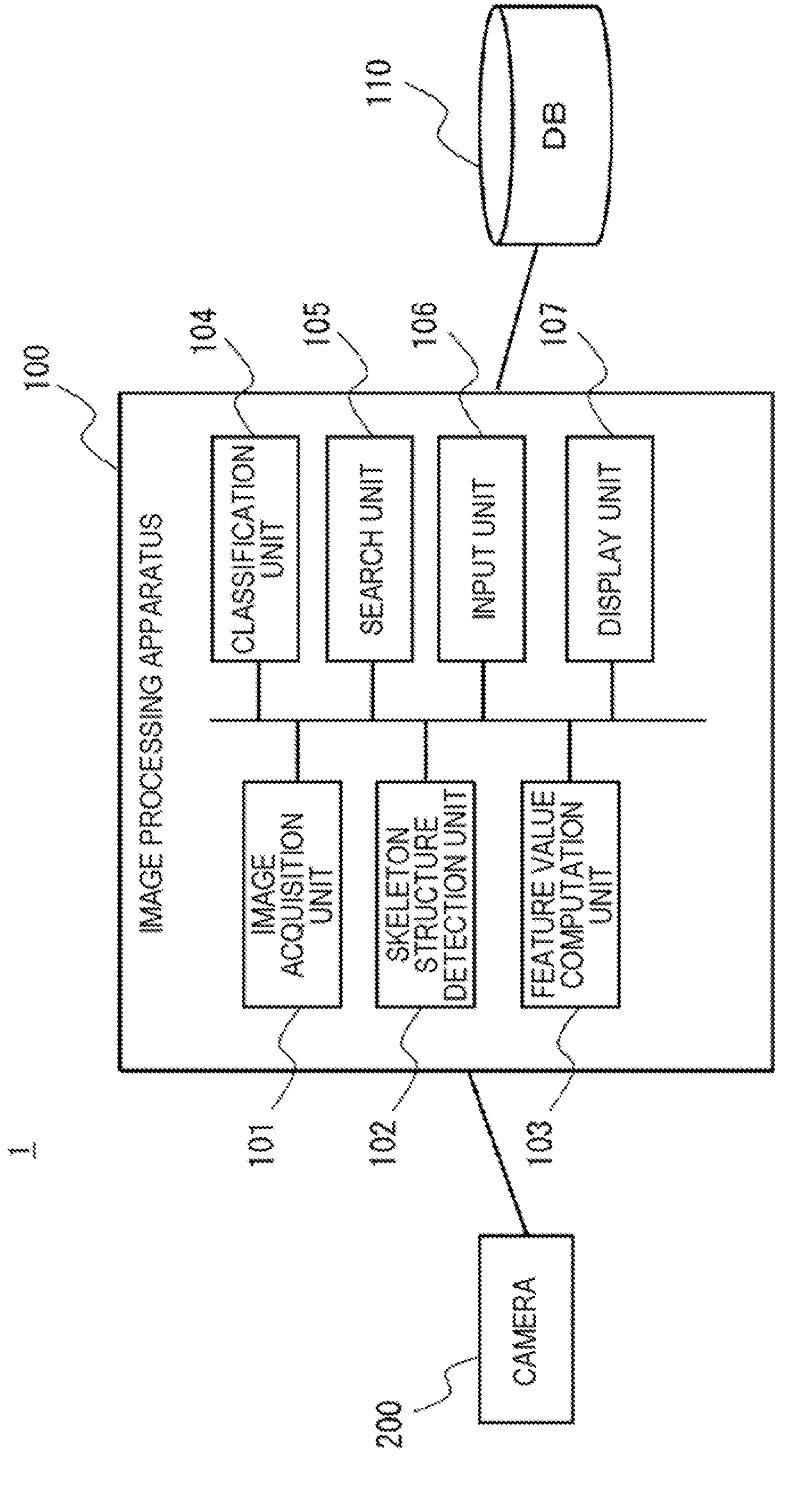
FIG. 2 is a configuration diagram illustrating a configuration of an image processing apparatus according to an example embodiment 1.

(Example Embodiment 1) An example embodiment 1 will be described below with reference to the drawings. FIG. 2 illustrates a configuration of an image processing apparatus 100 according to the present example embodiment. The image processing apparatus 100 constitutes an image processing system 1, together with a camera 200 and a database (DB) 110. The image processing system 1 including the image processing apparatus 100 is a system for classifying and searching for a state such as a pose and behavior of a person, based on a skeleton structure of the person estimated from an image. Note that, the image processing apparatus 100 also functions as an image selection apparatus.

The camera 200 is an image capturing unit, such as a surveillance camera, that generates a two-dimensional image. The camera 200 is installed at a predetermined place, and captures an image of a person and the like in the imaging area from the installed place. The camera 200 may be directly connected to the image processing apparatus 100 in such a way as to be able to output a captured image (video) to the image processing apparatus 100, or may be connected to the image processing apparatus 100 via a network and the like. Note that, the camera 200 may be provided inside the image processing apparatus 100.

The database 110 is a database that stores information (data) needed for processing of the image processing apparatus 100, a processing result, and the like. The database 110 stores an image acquired by an image acquisition unit 101, a detection result of a skeleton structure detection unit 102, data for machine learning, a feature value computed by a feature value computation unit 103, a classification result of a classification unit 104, a search result of a search unit 105, and the like. The database 110 is directly connected to the image processing apparatus 100 in such a way as to be able to input and output data as necessary, or is connected to the image processing apparatus 100 via a network and the like. Note that, the database 110 may be provided inside the image processing apparatus 100 as a non-volatile memory such as a flash memory, a hard disk apparatus, and the like.

As illustrated in FIG. 2, the image processing apparatus 100 includes the image acquisition unit 101, the skeleton structure detection unit 102, the feature value computation unit 103, the classification unit 104, the search unit 105, an input unit 106, and a display unit 107. Note that, a configuration of each unit (block) is one example, and another unit may be used for a configuration as long as a method (operation) described below can be achieved. Further, the image processing apparatus 100 is achieved by a computer apparatus, such as a personal computer and a server, that executes a program, for example, but may be achieved by one apparatus or may be achieved by a plurality of apparatuses on a network. For example, the input unit 106, the display unit 107, and the like may be an external apparatus. Further, both of the classification unit 104 and the search unit 105 may be provided, or only one of them may be provided. Both or one of the classification unit 104 and the search unit 105 is a recognition unit that performs the recognition processing of a state of a person.

The image acquisition unit 101 acquires a two-dimensional image including a person captured by the camera 200. The image acquisition unit 101 acquires an image (video including a plurality of images) including a person captured by the camera 200 in a predetermined surveillance period, for example. Note that, instead of acquisition from the camera 200, an image including a person being prepared in advance may be acquired from the database 110 and the like.

The skeleton structure detection unit 102 detects a two-dimensional skeleton structure of the person in the acquired two-dimensional image, based on the image. The skeleton structure detection unit 102 detects a skeleton structure for all persons recognized in the acquired image. The skeleton structure detection unit 102 detects a skeleton structure of a recognized person, based on a feature such as a joint of the person, by using a skeleton estimation technique using machine learning. The skeleton structure detection unit 102 uses a skeleton estimation technique such as Open Pose in Non-Patent Document 1, for example.

The feature value computation unit 103 computes a feature value of the detected two-dimensional skeleton structure, and stores, in the database 110, the computed feature value in association with the image to be processed. The feature value of the skeleton structure indicates a feature of a skeleton of the person, and is an element for classifying and searching for a state of the person, based on the skeleton of the person. This feature value normally includes a plurality of parameters (for example, a classification element described below). Then, the feature value may be a feature value of the entire skeleton structure, may be a feature value of a part of the skeleton structure, or may include a plurality of feature values as in each portion of the skeleton structure. A method for computing a feature value may be any method such as machine learning and normalization, and a minimum value and a maximum value may be acquired as normalization. As one example, the feature value is a feature value acquired by performing machine learning on the skeleton structure, a size of the skeleton structure from a head to a foot on an image, and the like. The size of the skeleton structure is a height in an up-down direction, an area, and the like of a skeleton region including the skeleton structure on an image. The up-down direction (a height direction or a vertical direction) is a direction (Y-axis direction) of up and down in an image, and is, for example, a direction perpendicular to the ground (reference surface). Further, a left-right direction (a horizontal direction) is a direction (X-axis direction) of left and right in an image, and is, for example, a direction parallel to the ground.

Note that, in order to perform classification and a search desired by a user, a feature value having robustness with respect to classification and search processing is preferably used. For example, when a user desires classification and a search that do not depend on an orientation and a body shape of a person, a feature value that is robust with respect to the orientation and the body shape of the person may be used. A feature value that does not depend on an orientation and a body shape of a person can be acquired by learning skeletons of persons facing in various directions with the same pose and skeletons of persons having various body shapes with the same pose, and extracting a feature only in the up-down direction of a skeleton.

The classification unit 104 classifies a plurality of skeleton structures stored in the database 110, based on a degree of similarity between feature values of the skeleton structures (performs clustering). It can also be said that, as the recognition processing of a state of a person, the classification unit 104 classifies states of a plurality of persons, based on feature values of the skeleton structures. The degree of similarity is a distance between the feature values of the skeleton structures. The classification unit 104 may perform classification by a degree of similarity between feature values of the entire skeleton structures, may perform classification by a degree of similarity between feature values of a part of the skeleton structures, and may perform classification by a degree of similarity between feature values of a first portion (for example, both hands) and a second portion (for example, both feet) of the skeleton structures. Note that, a pose of a person may be classified based on a feature value of a skeleton structure of the person in each image, and behavior of a person may be classified based on a change in a feature value of a skeleton structure of the person in a plurality of images successive in time series. In other words, the classification unit 104 may classify a state of a person including a pose and behavior of the person, based on a feature value of a skeleton structure. For example, the classification unit 104 sets, as subjects to be classified, a plurality of skeleton structures in a plurality of images captured in a predetermined surveillance period. The classification unit 104 acquires a degree of similarity between feature values of the subjects to be classified, and performs classification in such a way that skeleton structures having a high degree of similarity are in the same cluster (group with a similar pose). Note that, similarly to a search, a user may be able to specify a classification condition. The classification unit 104 stores a classification result of the skeleton structure in the database 110, and also displays the classification result on the display unit 107.

The search unit 105 searches for a skeleton structure having a high degree of similarity to a feature value of a search query (query state) from among the plurality of skeleton structures stored in the database 110. It can also be said that, as the recognition processing of a state of a person, the search unit 105 searches for a state of a person that corresponds to a search condition (query state) from among states of a plurality of persons, based on feature values of the skeleton structures. Similarly to classification, the degree of similarity is a distance between the feature values of the skeleton structures. The search unit 105 may perform a search by a degree of similarity between feature values of the entire skeleton structures, may perform a search by a degree of similarity between feature values of a part of the skeleton structures, and may perform a search by a degree of similarity between feature values of a first portion (for example, both hands) and a second portion (for example, both feet) of the skeleton structures. Note that, a pose of a person may be searched based on a feature value of a skeleton structure of the person in each image, and behavior of a person may be searched based on a change in a feature value of a skeleton structure of the person in a plurality of images successive in time series. In other words, the search unit 105 can search for a state of a person including a pose and behavior of the person, based on a feature value of a skeleton structure. For example, similarly to subjects to be classified, the search unit 105 sets, as subjects to be searched, feature values of a plurality of skeleton structures in a plurality of images captured in a predetermined surveillance period. Further, a skeleton structure (pose) specified by a user from among classification results displayed on the classification unit 104 is set as a search query (search key). Note that, without limitation to a classification result, a search query may be selected from among a plurality of skeleton structures that are not classified, or a user may input a skeleton structure to be a search query. The search unit 105 searches for a feature value having a high degree of similarity to a feature value of a skeleton structure being a search query from among feature values being subjects to be searched. The search unit 105 stores a search result of the feature value in the database 110, and also displays the search result on the display unit 107.

The input unit 106 is an input interface that acquires information input by a user who operates the image processing apparatus 100. For example, the user is a surveillant who watches a person in a suspicious state from an image of a surveillance camera. The input unit 106 is, for example, a graphical user interface (GUI), and receives an input of information according to an operation of the user from an input apparatus such as a keyboard, a mouse, and a touch panel. For example, the input unit 106 receives, as a search query, a skeleton structure of a person specified from among the skeleton structures (poses) classified by the classification unit 104.

The display unit 107 is a display unit that displays a result of an operation (processing) of the image processing apparatus 100, and the like, and is, for example, a display apparatus such as a liquid crystal display and an organic electro luminescence (EL) display. The display unit 107 displays, on the GUI, a classification result of the classification unit 104 and a search result of the search unit 105 according to a degree of similarity and the like.

Figure 39:
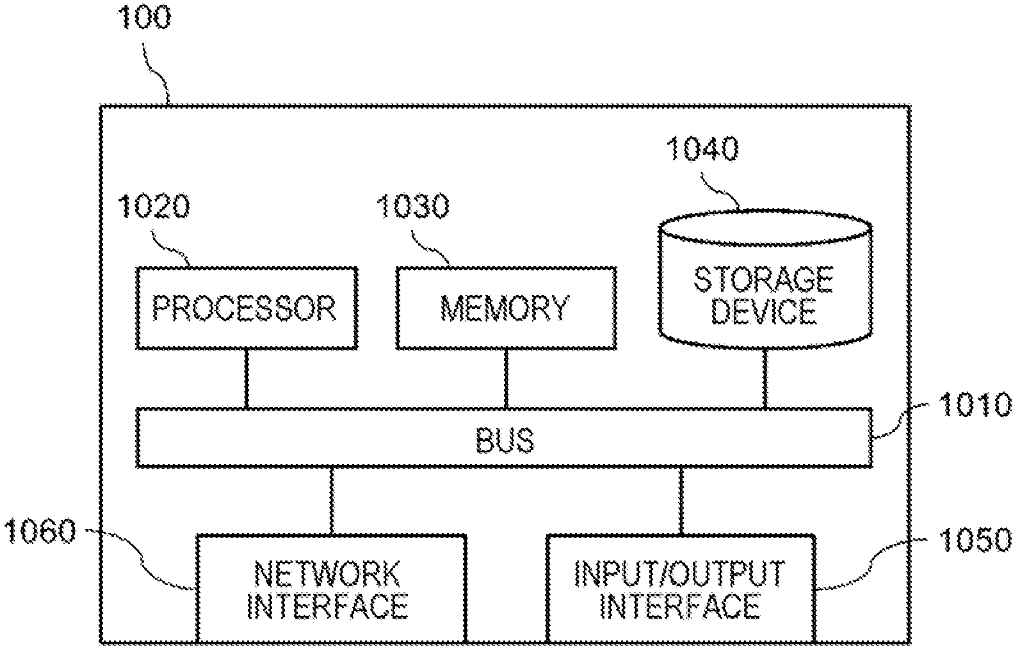
FIG. 39 is a diagram illustrating a hardware configuration example of the image processing apparatus.

FIG. 39 is a diagram illustrating a hardware configuration example of the image processing apparatus 100. The image processing apparatus 100 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method of connecting the processor 1020 and the like to each other is not limited to bus connection.

The processor 1020 is a processor achieved by a central processing unit (CPU), a graphics processing unit (GPU), and the like.

The memory 1030 is a main storage achieved by a random access memory (RAM) and the like.

The storage device 1040 is an auxiliary storage achieved by a hard disk drive (HDD), a solid state drive (SSD), a memory card, a read only memory (ROM), or the like. The storage device 1040 stores a program module that achieves each function (for example, the image acquisition unit 101, the skeleton structure detection unit 102, the feature value computation unit 103, the classification unit 104, the search unit 105, and the input unit 106) of the image processing apparatus 100. The processor 1020 reads each program module onto the memory 1030 and executes the program module, and each function associated with the program module is achieved. Further, the storage device 1040 may also function as the database 110.

The input/output interface 1050 is an interface for connecting the image processing apparatus 100 and various types of input/output equipment. When the database 110 is located outside the image processing apparatus 100, the image processing apparatus 100 may be connected to the database 110 via the input/output interface 1050.

The network interface 1060 is an interface for connecting the image processing apparatus 100 to a network. The network is, for example, a local area network (LAN) and a wide area network (WAN). A method of connection to the network by the network interface 1060 may be wireless connection or wired connection. The image processing apparatus 100 may communicate with the camera 200 via the network interface 1060. When the database 110 is located outside the image processing apparatus 100, the image processing apparatus 100 may be connected to the database 110 via the network interface 1060.

Figure 3:
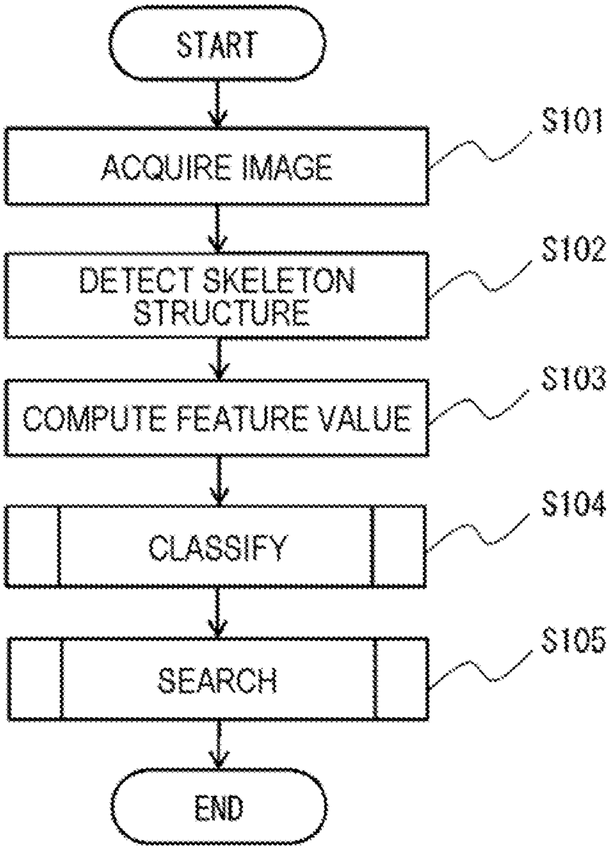
FIG. 3 is a flowchart illustrating an image processing method according to the example embodiment 1.
Figure 4:
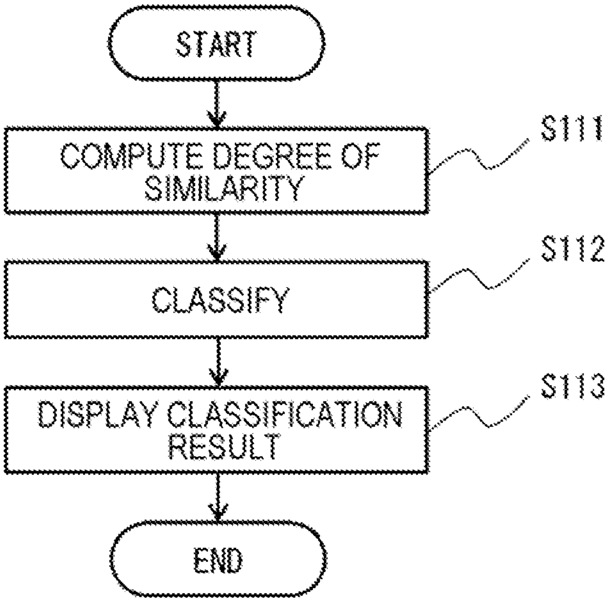
FIG. 4 is a flowchart illustrating a classification method according to the example embodiment 1.
Figure 5:
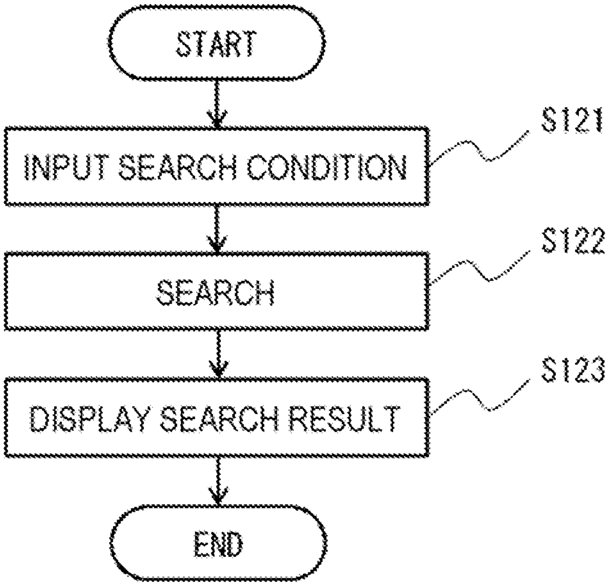
FIG. 5 is a flowchart illustrating a search method according to the example embodiment 1.

FIGS. 3 to 5 illustrate operations of the image processing apparatus 100 according to the present example embodiment. FIG. 3 illustrates a flow from image acquisition to search processing in the image processing apparatus 100, FIG. 4 illustrates a flow of classification processing (S104) in FIG. 3, and FIG. 5 illustrates a flow of the search processing (S105) in FIG. 3.

As illustrated in FIG. 3, the image processing apparatus 100 acquires an image from the camera 200 (S101). The image acquisition unit 101 acquires an image in which a person is captured for performing classification and a search based on a skeleton structure, and stores the acquired image in the database 110. For example, the image acquisition unit 101 acquires a plurality of images captured in a predetermined surveillance period, and performs the following processing on all persons included in the plurality of images.

Figure 6:
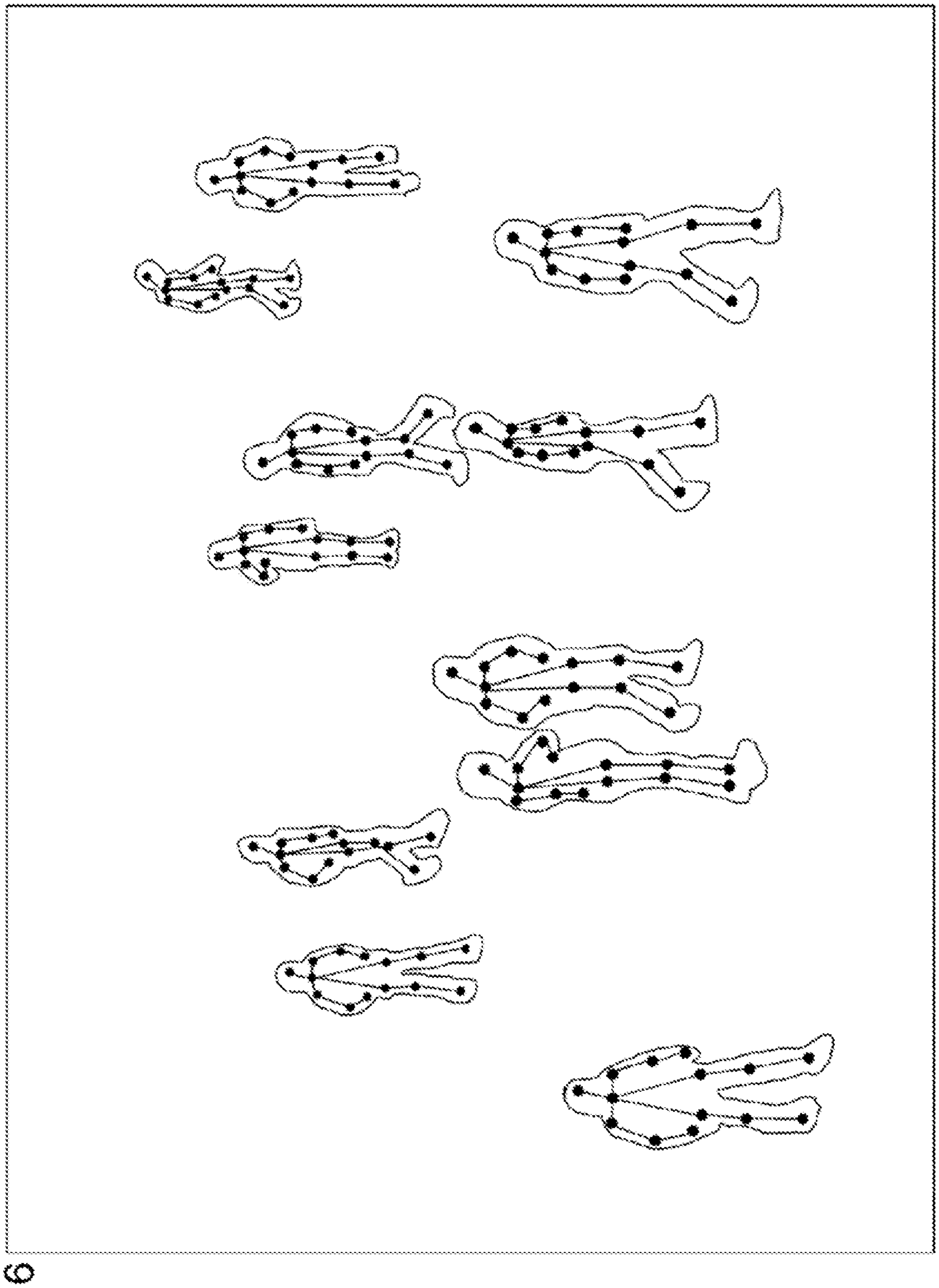
FIG. 6 is a diagram illustrating a detection example of skeleton structures according to the example embodiment 1.

Subsequently, the image processing apparatus 100 detects a skeleton structure of a person, based on the acquired image of the person (S102). FIG. 6 illustrates a detection example of skeleton structures. As illustrated in FIG. 6, a plurality of persons are included in an image acquired from a surveillance camera or the like, and a skeleton structure is detected for each of the persons included in the image.

Figure 7:
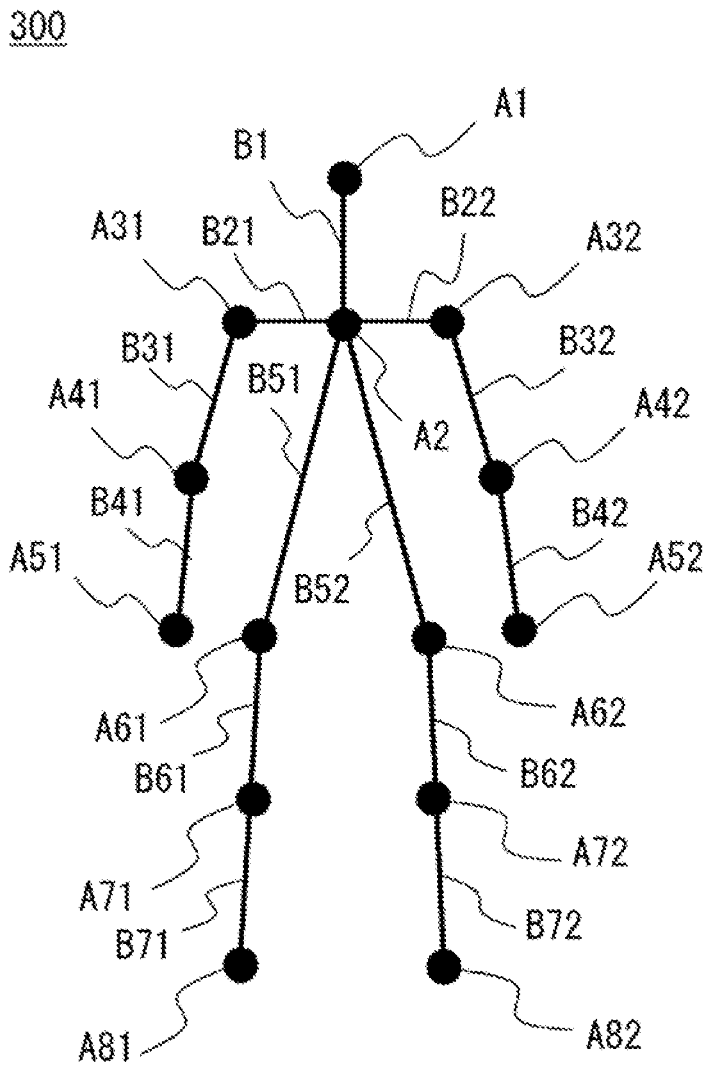
FIG. 7 is a diagram illustrating a human model according to the example embodiment 1.
Figure 8:
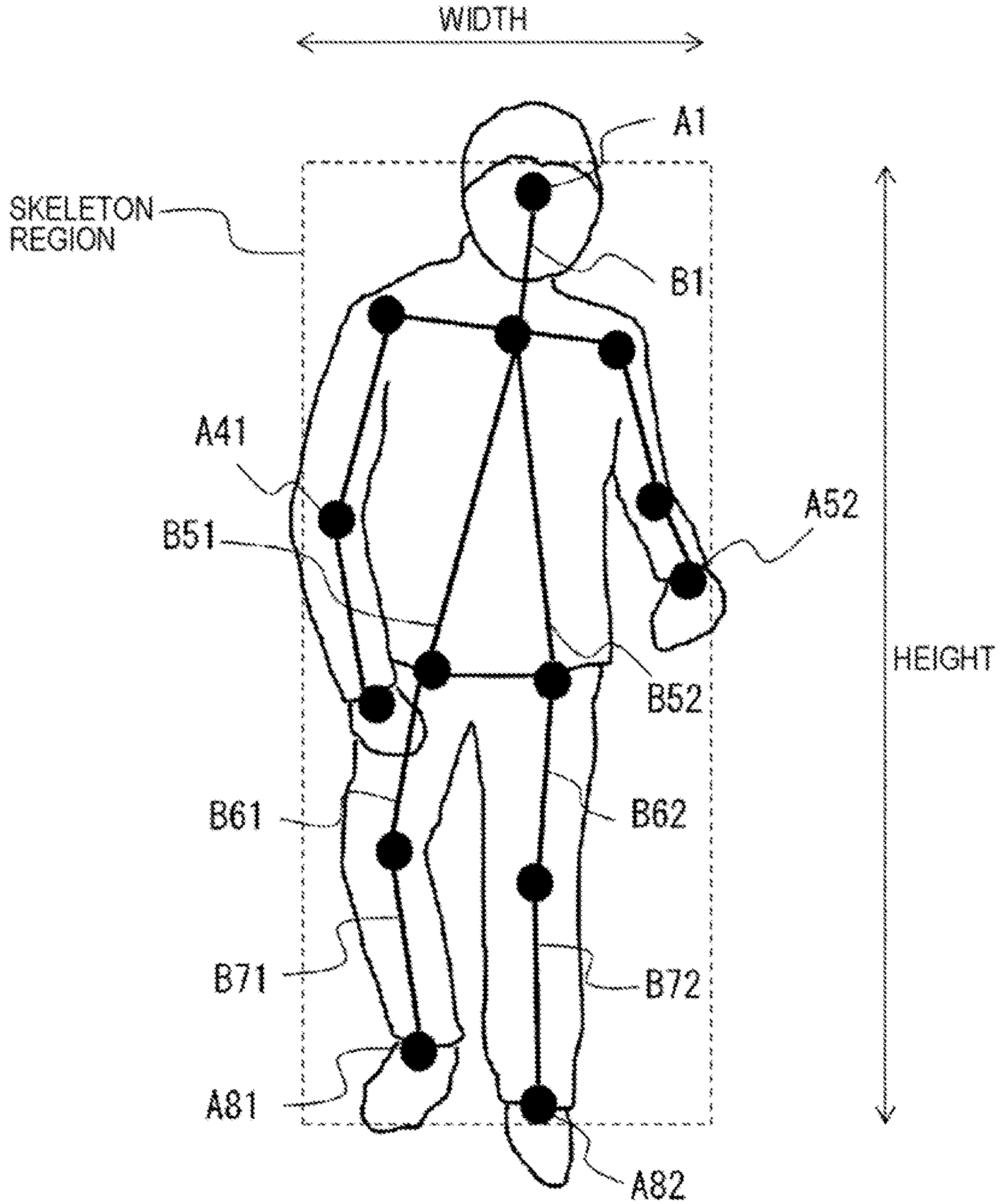
FIG. 8 is a diagram illustrating a detection example of the skeleton structure according to the example embodiment 1.
Figure 9:
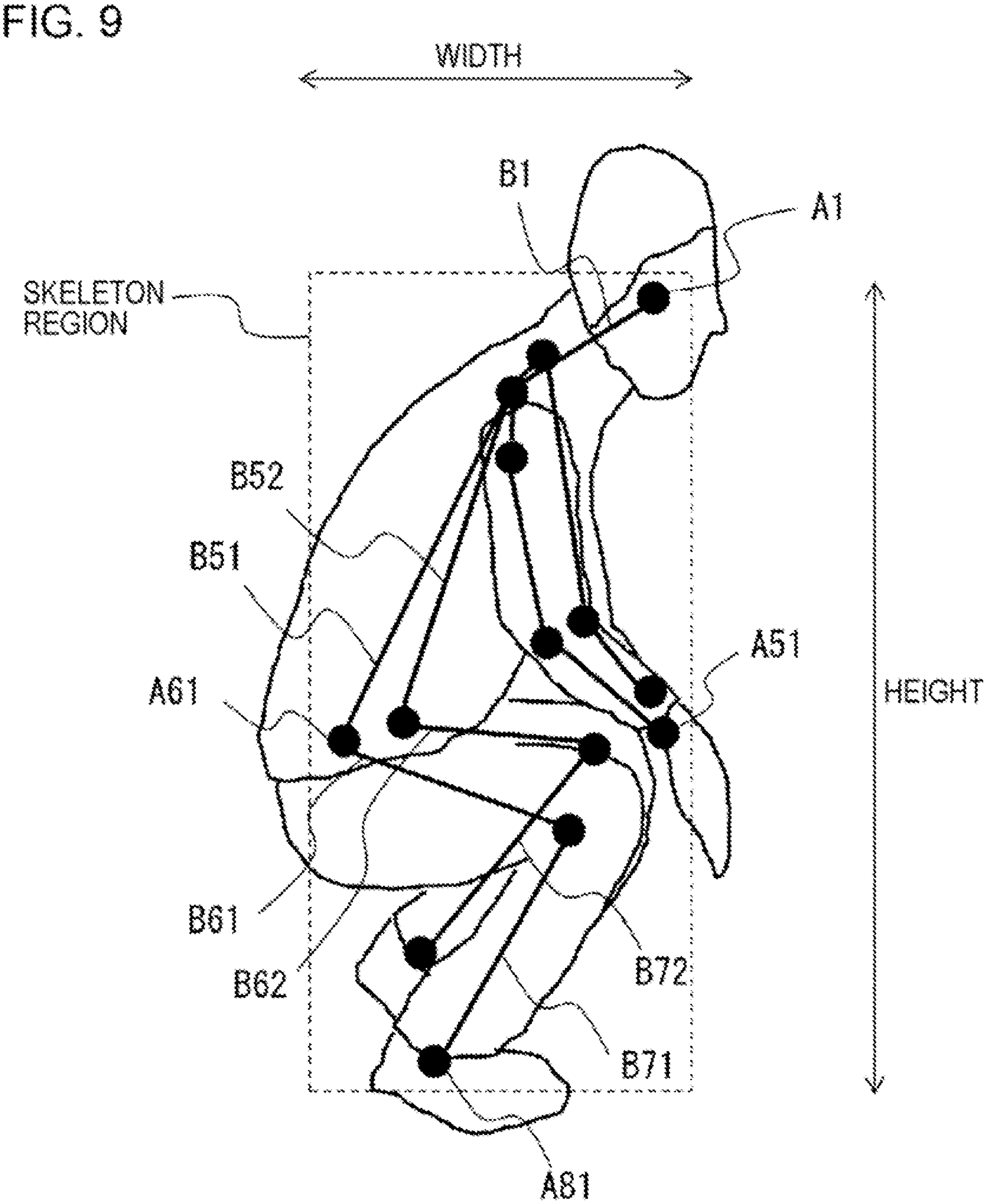
FIG. 9 is a diagram illustrating a detection example of the skeleton structure according to the example embodiment 1.
Figure 10:
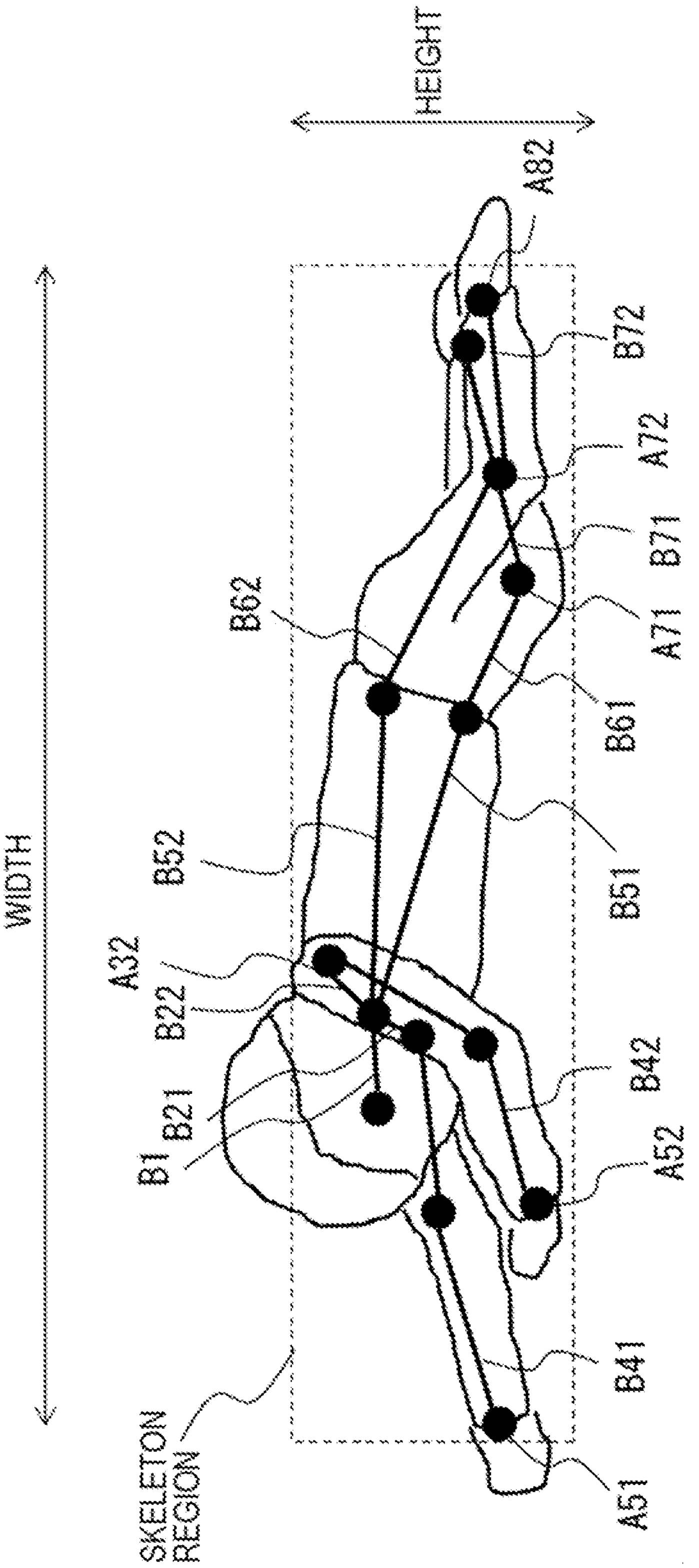
FIG. 10 is a diagram illustrating a detection example of the skeleton structure according to the example embodiment 1.

FIG. 7 illustrates a skeleton structure of a human model 300 detected at this time, and FIGS. 8 to 10 each illustrate a detection example of the skeleton structure. The skeleton structure detection unit 102 detects the skeleton structure of the human model (two-dimensional skeleton model) 300 as in FIG. 7 from a two-dimensional image by using a skeleton estimation technique such as Open Pose. The human model 300 is a two-dimensional model formed of a keypoint such as a joint of a person and a bone connecting keypoints.

For example, the skeleton structure detection unit 102 extracts a feature point that may be a keypoint from an image, refers to information acquired by performing machine learning on the image of the keypoint, and detects each keypoint of a person. In the example illustrated in FIG. 7, as a keypoint of a person, a head A1, a neck A2, a right shoulder A31, a left shoulder A32, a right elbow A41, a left elbow A42, a right hand A51, a left hand A52, a right waist A61, a left waist A62, a right knee A71, a left knee A72, a right foot A81, and a left foot A82 are detected. Furthermore, as a bone of the person connecting the keypoints, detected are a bone B1 connecting the head A1 and the neck A2, a bone B21 connecting the neck A2 and the right shoulder A31, a bone B22 connecting the neck A2 and the left shoulder A32, a bone B31 connecting the right shoulder A31 and the right elbow A41, a bone B32 connecting the left shoulder A32 and the left elbow A42, a bone B41 connecting the right elbow A41 and the right hand A51, a bone B42 connecting the left elbow A42 and the left hand A52, a bone B51 connecting the neck A2 and the right waist A61, a bone B52 connecting the neck A2 and the left waist A62, a bone B61 connecting the right waist A61 and the right knee A71, a bone B62 connecting the left waist A62 and the left knee A72, a bone B71 connecting the right knee A71 and the right foot A81, and a bone B72 connecting the left knee A72 and the left foot A82. The skeleton structure detection unit 102 stores the detected skeleton structure of the person in the database 110.

FIG. 8 is an example of detecting a person in an upright state. In FIG. 8, an image of the upright person is captured from the front, the bone B1, the bone B51 and the bone B52, the bone B61 and the bone B62, and the bone B71 and the bone B72 that are viewed from the front are each detected without overlapping, and the bone B61 and the bone B71 of a right leg are bent slightly more than the bone B62 and the bone B72 of a left leg.

FIG. 9 is an example of detecting a person in a squatting state. In FIG. 9, an image of the squatting person is captured from a right side, the bone B1, the bone B51 and the bone B52, the bone B61 and the bone B62, and the bone B71 and the bone B72 that are viewed from the right side are each detected, and the bone B61 and the bone B71 of a right leg and the bone B62 and the bone B72 of a left leg are greatly bent and also overlap.

FIG. 10 is an example of detecting a person in a sleeping state. In FIG. 10, an image of the sleeping person is captured diagonally from the front left, the bone B1, the bone B51 and the bone B52, the bone B61 and the bone B62, and the bone B71 and the bone B72 that are viewed diagonally from the front left are each detected, and the bone B61 and the bone B71 of a right leg, and the bone B62 and the bone B72 of a left leg are bent and also overlap.

Subsequently, as illustrated in FIG. 3, the image processing apparatus 100 computes a feature value of the detected skeleton structure (S103). For example, when a height and an area of a skeleton region are set a feature value, the feature value computation unit 103 extracts a region including the skeleton structure and acquires a height (pixel count) and an area (pixel area) of the region. The height and the area of the skeleton region are acquired from coordinates of an end portion of the extracted skeleton region and coordinates of a keypoint of the end portion. The feature value computation unit 103 stores the acquired feature value of the skeleton structure in the database 110. Note that, the feature value of the skeleton structure is also used as pose information indicating a pose of the person.

Note that, the feature value of the skeleton structure is also used as pose information indicating a pose of the person. Further, the feature value of the skeleton structure is stored in the database 110 together with a degree of reliability of the feature value. The degree of reliability of the feature value indicates a likelihood (i.e., a probability that an estimation result of a pose is correct) of being the feature value. When a degree of reliability of a certain feature value is high, a probability of being the feature value is high. Note that, a degree of reliability of a feature value is computed by using, for example, the number of keypoints used when the feature value of a skeleton structure is set, and a degree of reliability of the keypoint. For example, a greater number of joints increases a degree of reliability of a feature value. Furthermore, a higher degree of reliability of a keypoint increases a degree of reliability of a feature value.

In the example in FIG. 8, a skeleton region including all of the bones is extracted from the skeleton structure of the upright person. In this case, an upper end of the skeleton region is the keypoint A1 of the head, a lower end of the skeleton region is the keypoint A82 of the left foot, a left end of the skeleton region is the keypoint A41 of the right elbow, and a right end of the skeleton region is the keypoint A52 of the left hand. Thus, a height of the skeleton region is acquired from a difference in Y coordinate between the keypoint A1 and the keypoint A82. Further, a width of the skeleton region is acquired from a difference in X coordinate between the keypoint A41 and the keypoint A52, and an area is acquired from the height and the width of the skeleton region.

In the example in FIG. 9, a skeleton region including all of the bones is extracted from the skeleton structure of the squatting person. In this case, an upper end of the skeleton region is the keypoint A1 of the head, a lower end of the skeleton region is the keypoint A81 of the right foot, a left end of the skeleton region is the keypoint A61 of the right waist, and a right end of the skeleton region is the keypoint A51 of the right hand. Thus, a height of the skeleton region is acquired from a difference in Y coordinate between the keypoint A1 and the keypoint A81. Further, a width of the skeleton region is acquired from a difference in X coordinate between the keypoint A61 and the keypoint A51, and an area is acquired from the height and the width of the skeleton region.

In the example in FIG. 10, a skeleton region including all of the bones is extracted from the skeleton structure of the sleeping person lying along the left-right direction of the image. In this case, an upper end of the skeleton region is the keypoint A32 of the left shoulder, a lower end of the skeleton region is the keypoint A52 of the left hand, a left end of the skeleton region is the keypoint A51 of the right hand, and a right end of the skeleton region is the keypoint A82 of the left foot. Thus, a height of the skeleton region is acquired from a difference in Y coordinate between the keypoint A32 and the keypoint A52. Further, a width of the skeleton region is acquired from a difference in X coordinate between the keypoint A51 and the keypoint A82, and an area is acquired from the height and the width of the skeleton region.

Figure 11:
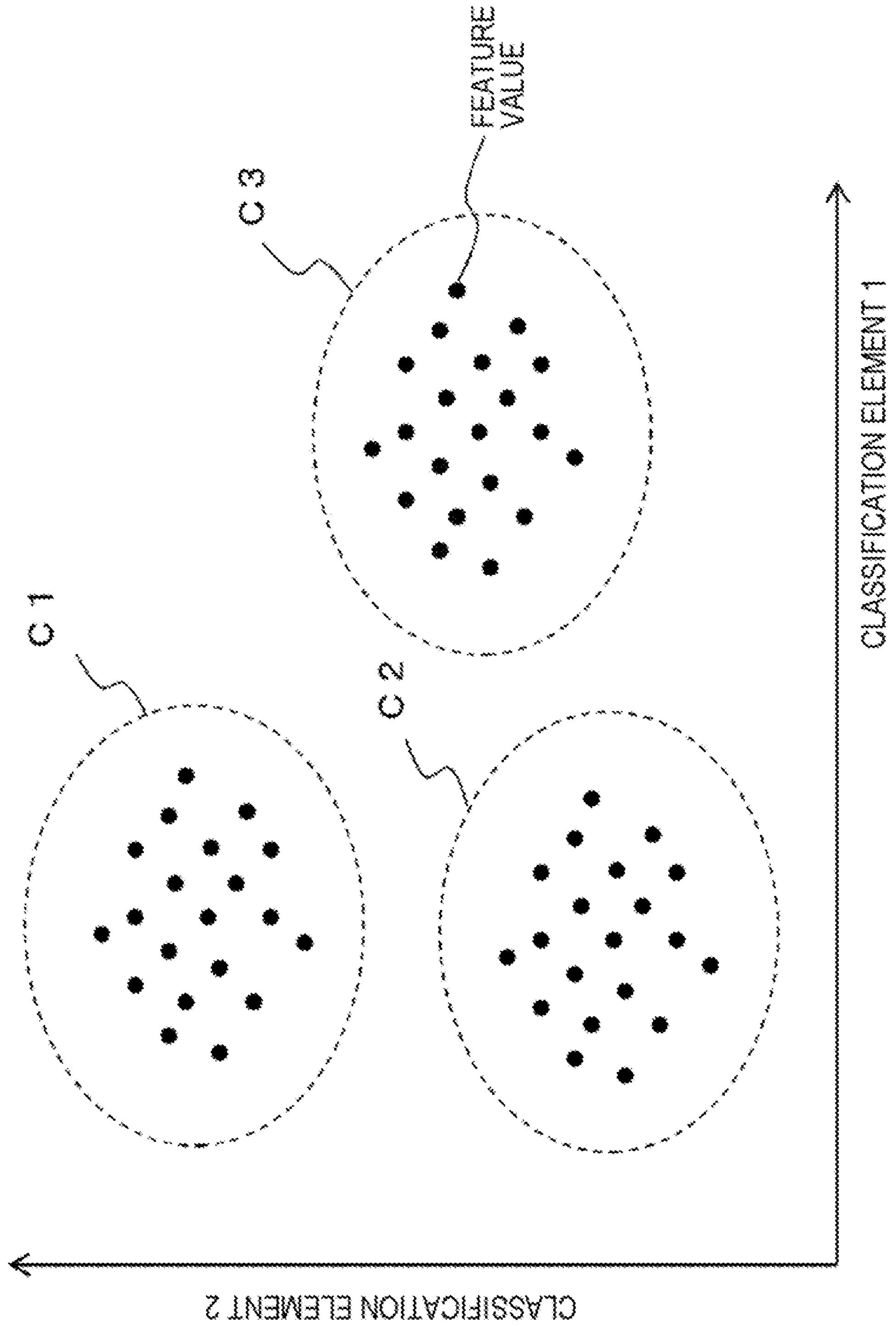
FIG. 11 is a graph illustrating a specific example of the classification method according to the example embodiment 1.

Subsequently, as illustrated in FIG. 3, the image processing apparatus 100 performs classification processing (S104). In the classification processing, as illustrated in FIG. 4, the classification unit 104 computes a degree of similarity of the computed feature value of the skeleton structure (S111), and classifies the skeleton structure based on the degree of similarity (S112). The classification unit 104 acquires a degree of similarity among all of the skeleton structures that are subjects to be classified and are stored in the database 110, and classifies skeleton structures (poses) having a highest degree of similarity in the same cluster (performs clustering). Furthermore, classification is performed by acquiring a degree of similarity between classified clusters, and classification is repeated until the number of clusters becomes a predetermined number. FIG. 11 illustrates an image of a classification result of feature values of skeleton structures. FIG. 11 is an image of a cluster analysis by two-dimensional classification elements, and two classification elements are, for example, a height of a skeleton region and an area of the skeleton region, or the like. In FIG. 11, as a result of classification, feature values of a plurality of skeleton structures are classified into three clusters C1 to C3. The clusters C1 to C3 are associated with poses such as a standing pose, a sitting pose, and a sleeping pose, respectively, for example, and skeleton structures (persons) are classified for each similar pose.

In the present example embodiment, various classification methods can be used by performing classification, based on a feature value of a skeleton structure of a person. Note that, a classification method may be preset, or any classification method may be able to be set by a user. Further, classification may be performed by the same method as a search method described below. In other words, classification may be performed by a classification condition similar to a search condition. For example, the classification unit 104 performs classification by the following classification methods. Any classification method may be used, or any selected classification methods may be combined.

(Classification Method 1) Classification by a Plurality of Hierarchical Levels

Classification is performed by combining, in a hierarchical manner, classification by a skeleton structure of a whole body, classification by a skeleton structure of an upper body and a lower body, classification by a skeleton structure of an arm and a leg, and the like. In other words, classification may be performed based on a feature value of a first portion and a second portion of a skeleton structure, and, furthermore, classification may be performed by assigning weights to the feature value of the first portion and the second portion.

(Classification Method 2) Classification by a Plurality of Images Along Time Series Classification is performed based on a feature value of a skeleton structure in a plurality of images successive in time series. For example, classification may be performed based on a cumulative value by accumulating a feature value in a time series direction. Furthermore, classification may be performed based on a change (change value) in a feature value of a skeleton structure in a plurality of successive images.

(Classification Method 3) Classification by Ignoring the Left and the Right of a Skeleton Structure Classification is performed on an assumption that skeleton structures in which a right side and a left side are reversed are the same skeleton structure.

Figure 12:
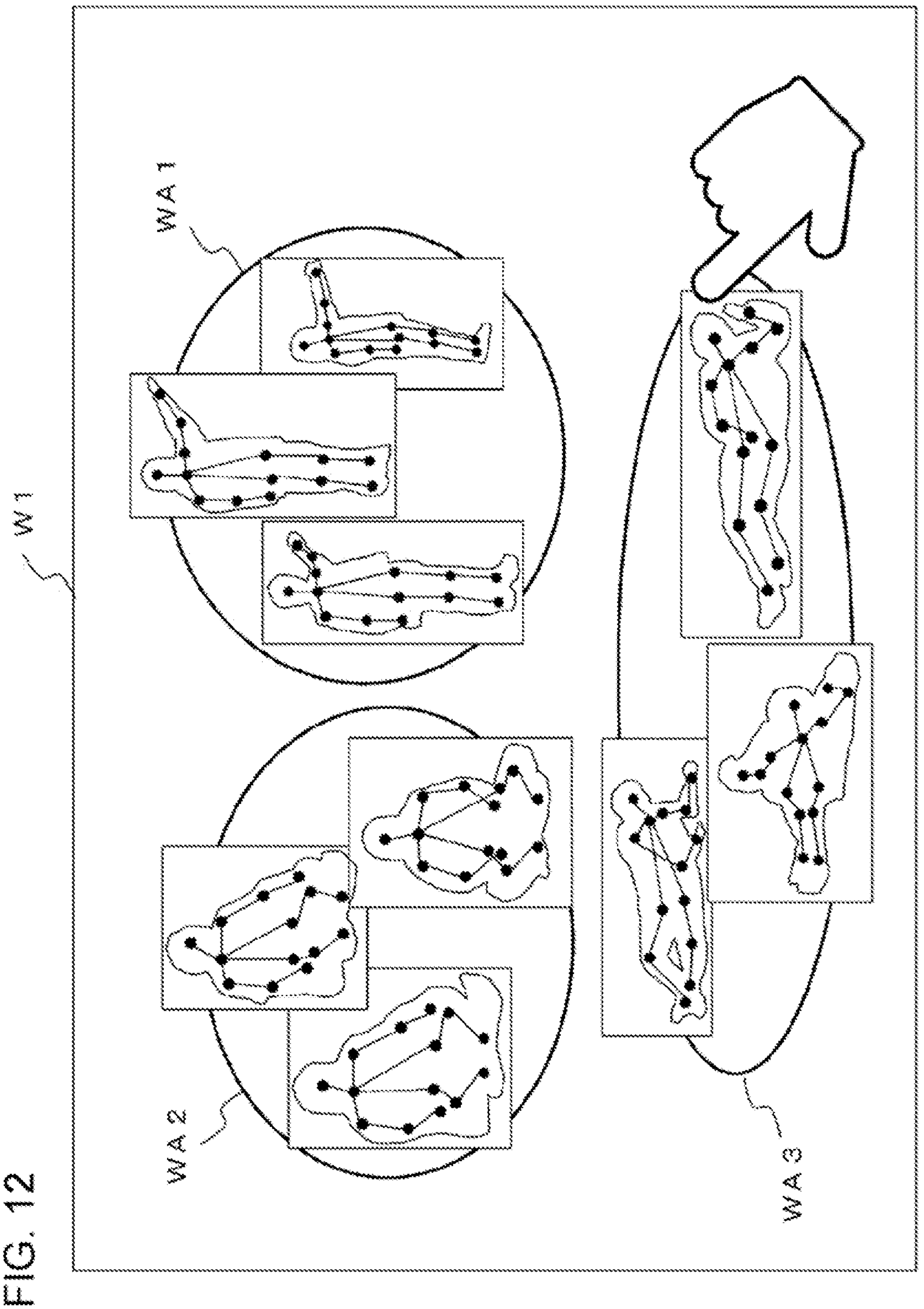
FIG. 12 is a diagram illustrating a display example of a classification result according to the example embodiment 1.

Furthermore, the classification unit 104 displays a classification result of the skeleton structure (S113). The classification unit 104 acquires a necessary image of a skeleton structure and a person from the database 110, and displays, on the display unit 107, the skeleton structure and the person for each similar pose (cluster) as a classification result. FIG. 12 illustrates a display example when poses are classified into three. For example, as illustrated in FIG. 12, pose regions WA1 to WA3 for each pose are displayed on a display window W1, and a skeleton structure and a person (image) of each associated pose are displayed in the pose regions WA1 to WA3. The pose region WA1 is, for example, a display region of a standing pose, and displays a skeleton structure and a person that are classified into the cluster C1 and are similar to the standing pose. The pose region WA2 is, for example, a display region of a sitting pose, and displays a skeleton structure and a person that are classified into the cluster C2 and are similar to the sitting pose. The pose region WA3 is, for example, a display region of a sleeping pose, and displays a skeleton structure and a person that are classified into the cluster C3 and are similar to the sleeping pose.

Subsequently, as illustrated in FIG. 3, the image processing apparatus 100 performs the search processing (S105). In the search processing, as illustrated in FIG. 5, the search unit 105 receives an input of a search condition (S121), and searches for a skeleton structure, based on the search condition (S122). The search unit 105 receives, from the input unit 106, an input of a search query being the search condition in response to an operation of a user. When the search query is input from a classification result, for example, in the display example in FIG. 12, a user specifies (selects), from among the pose regions WA1 to WA3 displayed on the display window W1, a skeleton structure of a pose desired to be searched for. Then, with the skeleton structure specified by the user as the search query, the search unit 105 searches for a skeleton structure having a high degree of similarity of a feature value from among all of the skeleton structures that are subjects to be searched and are stored in the database 110. The search unit 105 computes a degree of similarity between a feature value of the skeleton structure being the search query and a feature value of the skeleton structure being the subject to be searched, and extracts a skeleton structure having the computed degree of similarity higher than a predetermined threshold value. The feature value of the skeleton structure being the search query may use a feature value being computed in advance, or may use a feature value being acquired during a search. Note that, the search query may be input by moving each portion of a skeleton structure in response to an operation of the user, or a pose demonstrated by the user in front of a camera may be set as the search query.

In the present example embodiment, similarly to the classification methods, various search methods can be used by performing a search, based on a feature value of a skeleton structure of a person. Note that, a search method may be preset, or any search method may be able to be set by a user. For example, the search unit 105 performs a search by the following search methods. Any search method may be used, or any selected search methods may be combined. A search may be performed by combining a plurality of search methods (search conditions) by a logical expression (for example, AND (conjunction), OR (disjunction), NOT (negation)). For example, a search may be performed by setting "(pose with a right hand up) AND (pose with a left foot up)" as a search condition.

Figure 13:
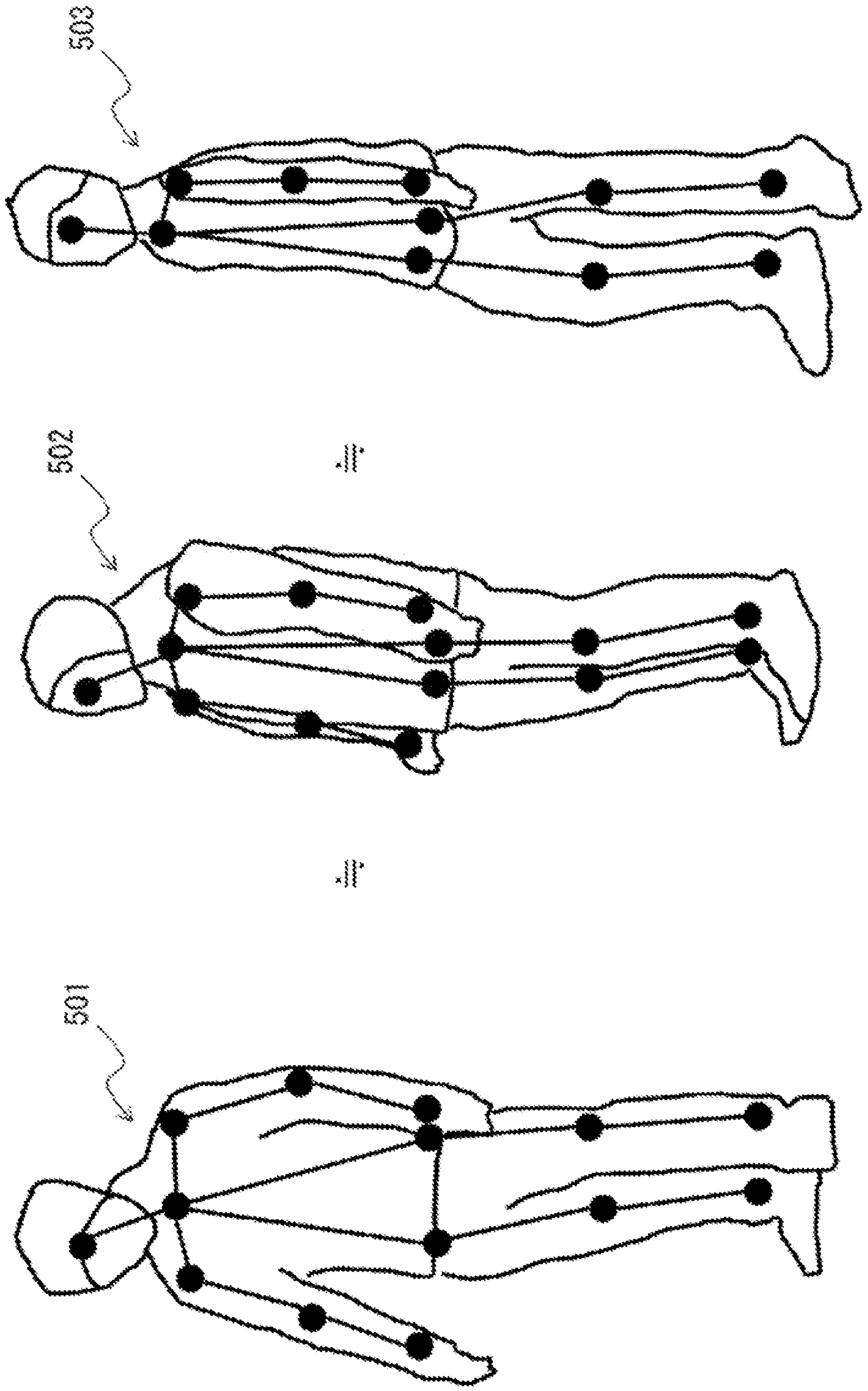
FIG. 13 is a diagram for describing the search method according to the example embodiment 1.

(Search Method 1) A search only by a feature value in the height direction By performing a search by using only a feature value in the height direction of a search person, an influence of a change in the horizontal direction of a person can be suppressed, and robustness improves with respect to a change in orientation of the person and body shape of the person. For example, as in skeleton structures 501 to 503 in FIG. 13, even when there is difference in an orientation or a body shape of a person, a feature value in the height direction does not greatly change. Thus, in the skeleton structures 501 to 503, it can be decided, at a time of a search (at a time of classification), that poses are the same.

Figure 14:
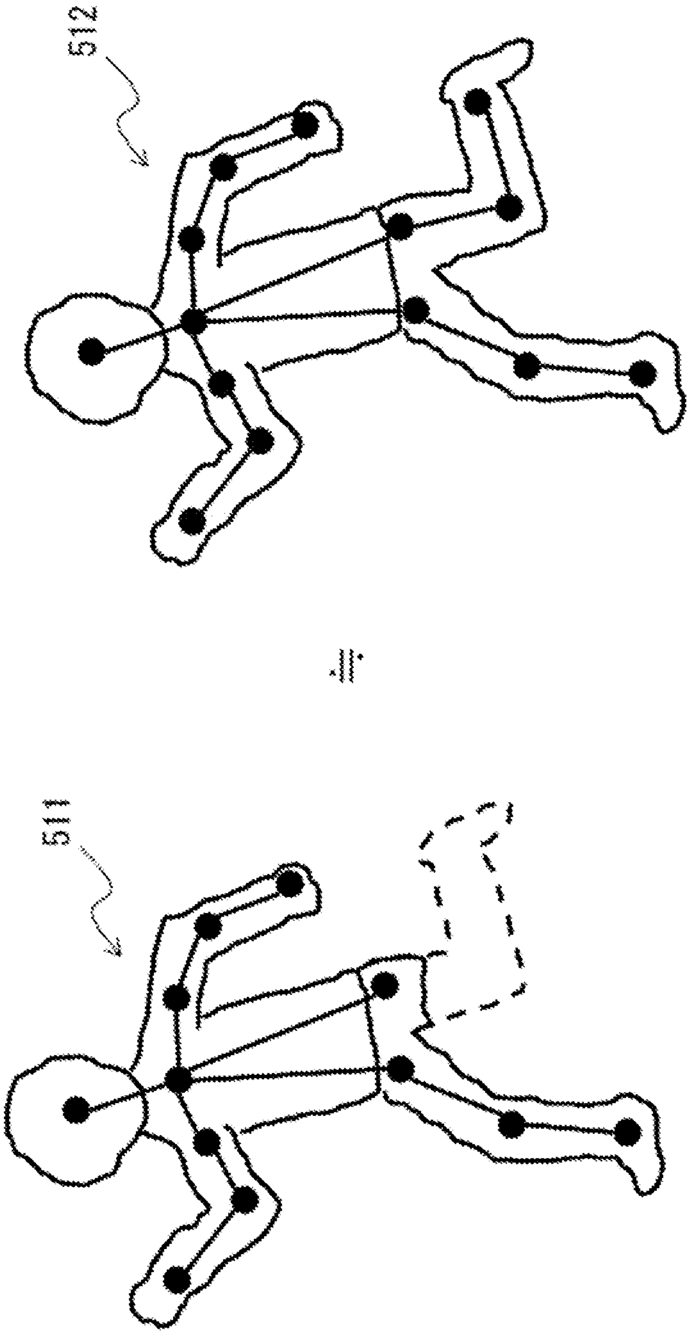
FIG. 14 is a diagram for describing the search method according to the example embodiment 1.
Figure 15:
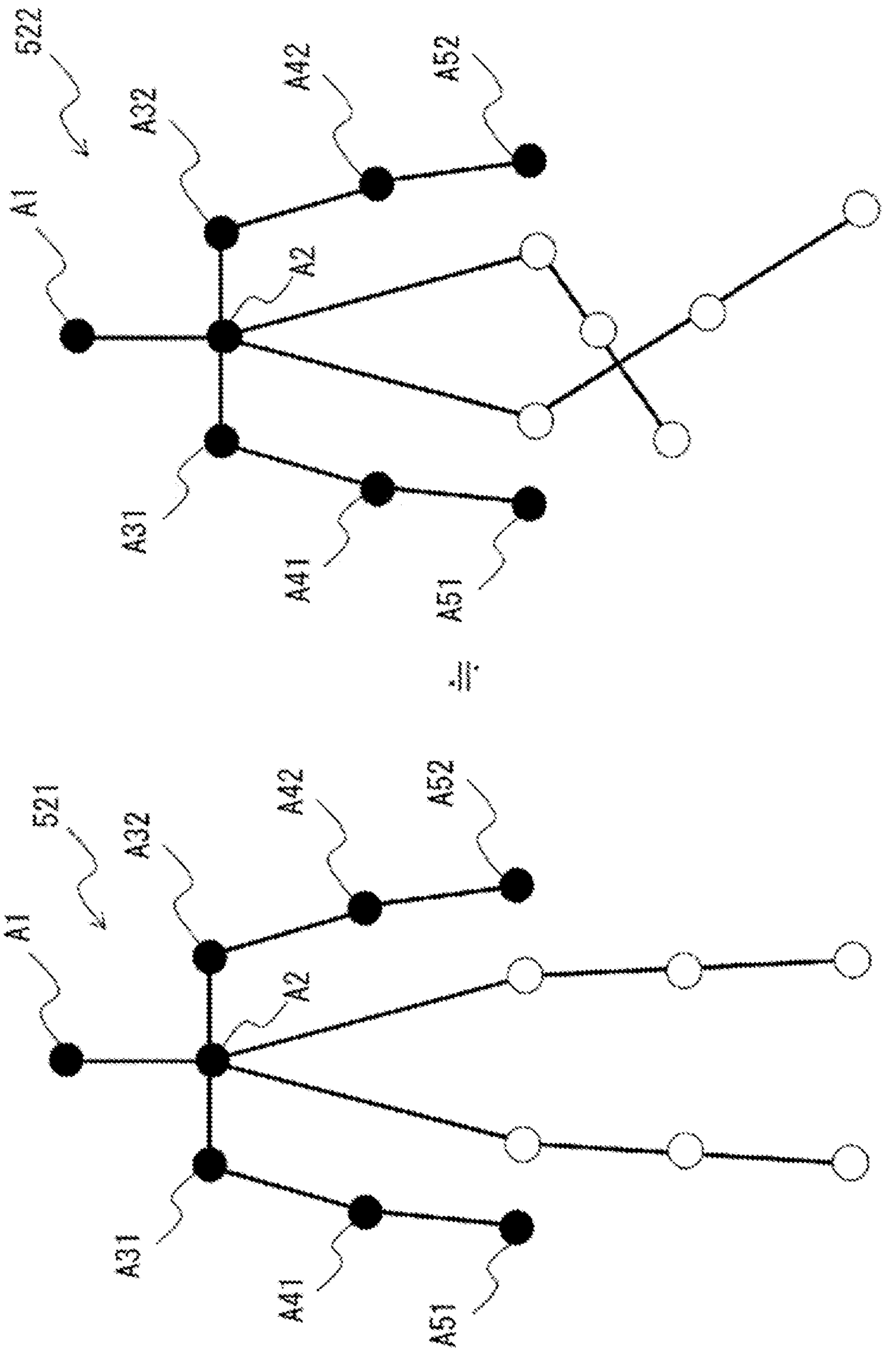
FIG. 15 is a diagram for describing the search method according to the example embodiment 1.

(Search Method 2) When a part of a body of a person is hidden in a partial search image, a search is performed by using only information about a recognizable portion. For example, as in skeleton structures 511 and 512 in FIG. 14, even when a keypoint of a left foot cannot be detected due to the left foot being hidden, a search can be performed by using a feature value of another detected keypoint. Thus, in the skeleton structures 511 and 512, it can be decided, at a time of a search (at a time of classification), that poses are the same. In other words, classification and a search can be performed by using a feature value of some of keypoints instead of all keypoints. In an example of skeleton structures 521 and 522 in FIG. 15, although orientations of both feet are different, it can be decided that poses are the same by setting a feature value of keypoints (A1, A2, A31, A32, A41, A42, A51, and A52) of an upper body as a search query. Further, a search may be performed by assigning a weight to a portion (feature point) desired to be searched, or a threshold value of a similarity degree determination may be changed. When a part of a body is hidden, a search may be performed by ignoring the hidden portion, or a search may be performed by taking the hidden portion into consideration. By performing a search also including a hidden portion, a pose in which the same portion is hidden can be searched.

Figure 16:
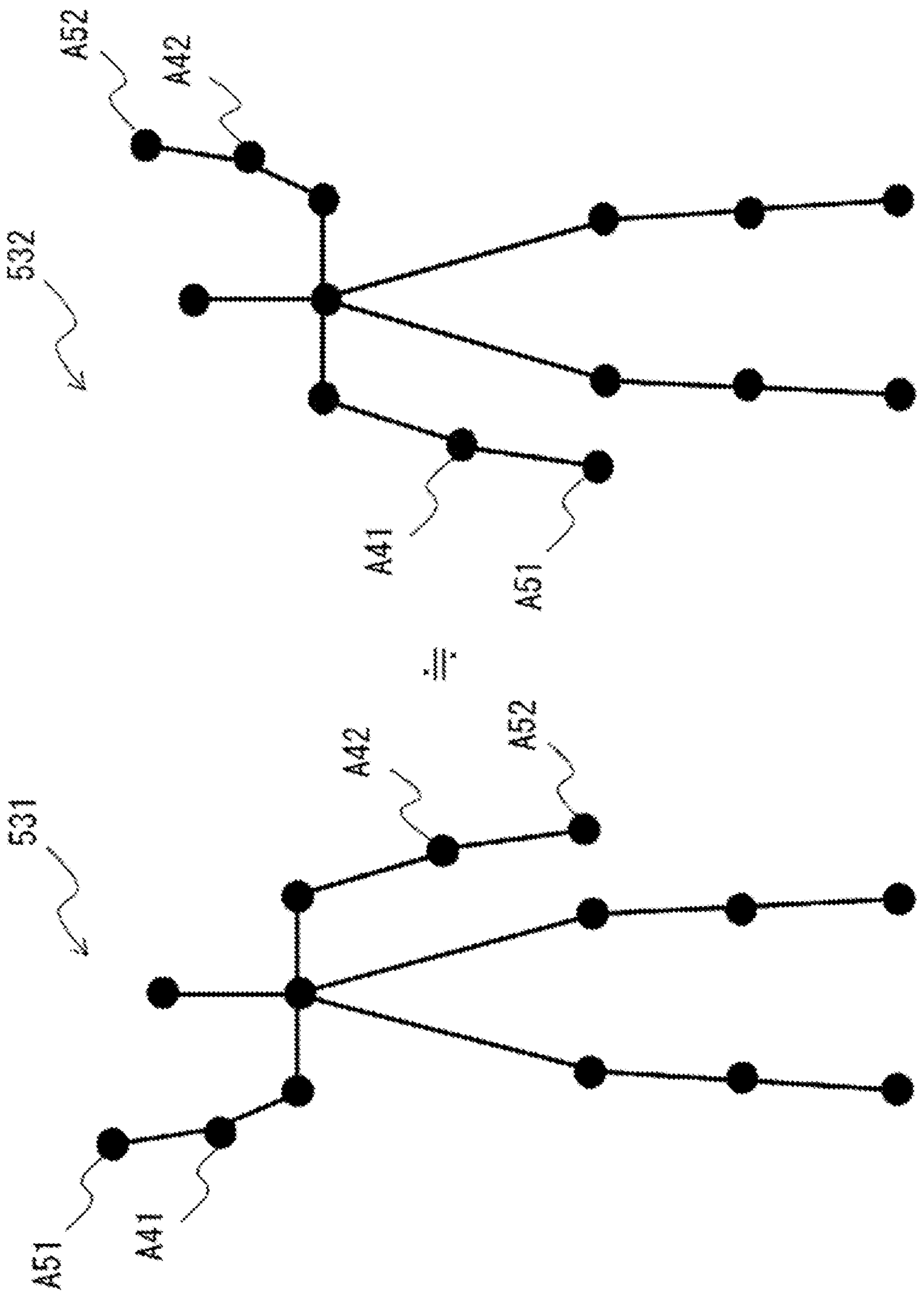
FIG. 16 is a diagram for describing the search method according to the example embodiment 1.

(Search Method 3) Search by Ignoring the Left and the Right of a Skeleton Structure A search is performed on an assumption that skeleton structures in which a right side and a left side are reversed are the same skeleton structure. For example, as in skeleton structures 531 and 532 in FIG. 16, a pose with a right hand up and a pose with a left hand up can be searched (classified) as the same pose. In the example in FIG. 16, in the skeleton structure 531 and the skeleton structure 532, although positions of the keypoint A51 of the right hand, the keypoint A41 of the right elbow, the keypoint A52 of the left hand, and the keypoint A42 of the left elbow are different, positions of the other keypoints are the same. When the keypoints of one of the skeleton structures, of the keypoint A51 of the right hand and the keypoint A41 of the right elbow of the skeleton structure 531 and the keypoint A52 of the left hand and the keypoint A42 of the left elbow of the skeleton structure 532, are reversed, the keypoints have the same positions of the keypoints of the other skeleton structure. When the keypoints of one of the skeleton structures, of the keypoint A52 of the left hand and the keypoint A42 of the left elbow of the skeleton structure 531 and the keypoint A51 of the right hand and the keypoint A41 of the right elbow of the skeleton structure 532, are reversed, the keypoints have the same positions of the keypoints of the other skeleton structure. Thus, it is decided that poses are the same.

(Search Method 4) A Search by a Feature Value in the Vertical Direction and the Horizontal Direction After a search is performed only with a feature value of a person in the vertical direction (Y-axis direction), the acquired result is further searched by using a feature value of the person in the horizontal direction (X-axis direction).

(Search Method 5) A Search by a Plurality of Images Along Time Series

A search is performed based on a feature value of a skeleton structure in a plurality of images successive in time series. For example, a search may be performed based on a cumulative value by accumulating a feature value in a time series direction. Furthermore, a search may be performed based on a change (change value) in a feature value of a skeleton structure in a plurality of successive images.

Figure 17:
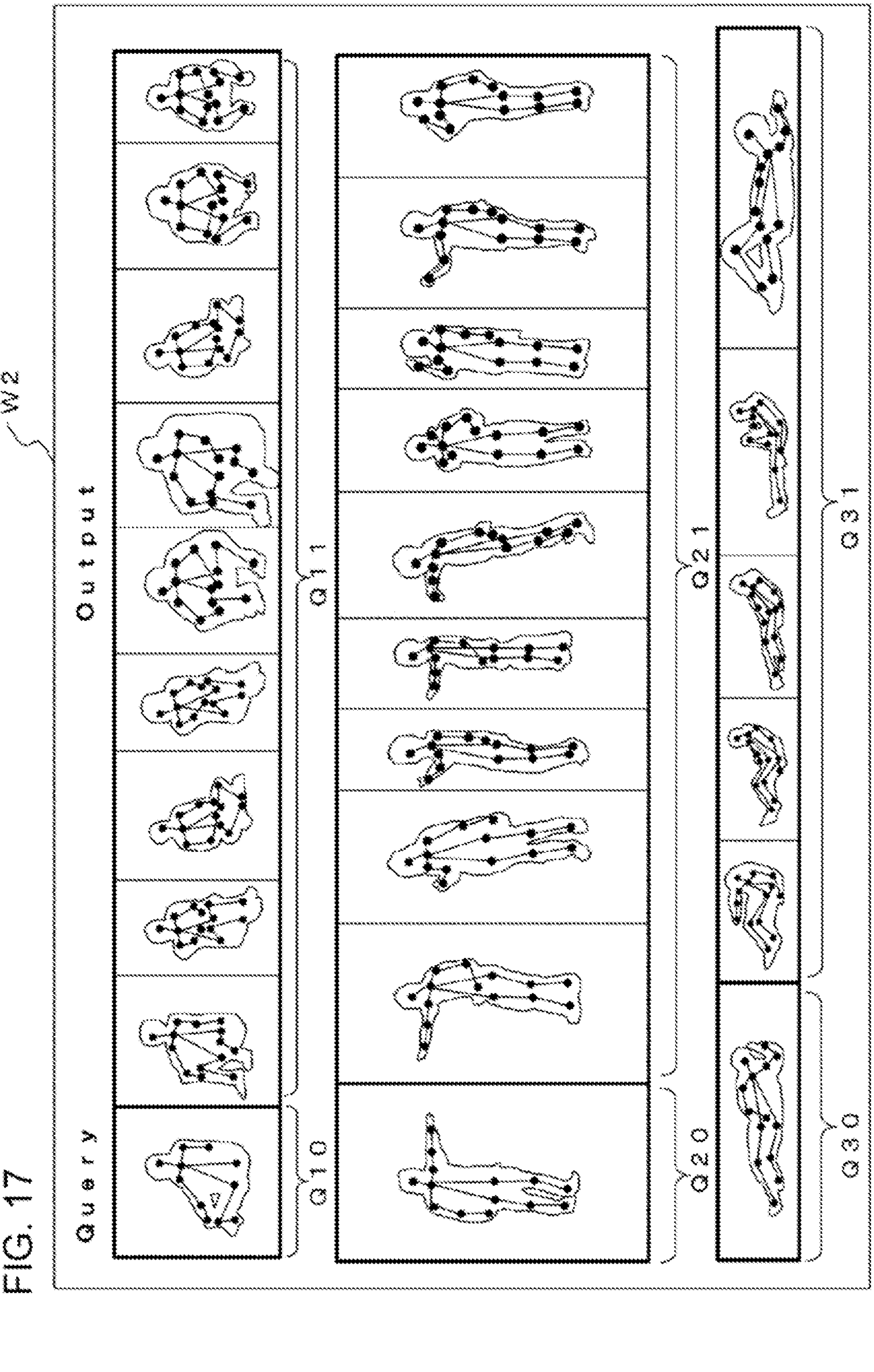
FIG. 17 is a diagram illustrating a display example of a search result according to the example embodiment 1.

Furthermore, the search unit 105 displays a search result of the skeleton structure (S123). The search unit 105 acquires a necessary image of a skeleton structure and a person from the database 110, and displays, on the display unit 107, the skeleton structure and the person acquired as a search result. For example, when a plurality of search queries (search conditions) are specified, a search result is displayed for each of the search queries. FIG. 17 illustrates a display example when a search is performed by three search queries (poses). For example, as illustrated in FIG. 17, in a display window W2, skeleton structures and persons of search queries Q10, Q20, and Q30 specified are displayed at a left end portion, and skeleton structures and persons of search results Q11, Q21, and Q31 of the search queries are displayed side by side on the right side of the search queries Q10, Q20, and Q30.

An order in which search results are displayed side by side from a search query may be an order in which a corresponding skeleton structure is found, or may be decreasing order of a degree of similarity. When a search is performed by assigning a weight to a portion (feature point) in a partial search, display may be performed in an order of a degree of similarity computed by assigning a weight. Display may be performed in an order of a degree of similarity computed only from a portion (feature point) selected by a user. Further, display may be performed by cutting, for a certain period of time, images (frames) in time series before and after an image (frame) that is a search result.

(Search Method 6) In the present search method, a plurality of images (hereinafter, described as query images) are used as search queries. Then, the search unit 105 selects an image (hereinafter, described as a similar image) similar to at least one of the plurality of query images, and displays the similar image on the display unit 107.

Figure 40:
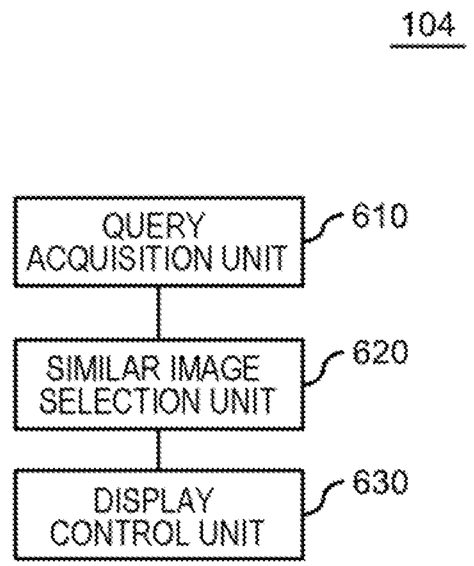
FIG. 40 is a diagram illustrating one example of a functional configuration of a search unit 105 according to a search method 6.

FIG. 40 is a diagram illustrating one example of a functional configuration of the search unit 105 according to the present search method. In the example illustrated in FIG. 40, the search unit 105 includes a query acquisition unit 610, a similar image selection unit 620, and a display control unit 630.

The query acquisition unit 610 acquires a plurality of pieces of query information. The query information is information generated for each of a plurality of query images, and indicates a feature of the query image. In other words, the query acquisition unit 610 acquires the query information about each of the plurality of query images. One example of the query information is the pose information described above.

The similar image selection unit 620 selects, as a similar image by using the plurality of pieces of query information, an image whose degree of similarity to at least one of the query images satisfies a reference, for example, an image whose relative distance in a feature value space is equal to or less than a reference value. An image being a population of a similar image is stored in the database 110, for example. In this case, the similar image selection unit 620 selects a similar image from the database 110.

The display control unit 630 displays the similar image selected by the similar image selection unit 620 on the display unit 107.

For example, when the similar image selection unit 620 selects a plurality of the similar images, the display control unit 630 sets a display position or a display order of each of the plurality of similar images on the display unit 107 by using the number of the query images in which the similar image satisfies a reference (i.e., the similar image is similar). At this time, the display control unit 630 displays, on a display unit, the plurality of similar images together with the number of the query images in which the similar image satisfies the reference or information that can determine the query image.

Note that, when the similar image selection unit 620 selects the similar image, the similar image selection unit 620 may use a condition that a degree of similarity as to each of a reference number or more of query images satisfies a reference. Note that, the reference number is an integer of one or more (preferably two or more), and is set by a user input, for example.

Figure 41:
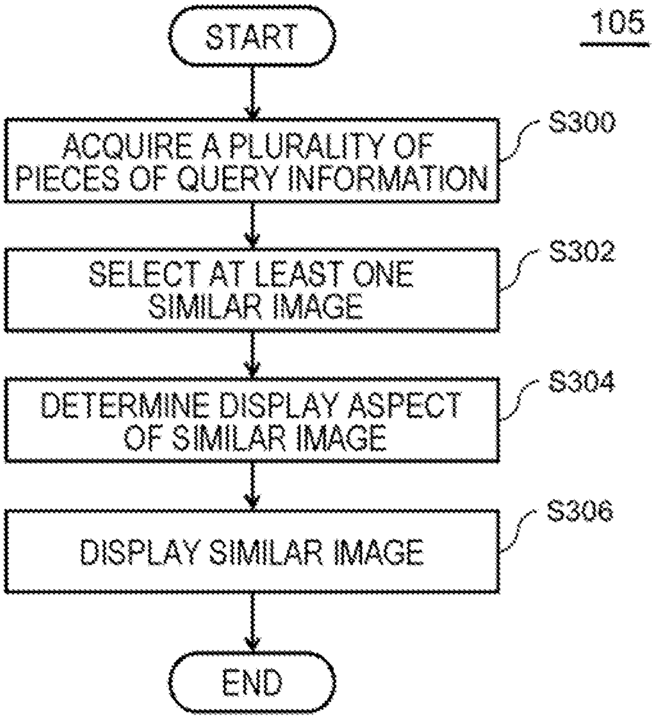
FIG. 41 is a flowchart illustrating one example of processing performed by the search unit 105 according to the search method 6.

FIG. 41 is a flowchart illustrating one example of processing performed by the search unit 105 in the present search method. First, the query acquisition unit 610 acquires information that determines a plurality of query images according to an input from a user, and acquires, as query information, information (for example, the pose information described above) indicating a feature of each of the plurality of query images (step S300). For example, the query acquisition unit 610 displays, on the display unit 107, at least some of images stored in the database 110. Then, the user performs an input for selecting a query image from the images displayed on the display unit 107. Then, the query acquisition unit 610 reads pose information associated with the selected query image from the database 110.

Next, the similar image selection unit 620 selects at least one similar image from the images stored in the database 110 by using the plurality of pieces of query information. Herein, the similar image selection unit 620 selects, as the similar image, an image similar to at least one of the query images. Then, the similar image selection unit 620 counts, for each similar image, the number of the query images to which the similar image is similar (step S302).

Next, the display control unit 630 determines a display aspect of the similar image selected in step S302 (step S304), and displays the similar image in the determined display aspect on the display unit 107 (step S306).

Note that, query images selected by the user may be similar to each other. In other words, query images selected by the user may have a feature of the same type. As one example, when all of a plurality of query images include a person, the person included in the plurality of query images has the same pose (for example, sitting in a chair, standing, reaching out a right hand, reaching out a left hand, or the like). In this case, the similar image selection unit 620 selects, as a similar image, an image having the feature common to the query images.

Further, a type of a feature indicated by at least one query image (hereinafter, described as a first query image) selected by the user may have a feature of a different type from that of another query image (hereinafter, described as a second query image). In this case, the similar image selection unit 620 selects, as a similar image, an image having both of the feature of the first query image and the feature of the second query image.

As one example, when a query image includes a person, a first feature indicates a pose (for example, sitting, standing, or walking) of a whole body of the person, and a second feature indicates a state of a specific portion (for example, a face, a right hand, a left hand, a right foot, or a left foot) of the body of the person. As an example in this case, the first feature indicates that the person is sitting, and the second feature indicates that the right hand of the person is being reached out. In this case, the similar image selection unit 620 selects, as a similar image, an image including a person who is sitting in a chair and also reaches out a right hand.

As another example, the first feature is a feature value of a first object, and the second feature is a feature value of a second object. In this case, the similar image selection unit 620 selects, as a similar image, an image including both of the first object and the second object.

Figure 42:
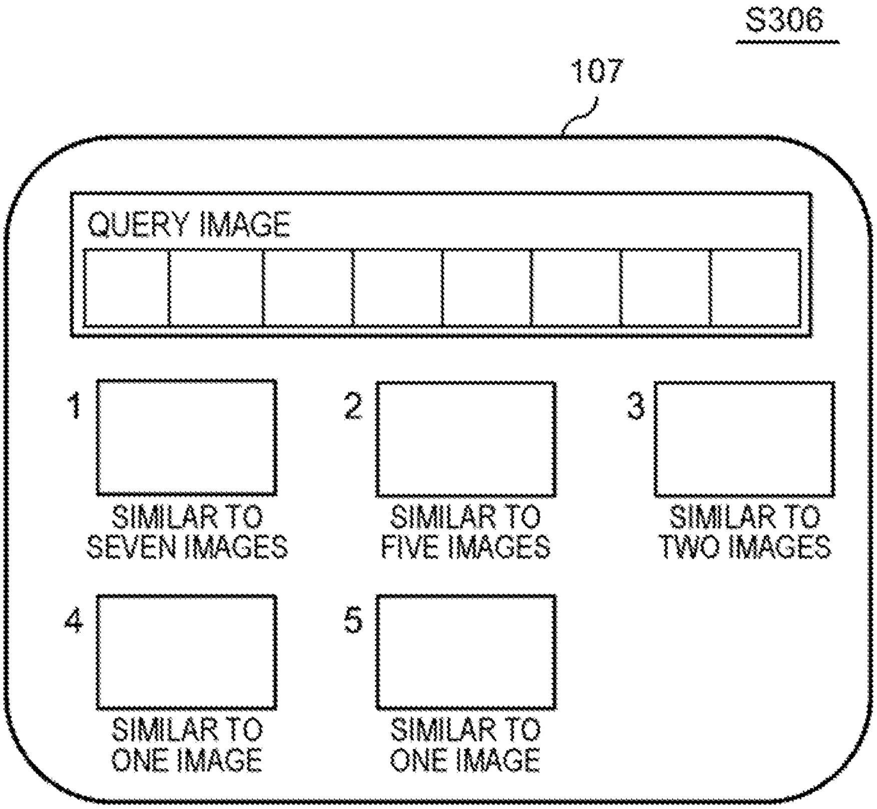
FIG. 42 is a diagram illustrating a first example of a display aspect of a similar image in step S306.

FIG. 42 is a diagram illustrating a first example of a display aspect of the similar image in step S306. In the example illustrated in FIG. 42, the display control unit 630 displays all image used as a query image on the display unit 107, and also determines a display position or a display order of a plurality of the similar images by using the number of the query images to which the similar images are similar. Furthermore, the display control unit 630 displays information indicating the number of the query images to which the similar images are similar near each of the similar images on the display unit 107.

One similar image may be similar to a plurality of query images. Then, when the number of the similar query images increases, a possibility that the similar image is an image desired by a user increases. Thus, magnitude of the number of the similar query images is important information. In the present example, by indicating similar images for a user and causing a display position of the similar images to be recognized by the user, magnitude of the number of the similar query images can be notified to the user.

Figure 43:
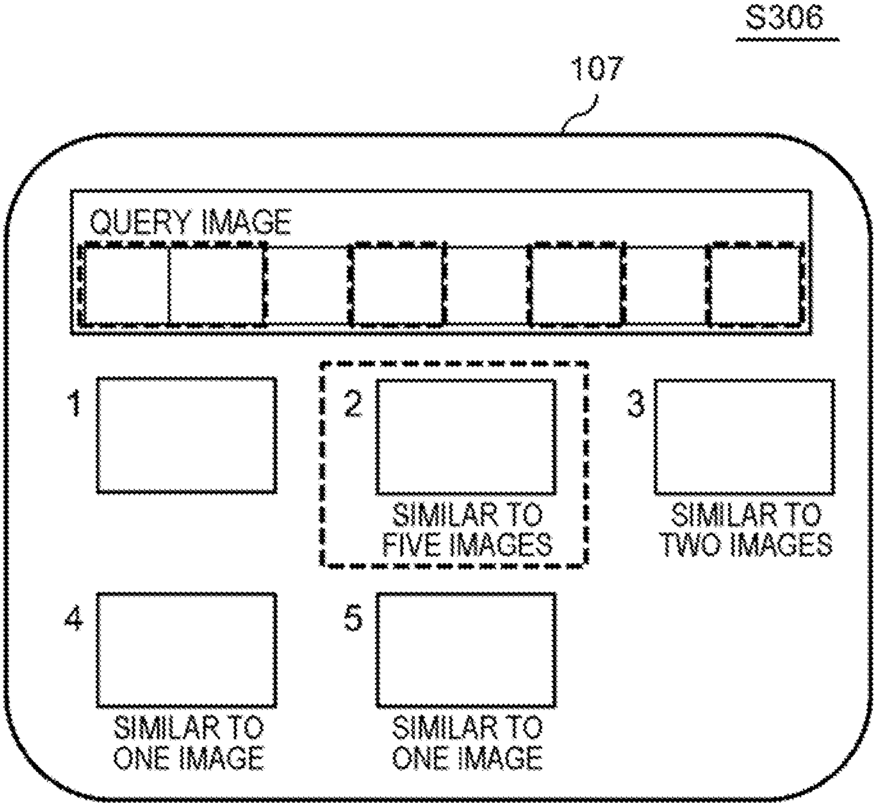
FIG. 43 is a diagram illustrating a second example of a display aspect of the similar image in step S306.

FIG. 43 is a diagram illustrating a second example of a display aspect of the similar image in step S306. Also in the example illustrated in FIG. 43, similarly to the example illustrated in FIG. 42, the display control unit 630 displays all image used as a query image on the display unit 107, and also decides a display position or a display order of a plurality of the similar images by using the number of the query images to which the similar images are similar. Then, when information indicating that at least one of the similar images is selected is input by a user, the display control unit 630 displays, on the display unit 107, all the query image in which the at least one of the similar images satisfies a reference, i.e., the query image determined to be similar to the similar image in an identifiable state from the other query image. In such a manner, the query images similar to the similar image can be directly confirmed by the user.

In the example illustrated in FIG. 43, the display control unit 630 encloses both of a selected similar image and a query image similar to the similar image by the same frame line. Note that, when the user selects a first similar image and a second similar image, the display control unit 630 encloses the first similar image and a query image similar to the first similar image by a first frame line, and encloses the second similar image and a query image similar to the second similar image by a second frame line. Herein, the first frame line and the second frame line are different from each other in at least one of types of a color and a line (for example, a solid line, a dotted line, a dot-and-dash line, and the like). Note that, a mark may be used instead of the frame line.

Figure 44:
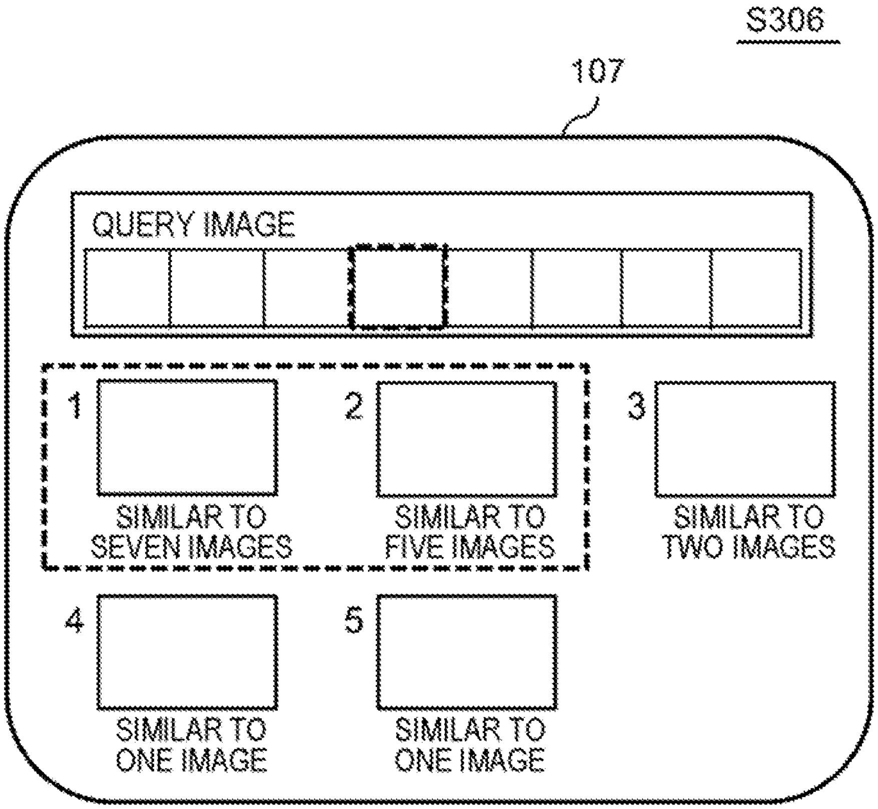
FIG. 44 is a diagram illustrating a third example of a display aspect of the similar image in step S306.

FIG. 44 is a diagram illustrating a third example of a display aspect of the similar image in step S306. Also in the example illustrated in FIG. 44, similarly to the example illustrated in FIG. 42, the display control unit 630 displays all image used as a query image on the display unit 107, and also decides a display position or a display order of a plurality of similar images by using the number of the query images to which the similar images are similar. Then, when information indicating that at least one query image is selected is input by a user, the display control unit 630 displays, on the display unit 107, all of the similar images in which the at least one query image satisfies a reference, i.e., the similar images similar to the query image in an identifiable state from the other similar image. In such a manner, the similar images similar to the query image can be directly confirmed by the user.

In the example illustrated in FIG. 44, the display control unit 630 encloses both of a selected query image and a similar image similar to the query image by the same frame line. In this case, when the user selects a first query image and a second query image, the display control unit 630 encloses the first query image and a similar image similar to the first query image by a first frame line, and encloses the second query image and a similar image similar to the second query image by a second frame line. Also in this example, the first frame line and the second frame line are different from each other in at least one of types of a color and a line (for example, a solid line, a dotted line, a dot-and-dash line, and the like). Note that, a mark may be used instead of the frame line.

Figure 45:
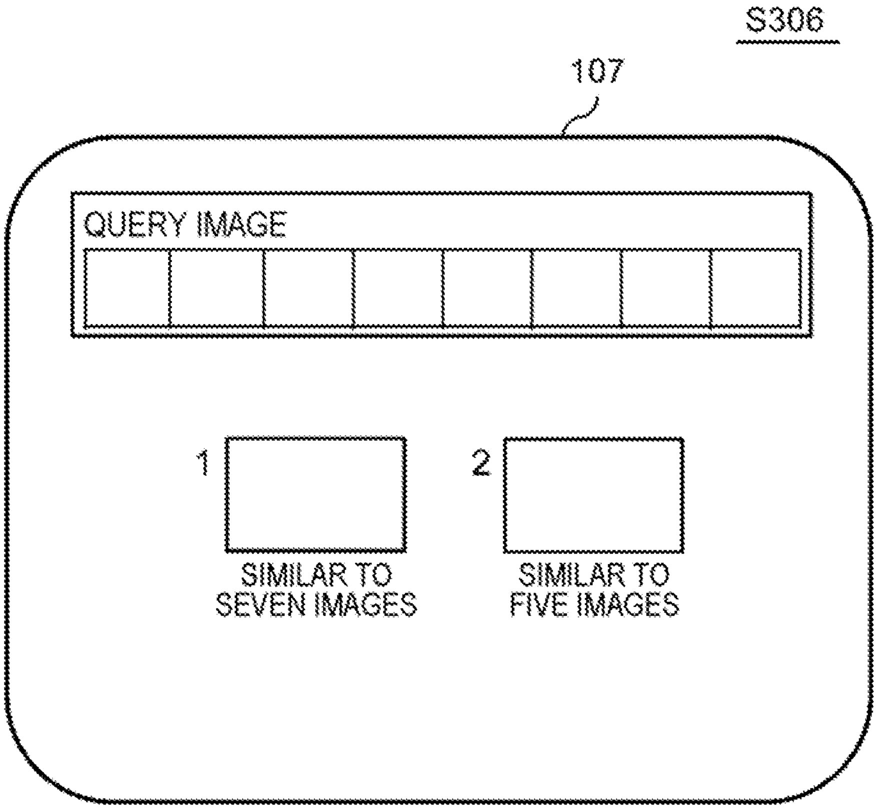
FIG. 45 is a diagram illustrating a fourth example of a display aspect of the similar image in step S306.

FIG. 45 is a diagram illustrating a fourth example of a display aspect of the similar image in step S306. In the example illustrated in FIG. 45, the similar image selection unit 620 selects, as a similar image, an image in which a similar query image is equal to or more than a reference number. Then, the display control unit 630 displays all image used as a query image on the display unit 107, and also displays the similar image selected by the similar image selection unit 620 on the display unit 107. In such a manner, a user can confirm the similar image by viewing the display unit 107, and can also confirm a fact that the query image similar to the similar image is equal to or more than the reference number.

Note that, also in the example illustrated in FIG. 45, the display control unit 630 decides a display position or a display order of a plurality of the similar images by using the number of the query images to which the similar images are similar.

Figure 46:
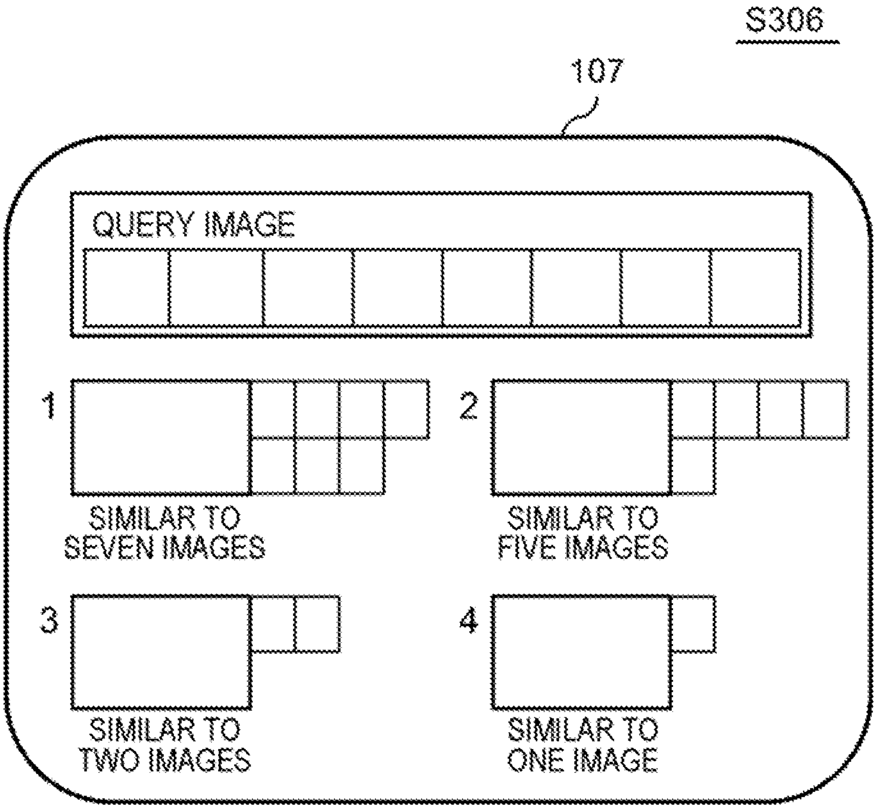
FIG. 46 is a diagram illustrating a fifth example of a display aspect of the similar image in step S306.

FIG. 46 is a diagram illustrating a fifth example of a display aspect of the similar image in step S306. Also in the example illustrated in FIG. 46, similarly to the example illustrated in FIG. 42, the display control unit 630 displays all image used as a query image on the display unit 107, and also decides a display position or a display order of a plurality of similar images by using the number of the query images to which the similar images are similar. Then, the display control unit 630 displays, on the display unit 107, each of the plurality of similar images together with the query image to which the similar image is similar. In such a manner, the query image similar to the similar image can be directly confirmed by the user.

In the example illustrated in FIG. 46, the display control unit 630 displays, next to a similar image, a query image to which the similar image is similar in a smaller size than the similar image.

Note that, an image being a target by the present search method is not limited to an image including a person. Further, an image being a target may be one image, or may be a video formed of a plurality of frame images.

As described above, in the present example embodiment, a skeleton structure of a person can be detected from a two-dimensional image, and classification and a search can be performed based on a feature value of the detected skeleton structure. In this way, classification can be performed for each similar pose having a high degree of similarity, and a similar pose having a high degree of similarity to a search query (search key) can be searched. By classifying similar poses from an image and displaying the similar poses, a user can recognize a pose of a person in the image without specifying a pose and the like. Since the user can specify a pose being a search query from a classification result, a desired pose can be searched for even when a pose desired to be searched for by a user is not recognized in detail in advance. For example, since classification and a search can be performed with a whole or a part of a skeleton structure of a person and the like as a condition, flexible classification and a flexible search can be performed.

(Example Embodiment 2) An example embodiment 2 will be described below with reference to the drawings. In the present example embodiment, a specific example of the feature value computation in the example embodiment 1 will be described. In the present example embodiment, a feature value is acquired by normalization by using a height of a person. The other points are similar to those in the example embodiment 1.

Figure 18:
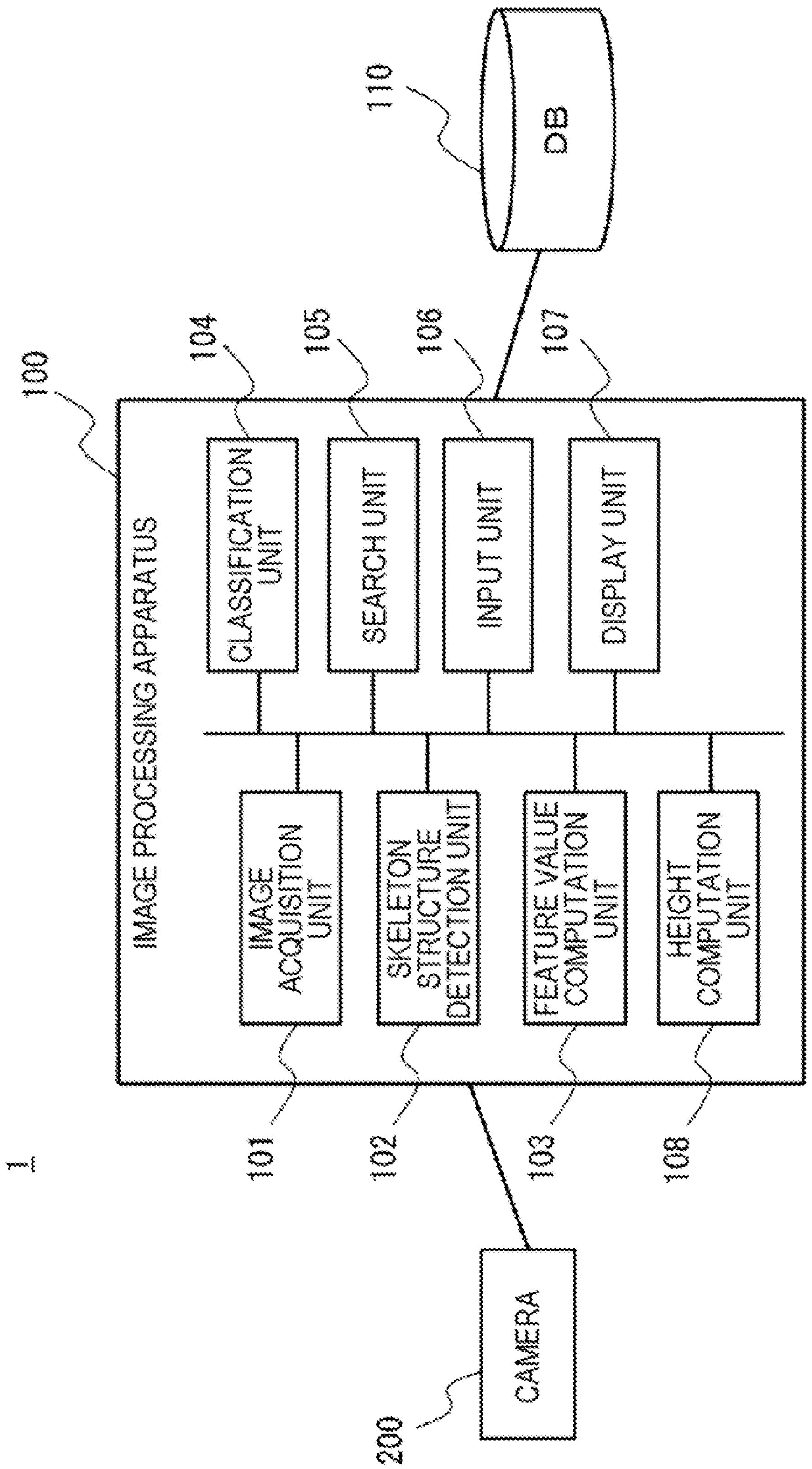
FIG. 18 is a configuration diagram illustrating a configuration of an image processing apparatus according to an example embodiment 2.

FIG. 18 illustrates a configuration of an image processing apparatus 100 according to the present example embodiment. As illustrated in FIG. 18, the image processing apparatus 100 further includes a height computation unit 108 in addition to the configuration in the example embodiment 1. Note that, a feature value computation unit 103 and the height computation unit 108 may serve as one processing unit.

The height computation unit (height estimation unit) 108 computes (estimates) an upright height (referred to as a height pixel count) of a person in a two-dimensional image, based on a two-dimensional skeleton structure detected by a skeleton structure detection unit 102. It can be said that the height pixel count is a height of a person in a two-dimensional image (a length of a whole body of a person on a two-dimensional image space). The height computation unit 108 acquires a height pixel count (pixel count) from a length (length on the two-dimensional image space) of each bone of a detected skeleton structure.

In the following examples, specific examples 1 to 3 are used as a method for acquiring a height pixel count. Note that, any method of the specific examples 1 to 3 may be used, or a plurality of any selected methods may be combined and used. In the specific example 1, a height pixel count is acquired by adding up lengths of bones from a head to a foot among bones of a skeleton structure. When the skeleton structure detection unit 102 (skeleton estimation technique)

does not output a top of a head and a foot, a correction can be performed by multiplication by a constant as necessary. In the specific example 2, a height pixel count is computed by using a human model indicating a relationship between a length of each bone and a length of a whole body (a height on the two-dimensional image space). In the specific example 3, a height pixel count is computed by fitting (applying) a three-dimensional human model to a two-dimensional skeleton structure.

The feature value computation unit 103 according to the present example embodiment is a normalization unit that normalizes a skeleton structure (skeleton information) of a person, based on a computed height pixel count of the person. The feature value computation unit 103 stores a feature value (normalization value) of the normalized skeleton structure in a database 110. The feature value computation unit 103 normalizes, by the height pixel count, a height on an image of each keypoint (feature point) included in the skeleton structure. In the present example embodiment, for example, a height direction is an up-down direction (Y-axis direction) in a two-dimensional coordinate (X-Y coordinate) space of an image. In this case, a height of a keypoint can be acquired from a value (pixel count) of a Y coordinate of the keypoint. Alternatively, a height direction may be a direction (vertical projection direction) of a vertical projection axis in which a direction of a vertical axis perpendicular to the ground (reference surface) in a three-dimensional coordinate space in a real world is projected in the two-dimensional coordinate space. In this case, a height of a keypoint can be acquired from a value (pixel count) along a vertical projection axis, the vertical projection axis being acquired by projecting an axis perpendicular to the ground in the real world to the two-dimensional coordinate space, based on a camera parameter. Note that, the camera parameter is a capturing parameter of an image, and, for example, the camera parameter is a pose, a position, a capturing angle, a focal distance, and the like of a camera 200. The camera 200 captures an image of an object whose length and position are clear in advance, and a camera parameter can be acquired from the image. A strain may occur at both ends of the captured image, and the vertical direction in the real world and the up-down direction in the image may not match. In contrast, an extent that the vertical direction in the real world is tilted in an image is clear by using a parameter of a camera that captures the image. Thus, a feature value of a keypoint can be acquired in consideration of a difference between the real world and the image by normalizing, by a height, a value of the keypoint along a vertical projection axis projected in the image, based on the camera parameter. Note that, a left-right direction (a horizontal direction) is a direction (X-axis direction) of left and right in a two-dimensional coordinate (X-Y coordinate) space of an image, or is a direction in which a direction parallel to the ground in the three-dimensional coordinate space in the real world is projected to the two-dimensional coordinate space.

Figure 19:
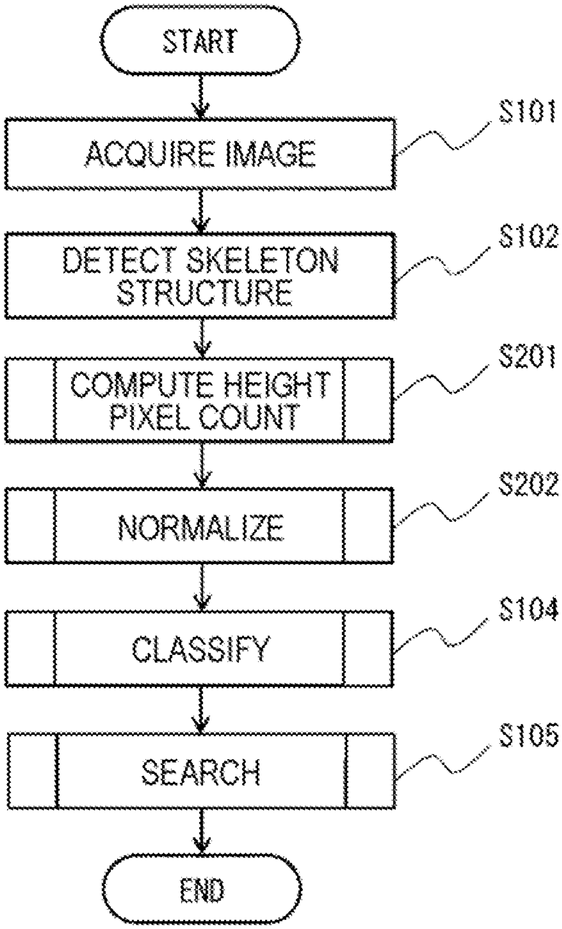
FIG. 19 is a flowchart illustrating an image processing method according to the example embodiment 2.
Figure 20:
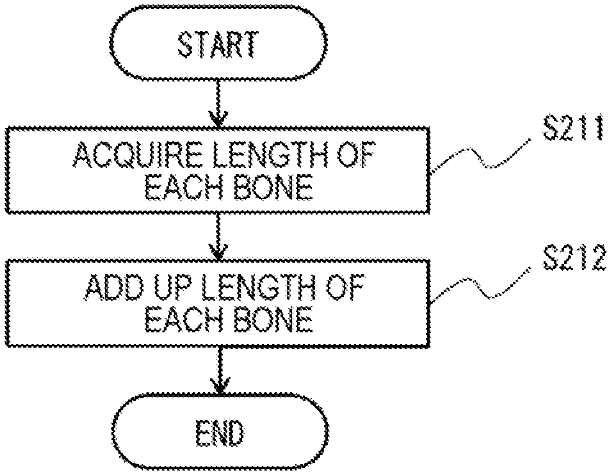
FIG. 20 is a flowchart illustrating a specific example 1 of a height pixel count computation method according to the example embodiment 2.
Figure 21:
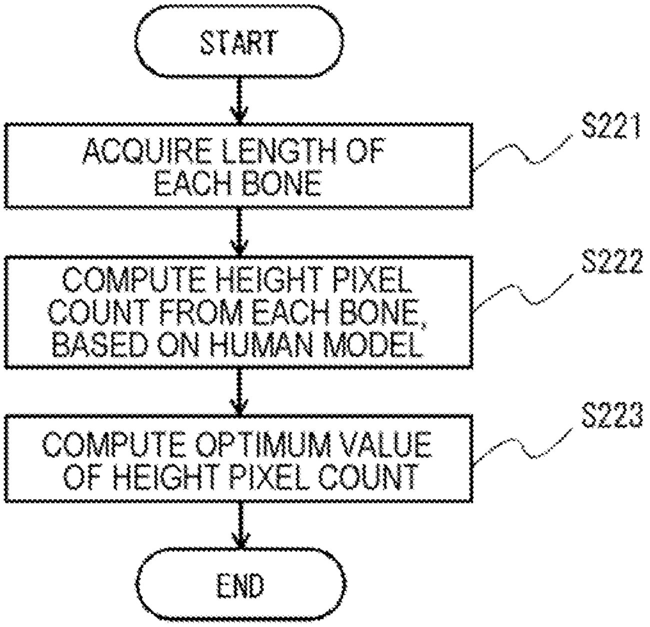
FIG. 21 is a flowchart illustrating a specific example 2 of the height pixel count computation method according to the example embodiment 2.
Figure 22:
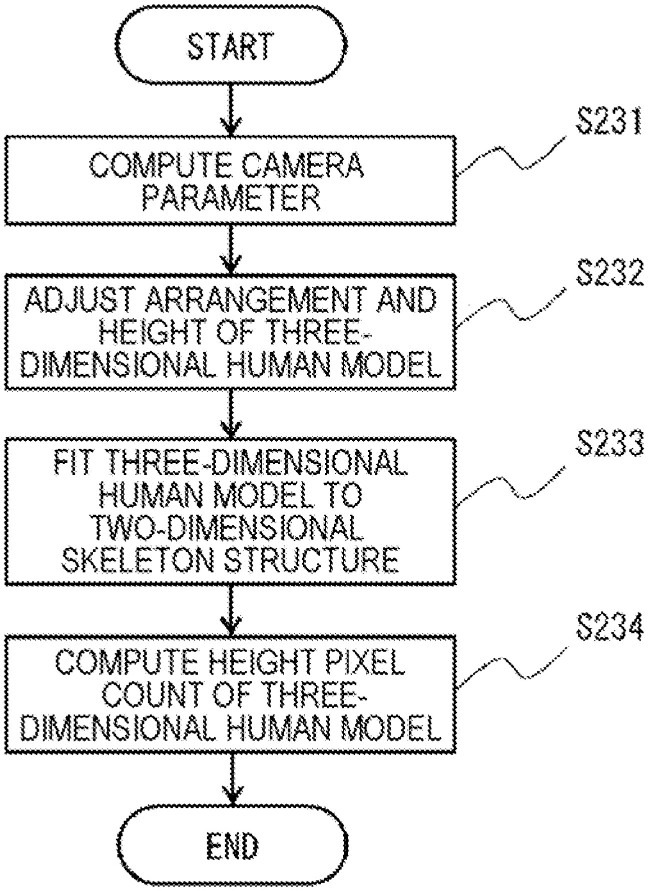
FIG. 22 is a flowchart illustrating the specific example 3 of the height pixel count computation method according to the example embodiment 2.
Figure 23:
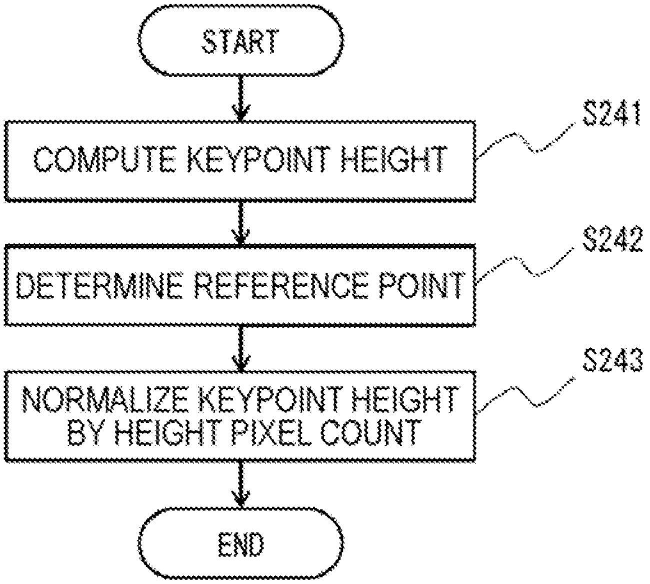
FIG. 23 is a flowchart illustrating a normalization method according to the example embodiment 2.

FIGS. 19 to 23 illustrate operations of the image processing apparatus 100 according to the present example embodiment. FIG. 19 illustrates a flow from image acquisition to search processing in the image processing apparatus 100, FIGS. 20 to 22 illustrate flows of specific examples 1 to 3 of height pixel count computation processing (S201) in FIG. 19, and FIG. 23 illustrates a flow of normalization processing (S202) in FIG. 19.

As illustrated in FIG. 19, in the present example embodiment, the height pixel count computation processing (S201) and the normalization processing (S202) are performed as the feature value computation processing (S103) in the example embodiment 1. The other points are similar to those in the example embodiment 1.

Figure 24:
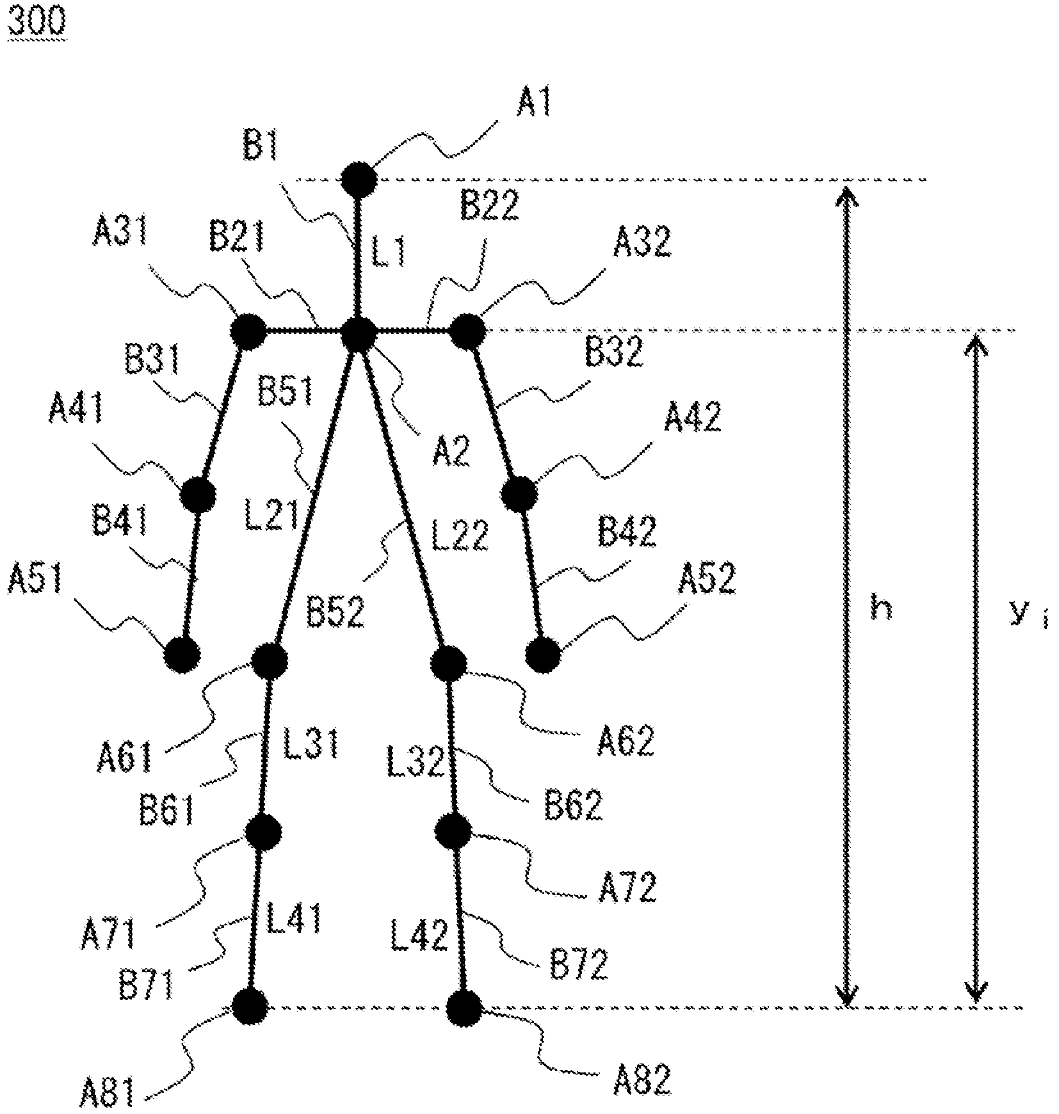
FIG. 24 is a diagram illustrating a human model according to the example embodiment 2.

The image processing apparatus 100 performs the height pixel count computation processing (S201), based on a detected skeleton structure, after the image acquisition (S101) and skeleton structure detection (S102). In this example, as illustrated in FIG. 24, a height of a skeleton structure of an upright person in an image is a height pixel count (h), and a height of each keypoint of the skeleton structure in the state of the person in the image is a keypoint height (yi). Hereinafter, the specific examples 1 to 3 of the height pixel count computation processing will be described.

<Specific Example 1> In the specific example 1, a height pixel count is acquired by using a length of a bone from a head to a foot. In the specific example 1, as illustrated in FIG. 20, the height computation unit 108 acquires a length of each bone (S211), and adds up the acquired length of each bone (S212).

The height computation unit 108 acquires a length of a bone from a head to a foot of a person on a two-dimensional image, and acquires a height pixel count. In other words, each length (pixel count) of a bone B1 (length L1), a bone B51 (length L21), a bone B61 (length L31), and a bone B71 (length L41), or the bone B1 (length L1), a bone B52 (length L22), a bone B62 (length L32), and a bone B72 (length L42) among bones in FIG. 24 is acquired from the image in which the skeleton structure is detected. A length of each bone can be acquired from coordinates of each keypoint in the two-dimensional image. A value acquired by multiplying, by a correction constant, L1+L21+L31+L41 or L1+L22+L32+L42, acquired by adding them up, is computed as the height pixel count (h). When both values can be computed, a longer value is set as the height pixel count, for example. In other words, each bone has a longest length in an image when being captured from the front, and is displayed to be short when being tilted in a depth direction with respect to a camera. Therefore, it is conceivable that a longer bone has a higher possibility of being captured from the front, and has a value closer to a true value. Thus, a longer value is preferably selected.

Figure 25:
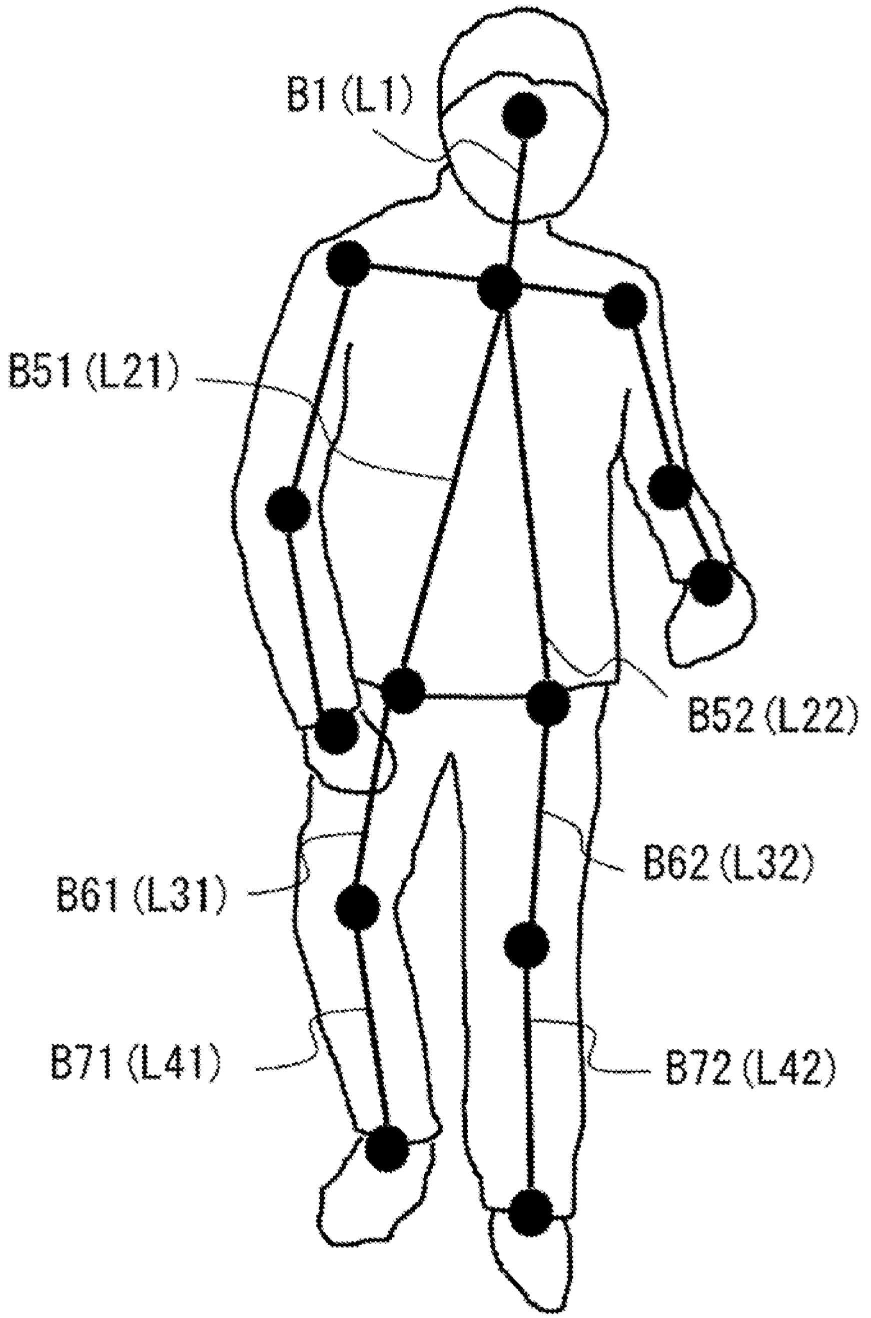
FIG. 25 is a diagram illustrating a detection example of a skeleton structure according to the example embodiment 2.

In an example in FIG. 25, the bone B1, the bone B51 and the bone B52, the bone B61 and the bone B62, and the bone B71 and the bone B72 are each detected without overlapping. L1+L21+L31+L41 and L1+L22+L32+L42 that are a total of the bones are acquired, and, for example, a value acquired by multiplying, by a correction constant, L1+L22+L32+L42 on a left leg side having a greater length of the detected bones is set as the height pixel count.

Figure 26:
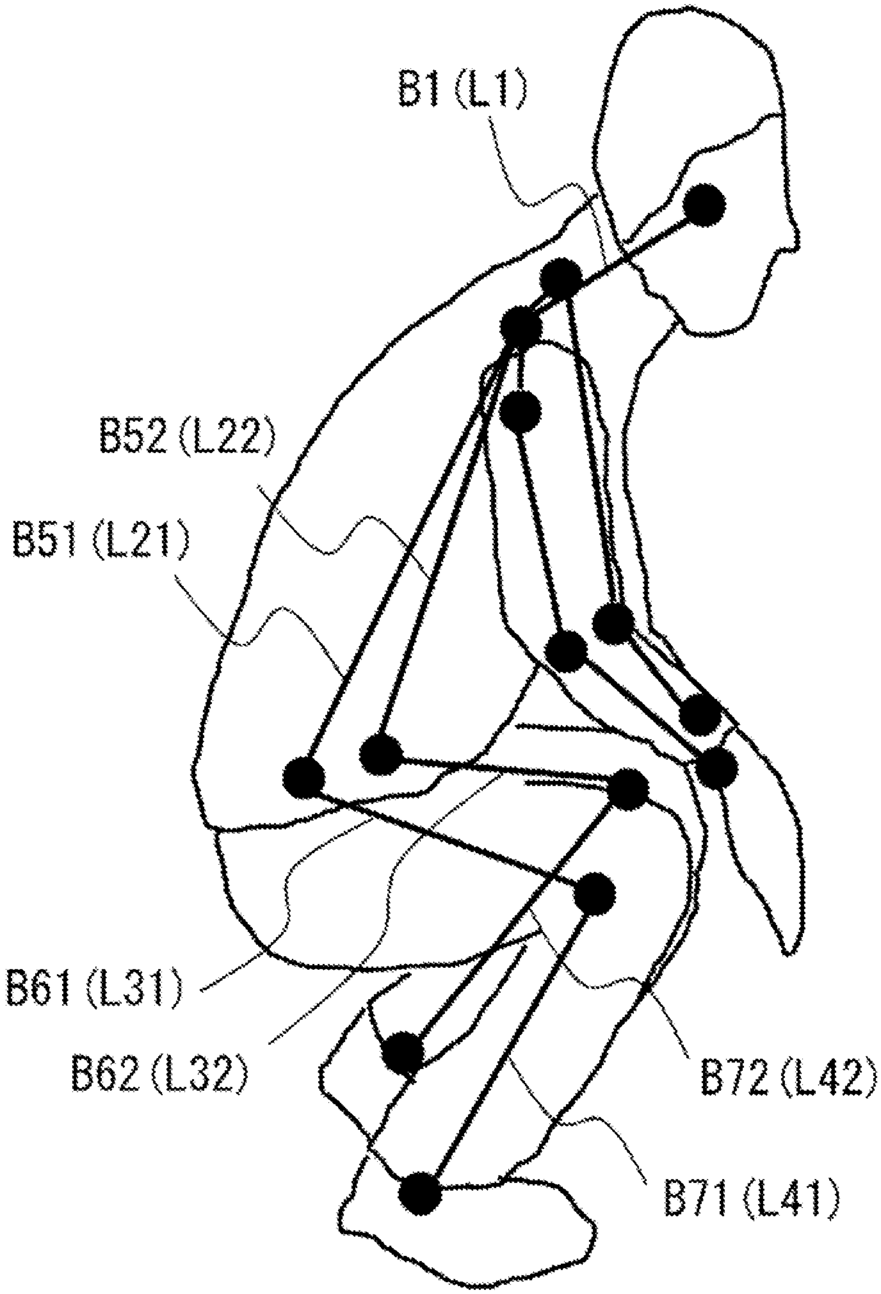
FIG. 26 is a diagram illustrating a detection example of a skeleton structure according to the example embodiment 2.

In an example in FIG. 26, the bone B1, the bone B51 and the bone B52, the bone B61 and the bone B62, and the bone B71 and the bone B72 are each detected, and the bone B61 and the bone B71 of a right leg, and the bone B62 and the bone B72 of a left leg overlap. L1+L21+L31+L41 and L1+L22+L32+L42 that are a total of the bones are acquired, and, for example, a value acquired by multiplying, by a correction constant, L1+L21+L31+L41 on a right leg side having a greater length of the detected bones is set as the height pixel count.

Figure 27:
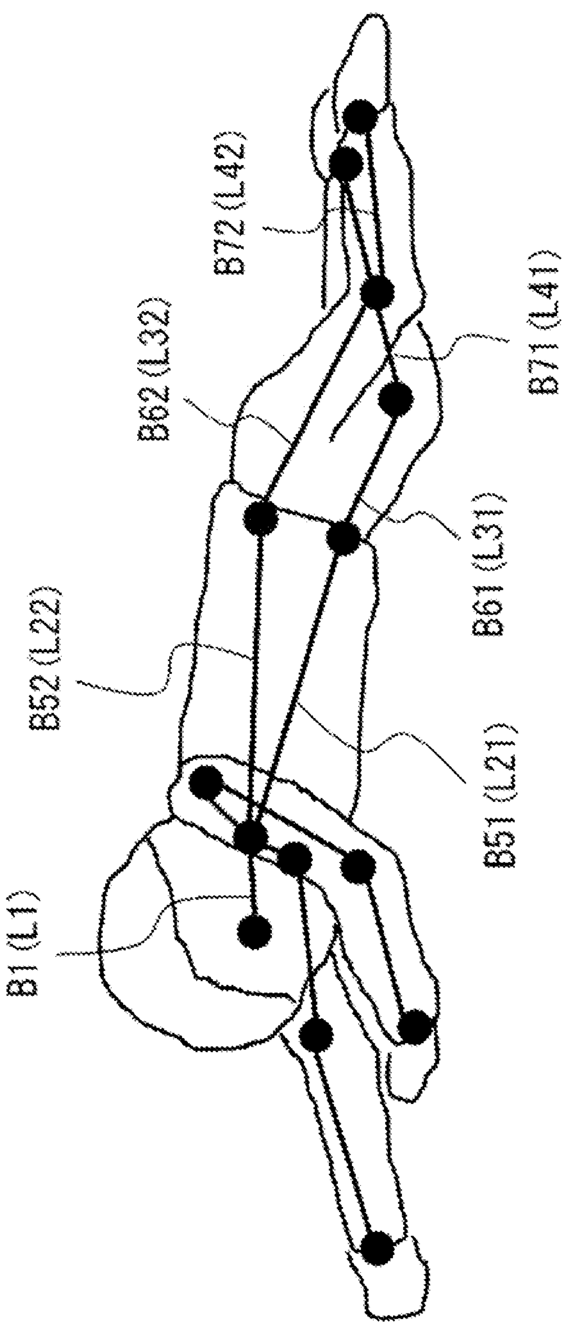
FIG. 27 is a diagram illustrating a detection example of a skeleton structure according to the example embodiment 2.

In an example in FIG. 27, the bone B1, the bone B51 and the bone B52, the bone B61 and the bone B62, and the bone B71 and the bone B72 are each detected, and the bone B61 and the bone B71 of the right leg and the bone B62 and the bone B72 of the left leg overlap. L1+L21+L31+L41 and L1+L22+L32+L42 that are a total of the bones are acquired, and, for example, a value acquired by multiplying, by a correction constant, L1+L22+L32+L42 on the left leg side having a greater length of the detected bones is set as the height pixel count.

In the specific example 1, since a height can be acquired by adding up lengths of bones from a head to a foot, a height pixel count can be acquired by a simple method. Further, since at least a skeleton from a head to a foot may be able to be detected by a skeleton estimation technique using machine learning, a height pixel count can be accurately estimated even when the entire person is not necessarily captured in an image as in a squatting state and the like.

<Specific Example 2> In the specific example 2, a height pixel count is acquired by using a two-dimensional skeleton model indicating a relationship between a length of a bone included in a two-dimensional skeleton structure and a length of a whole body of a person on a two-dimensional image space.

Figure 28:
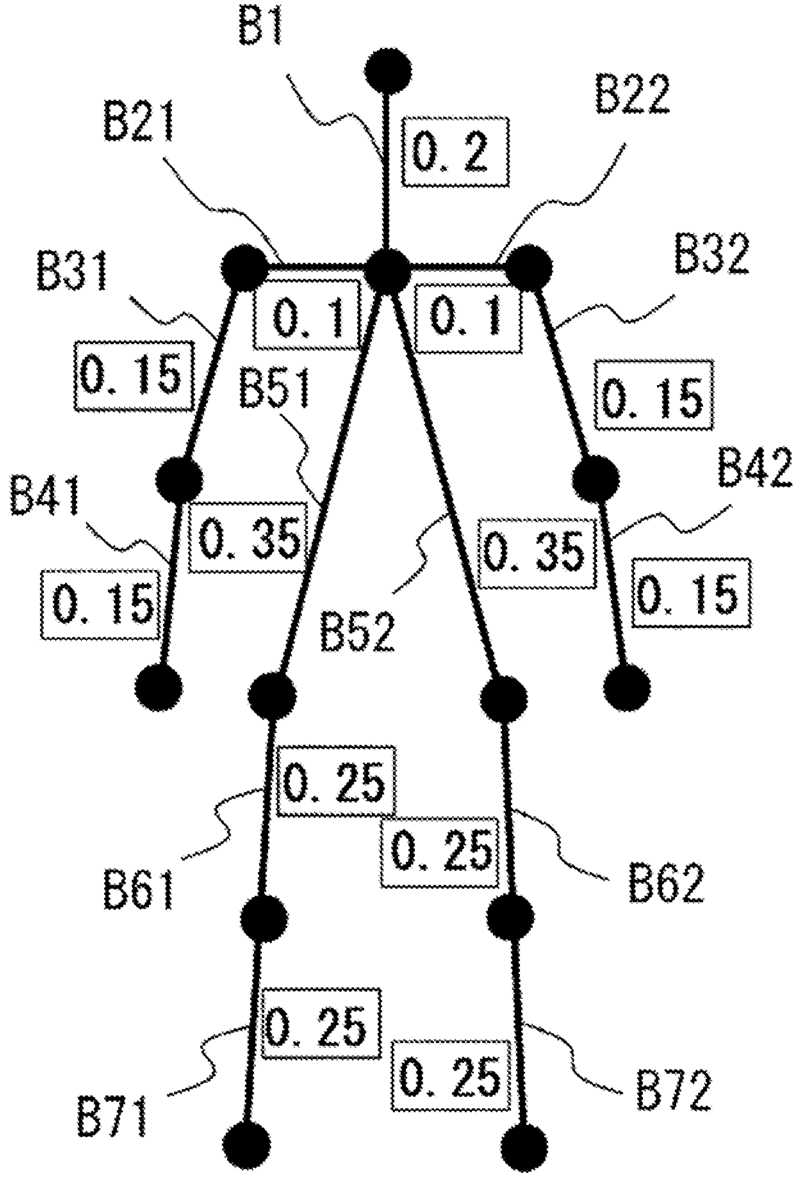
FIG. 28 is a diagram illustrating a human model according to the example embodiment 2.

FIG. 28 is a human model (two-dimensional skeleton model) 301 that is used in the specific example 2 and indicates a relationship between a length of each bone on the two-dimensional image space and a length of a whole body on the two-dimensional image space. As illustrated in FIG. 28, a relationship between a length of each bone of an average person and a length of a whole body (a proportion of a length of each bone to a length of a whole body) is associated with each bone of the human model 301. For example, a length of the bone B1 of a head is the length of the whole body×0.2 (20%), a length of the bone B41 of a right hand is the length of the whole body×0.15 (15%), and a length of the bone B71 of the right leg is the length of the whole body×0.25 (25%). Information about such a human model 301 is stored in the database 110, and thus an average length of a whole body can be acquired from a length of each bone. In addition to a human model of an average person, a human model may be prepared for each attribute of a person such as age, sex, and nationality. In this way, a length (height) of a whole body can be appropriately acquired according to an attribute of a person.

Figure 29:
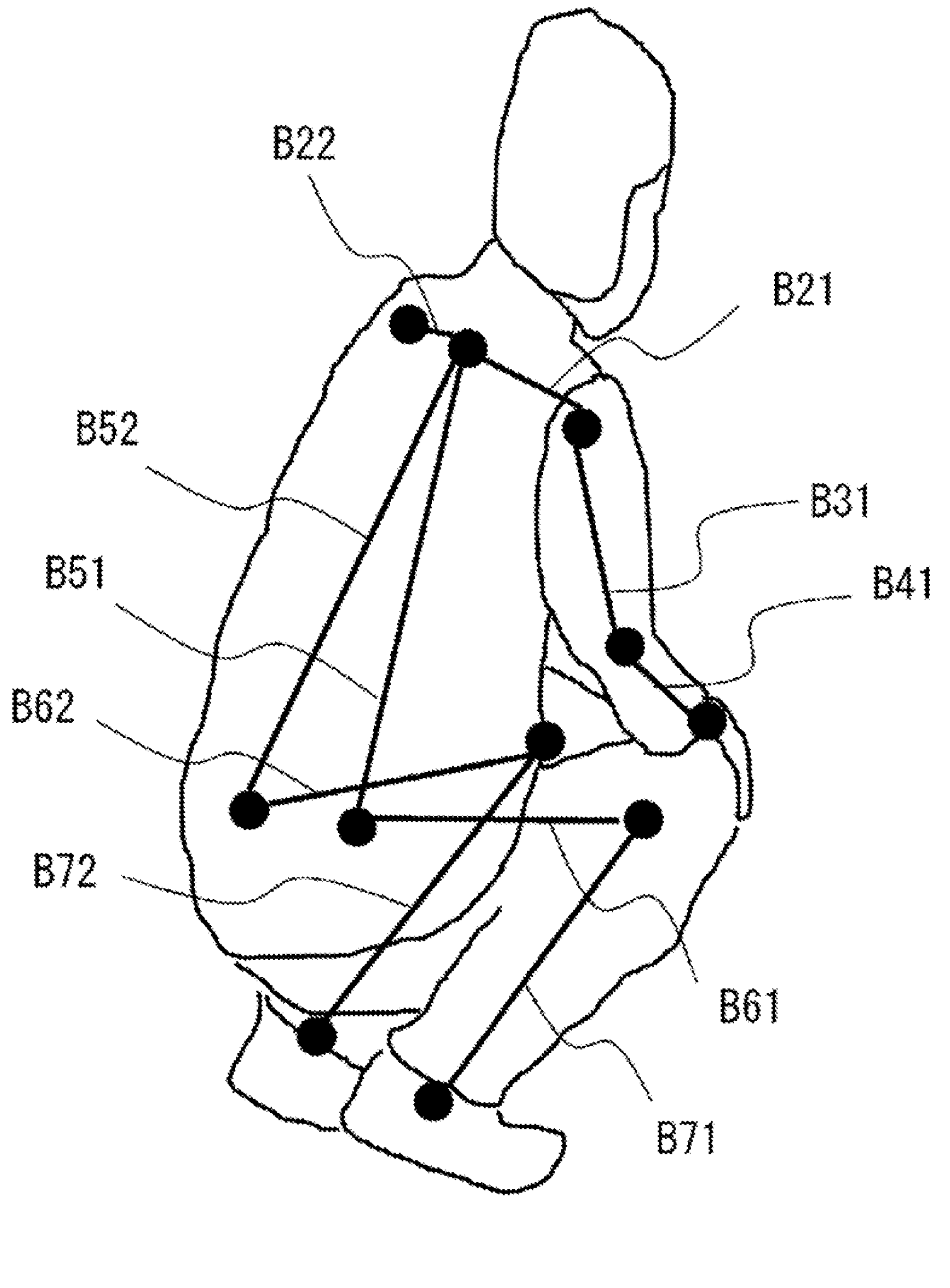
FIG. 29 is a diagram illustrating a detection example of a skeleton structure according to the example embodiment 2.

In the specific example 2, as illustrated in FIG. 21, the height computation unit 108 acquires a length of each bone (S221). The height computation unit 108 acquires a length of all bones (length on the two-dimensional image space) in a detected skeleton structure. FIG. 29 is an example of capturing an image of a person in a squatting state diagonally from rear right and detecting a skeleton structure. In this example, since a face and a left side surface of a person are not captured, a bone of a head and bones of a left arm and a left hand cannot be detected. Thus, each length of bones B21, B22, B31, B41, B51, B52, B61, B62, B71, and B72 that are detected is acquired.

Subsequently, as illustrated in FIG. 21, the height computation unit 108 computes a height pixel count from a length of each bone, based on a human model (S222). The height computation unit 108 refers to the human model 301 indicating a relationship between lengths of each bone and a whole body as in FIG. 28, and acquires a height pixel count from the length of each bone. For example, since a length of the bone B41 of the right hand is the length of the whole body×0.15, a height pixel count based on the bone B41 is acquired from the length of the bone B41/0.15. Further, since a length of the bone B71 of the right leg is the length of the whole body×0.25, a height pixel count based on the bone B71 is acquired from the length of the bone B71/0.25.

The human model referred at this time is, for example, a human model of an average person, but a human model may be selected according to an attribute of a person such as age, sex, and nationality. For example, when a face of a person is captured in a captured image, an attribute of the person is identified based on the face, and a human model associated with the identified attribute is referred. An attribute of a person can be recognized from a feature of a face in an image by referring to information acquired by performing machine learning on a face for each attribute. Further, when an attribute of a person cannot be identified from an image, a human model of an average person may be used.

Further, a height pixel count computed from a length of a bone may be corrected by a camera parameter. For example, when a camera is placed in a high position and performs capturing in such a way that a person is looked down, a horizontal length such as a bone of a shoulder width is not affected by a dip of the camera in a two-dimensional skeleton structure, but a vertical length such as a bone from a neck to a waist is reduced as a dip of the camera increases. Then, a height pixel count computed from the horizontal length such as a bone of a shoulder width tends to be greater than an actual height pixel count. Thus, when a camera parameter is used, an angle at which a person is looked down by the camera is clear, and thus a correction can be performed in such a way as to acquire a two-dimensional skeleton structure captured from the front by using information about the dip. In this way, a height pixel count can be more accurately computed.

Figure 30:
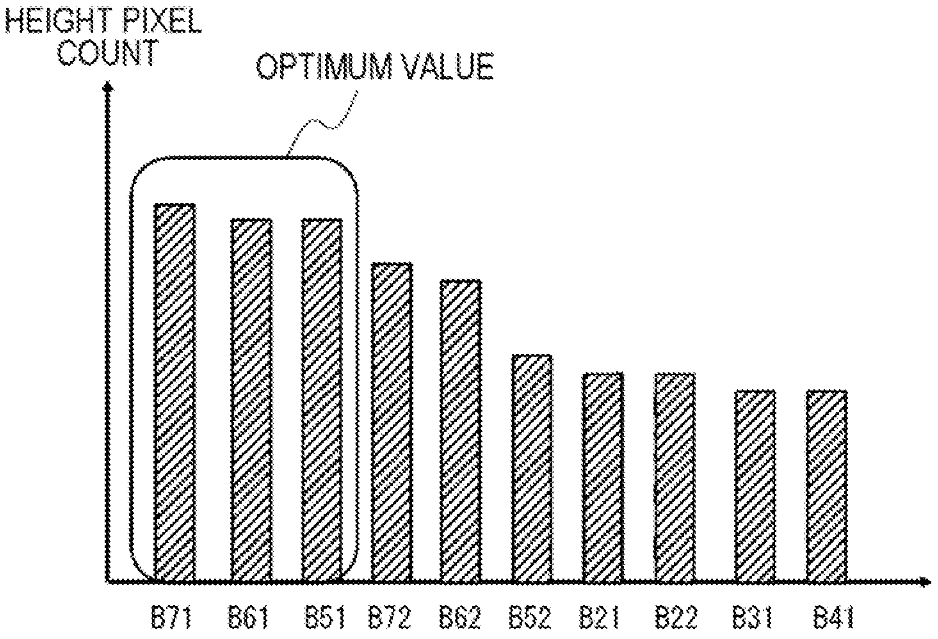
FIG. 30 is a histogram for describing the height pixel count computation method according to the example embodiment 2.

Subsequently, as illustrated in FIG. 21, the height computation unit 108 computes an optimum value of the height pixel count (S223). The height computation unit 108 computes an optimum value of the height pixel count from the height pixel count acquired for each bone. For example, a histogram of a height pixel count acquired for each bone as illustrated in FIG. 30 is generated, and a great height pixel count is selected from among the height pixel counts. In other words, a longer height pixel count is selected from among a plurality of height pixel counts acquired based on a plurality of bones. For example, values in top 30% are regarded valid, and height pixel counts by the bones B71, B61, and B51 are selected in FIG. 30. An average of the selected height pixel counts may be acquired as an optimum value, or a greatest height pixel count may be set as an optimum value. Since a height is acquired from a length of a bone in a two-dimensional image, when the bone cannot be captured from the front, i.e., when the bone tilted in the depth direction as viewed from the camera is captured, a length of the bone is shorter than that captured from the front. Then, a value having a greater height pixel count has a higher possibility of being captured from the front than a value having a smaller height pixel count and is a more plausible value, and thus a greater value is set as an optimum value.

In the specific example 2, since a height pixel count is acquired based on a bone of a detected skeleton structure by using a human model indicating a relationship between lengths of a bone and a whole body on the two-dimensional image space, a height pixel count can be acquired from some of bones even when not all skeletons from a head to a foot can be acquired. Particularly, a height pixel count can be accurately estimated by adopting a greater value from among values acquired from a plurality of bones.

<Specific Example 3> In the specific example 3, a skeleton vector of a whole body is acquired by fitting a two-dimensional skeleton structure to a three-dimensional human model (three-dimensional skeleton model) and using a height pixel count of the fit three-dimensional human model.

In the specific example 3, as illustrated in FIG. 22, the height computation unit 108 first computes a camera parameter, based on an image captured by the camera 200 (S231). The height computation unit 108 extracts an object whose length is clear in advance from a plurality of images captured by the camera 200, and acquires a camera parameter from a size (pixel count) of the extracted object. Note that, a camera parameter may be acquired in advance, and the acquired camera parameter may be obtained as necessary.

Subsequently, the height computation unit 108 adjusts an arrangement and a height of a three-dimensional human model (S232). The height computation unit 108 prepares, for a detected two-dimensional skeleton structure, the three-dimensional human model for computing a height pixel count, and arranges the three-dimensional human model in the same two-dimensional image, based on the camera parameter. Specifically, a "relative positional relationship between a camera and a person in a real world" is determined from the camera parameter and the two-dimensional skeleton structure. For example, on the basis that a position of the camera has coordinates (0, 0, 0), coordinates (x, y, z) of a position in which a person stands (or sits) are determined. Then, by assuming an image captured when the three-dimensional human model is arranged in the same position (x, y, z) as that of the determined person, the two-dimensional skeleton structure and the three-dimensional human model are superimposed.

Figure 31:
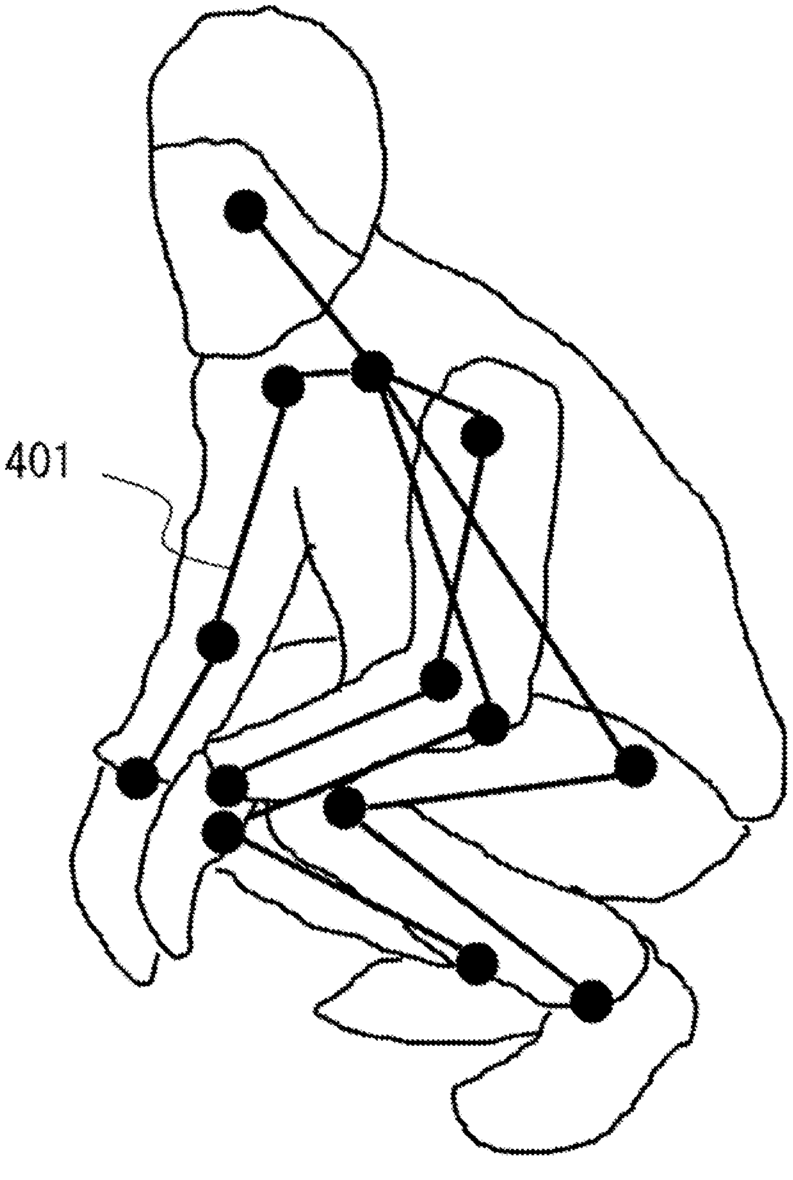
FIG. 31 is a diagram illustrating a detection example of a skeleton structure according to the example embodiment 2.
Figure 32:
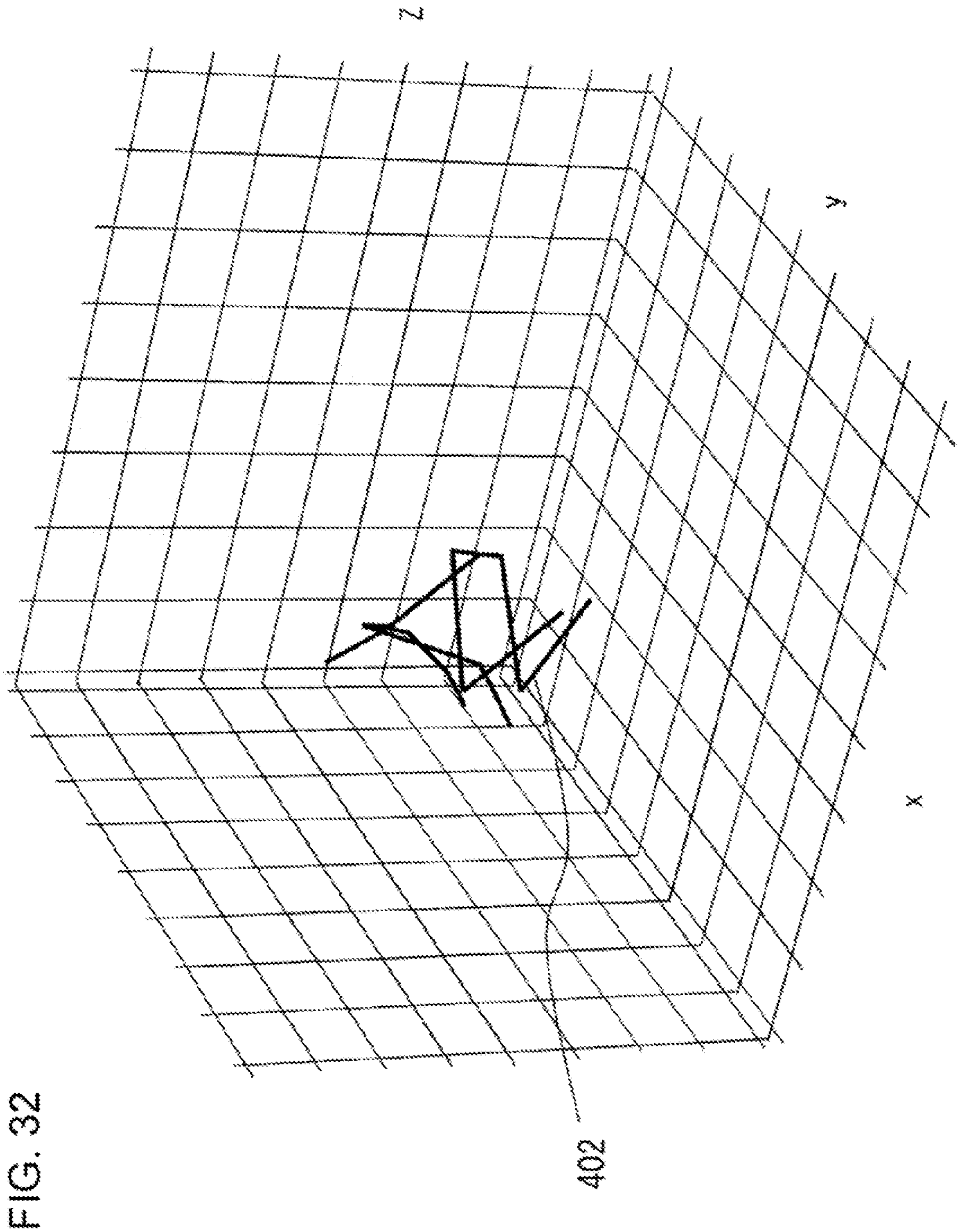
FIG. 32 is a diagram illustrating a three-dimensional human model according to the example embodiment 2.

FIG. 31 is an example of capturing an image of a squatting person diagonally from front left and detecting a two-dimensional skeleton structure 401. The two-dimensional skeleton structure 401 includes two-dimensional coordinate information. Note that, all bones are preferably detected, but some of bones may not be detected. A three-dimensional human model 402 as in FIG. 32 is prepared for the two-dimensional skeleton structure 401. The three-dimensional human model (three-dimensional skeleton model) 402 is a model of a skeleton including three-dimensional coordinate information and having the same shape as that of the two-dimensional skeleton structure 401. Then, as in FIG. 33, the prepared three-dimensional human model 402 is arranged and superimposed on the detected two-dimensional skeleton structure 401. Further, the three-dimensional human model 402 is superimposed on the two-dimensional skeleton structure 401, and a height of the three-dimensional human model 402 is also adjusted to the two-dimensional skeleton structure 401.

Figure 33:
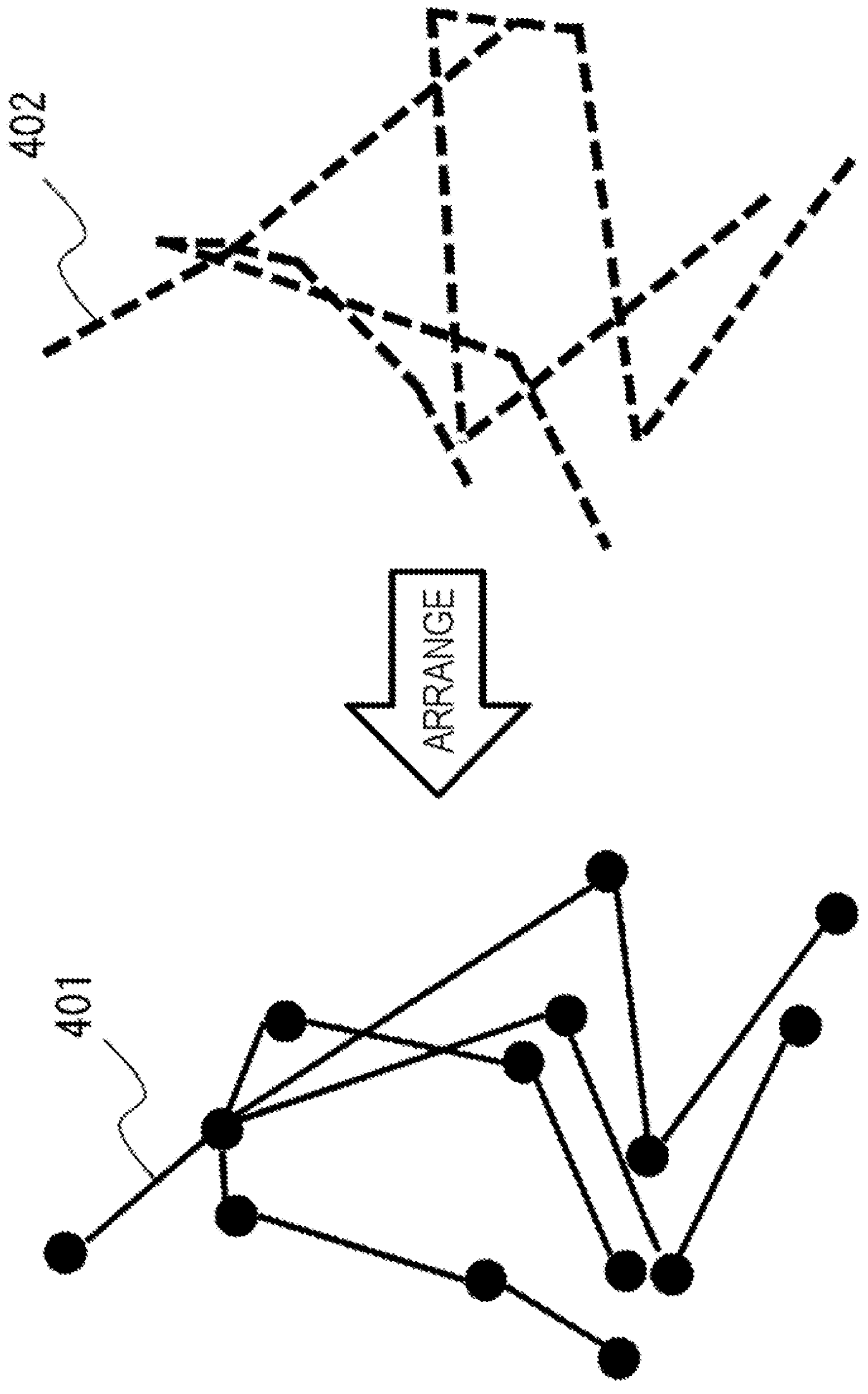
FIG. 33 is a diagram for describing the height pixel count computation method according to the example embodiment 2.

Note that, the three-dimensional human model 402 prepared at this time may be a model in a state close to a pose of the two-dimensional skeleton structure 401 as in FIG. 33, or may be a model in an upright state. For example, the three-dimensional human model 402 with an estimated pose may be generated by using a technique for estimating a pose in a three-dimensional space from a two-dimensional image by using machine learning. A three-dimensional pose can be estimated from a two-dimensional image by learning information about a joint in the two-dimensional image and information about a joint in a three-dimensional space.

Figure 34:
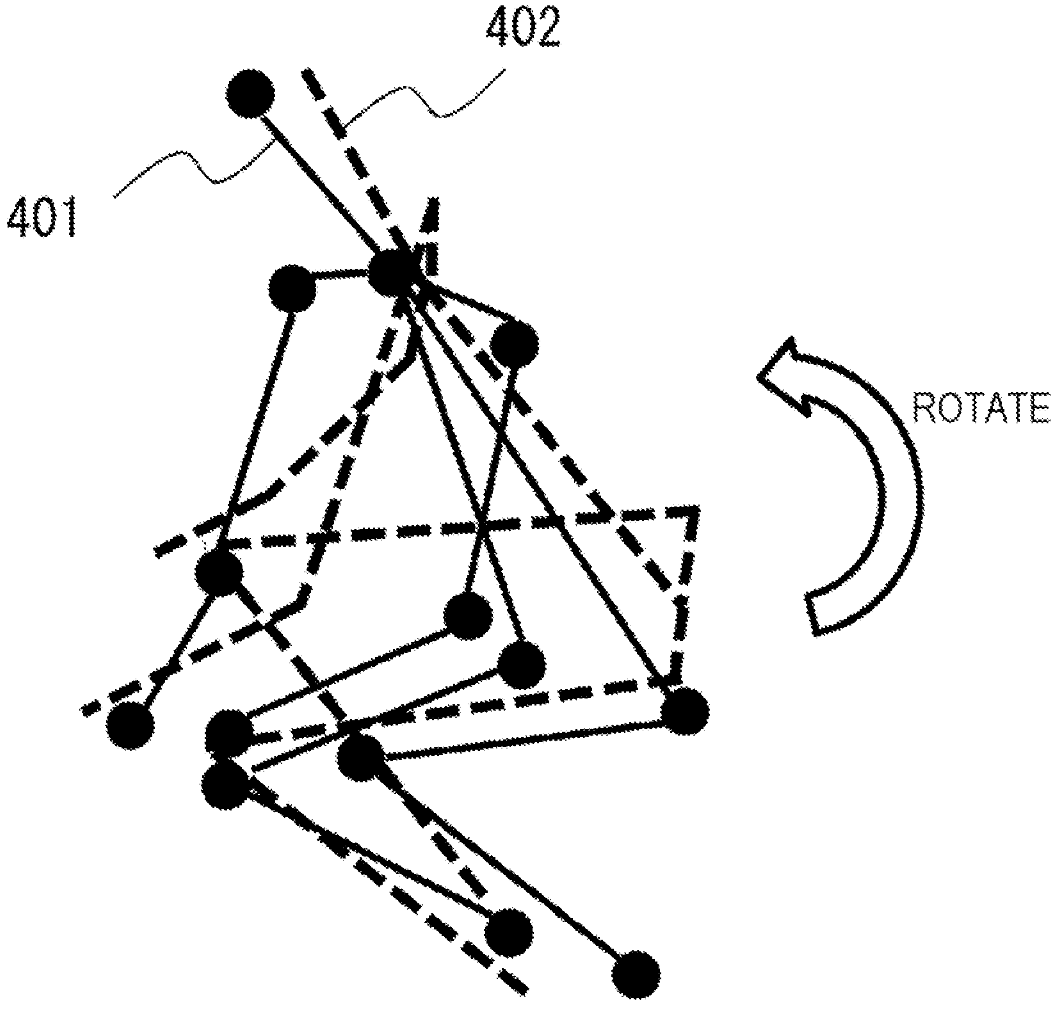
FIG. 34 is a diagram for describing the height pixel count computation method according to the example embodiment 2.

Subsequently, as illustrated in FIG. 22, the height computation unit 108 fits the three-dimensional human model to a two-dimensional skeleton structure (S233). As in FIG. 34, the height computation unit 108 deforms the three-dimensional human model 402 in such a way that poses of the three-dimensional human model 402 and the two-dimensional skeleton structure 401 match in a state where the three-dimensional human model 402 is superimposed on the two-dimensional skeleton structure 401. In other words, a height, an orientation of a body, and an angle of a joint of the three-dimensional human model 402 are adjusted, and optimization is performed in such a way as to eliminate a difference from the two-dimensional skeleton structure 401. For example, by rotating a joint of the three-dimensional human model 402 in a movable range of a person and also rotating the entire three-dimensional human model 402, the entire size is adjusted. Note that, fitting (application) between a three-dimensional human model and a two-dimensional skeleton structure is performed on a two-dimensional space (two-dimensional coordinates). In other words, a three-dimensional human model is mapped in the two-dimensional space, and the three-dimensional human model is optimized for a two-dimensional skeleton structure in consideration of a change of the deformed three-dimensional human model in the two-dimensional space (image).

Figure 35:
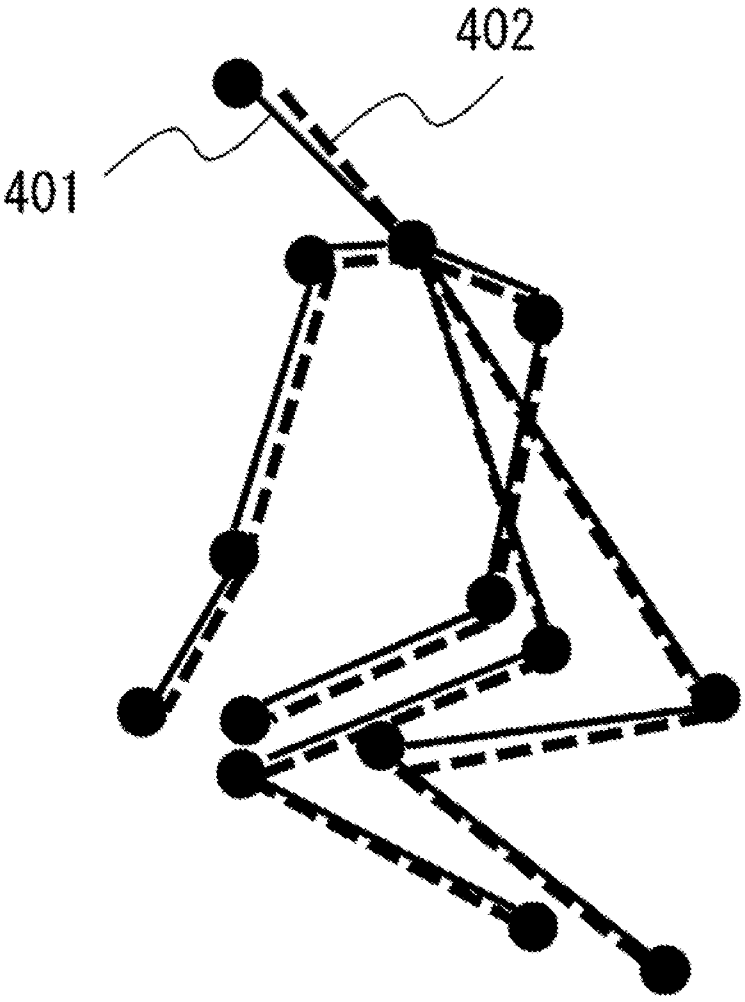
FIG. 35 is a diagram for describing the height pixel count computation method according to the example embodiment 2.

Subsequently, as illustrated in FIG. 22, the height computation unit 108 computes a height pixel count of the fit three-dimensional human model (S234). As in FIG. 35, when there is no difference between the three-dimensional human model 402 and the two-dimensional skeleton structure 401 and poses match, the height computation unit 108 acquires a height pixel count of the three-dimensional human model 402 in that state. With the optimized three-dimensional human model 402 in an upright state, a length of a whole body on the two-dimensional space is acquired based on a camera parameter. For example, a height pixel count is computed from lengths (pixel counts) of bones from a head to a foot when the three-dimensional human model 402 is upright. Similarly to the specific example 1, the lengths of the bones from the head to the foot of the three-dimensional human model 402 may be added up.

In the specific example 3, a height pixel count is acquired based on a three-dimensional human model by fitting the three-dimensional human model to a two-dimensional skeleton structure, based on a camera parameter, and thus the height pixel count can be accurately estimated even when all bones are not captured at the front, i.e., when an error is great due to all bones being captured on a slant.

<Normalization Processing> As illustrated in FIG. 19, the image processing apparatus 100 performs the normalization processing (S202) after the height pixel count computation processing. In the normalization processing, as illustrated in FIG. 23, the feature value computation unit 103 computes a keypoint height (S241). The feature value computation unit 103 computes a keypoint height (pixel count) of all keypoints included in the detected skeleton structure. The keypoint height is a length (pixel count) in the height direction from a lowest end (for example, a keypoint of any foot) of the skeleton structure to the keypoint. Herein, as one example, the keypoint height is acquired from a Y coordinate of the keypoint in an image. Note that, as described above, the keypoint height may be acquired from a length along a vertical projection axis based on a camera parameter. For example, in the example in FIG. 24, a height (yi) of a keypoint A2 of a neck is a value acquired by subtracting a Y coordinate of a keypoint A81 of a right foot or a keypoint A82 of a left foot from a Y coordinate of the keypoint A2.

Subsequently, the feature value computation unit 103 determines a reference point for normalization (S242). The reference point is a point being a reference for representing a relative height of a keypoint. The reference point may be preset, or may be able to be selected by a user. The reference point is preferably at the center of the skeleton structure or higher than the center (in an upper half of an image in the up-down direction), and, for example, coordinates of a keypoint of a neck are set as the reference point. Note that coordinates of a keypoint of a head or another portion instead of a neck may be set as the reference point. Instead of a keypoint, any coordinates (for example, center coordinates in the skeleton structure, and the like) may be set as the reference point.

Subsequently, the feature value computation unit 103 normalizes the keypoint height (yi) by the height pixel count (S243). The feature value computation unit 103 normalizes each keypoint by using the keypoint height of each keypoint, the reference point, and the height pixel count. Specifically, the feature value computation unit 103 normalizes, by the height pixel count, a relative height of a keypoint with respect to the reference point. Herein, as an example focusing only on the height direction, only a Y coordinate is extracted, and normalization is performed with the reference point as the keypoint of the neck. Specifically, with a Y coordinate of the reference point (keypoint of the neck) as (yc), a feature value (normalization value) is acquired by using the following equation (1). Note that, when a vertical projection axis based on a camera parameter is used, (yi) and (yc) are converted to values in a direction along the vertical projection axis.

[Mathematical 1]

$$f_i = (y_i - y_c)/h \tag{1}$$

For example, when 18 keypoints are present, 18 coordinates (x0, y0), (x1, y1), . . . and (x17, y17) of the keypoints are converted to 18-dimensional feature values as follows by using the equation (1) described above.

[Mathematical 2]

$$\begin{aligned} f_0 &= (y_0 - y_c)/h \\ f_1 &= (y_1 - y_c)/h \\ &\vdots \\ f_{17} &= (y_{17} - y_c)/h \end{aligned} \tag{2}$$

Figure 36:
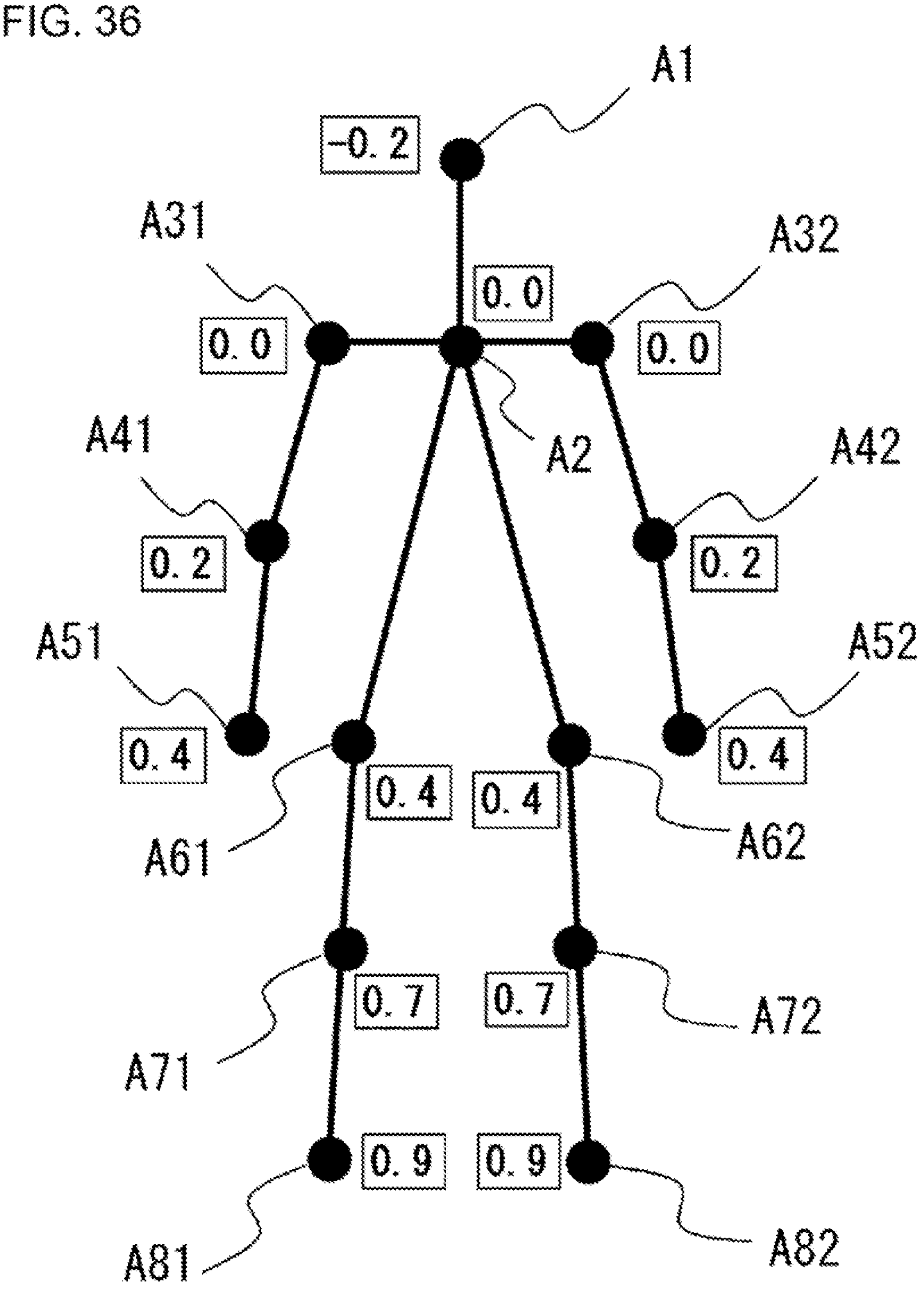
FIG. 36 is a diagram for describing the normalization method according to the example embodiment 2.
Figure 37:
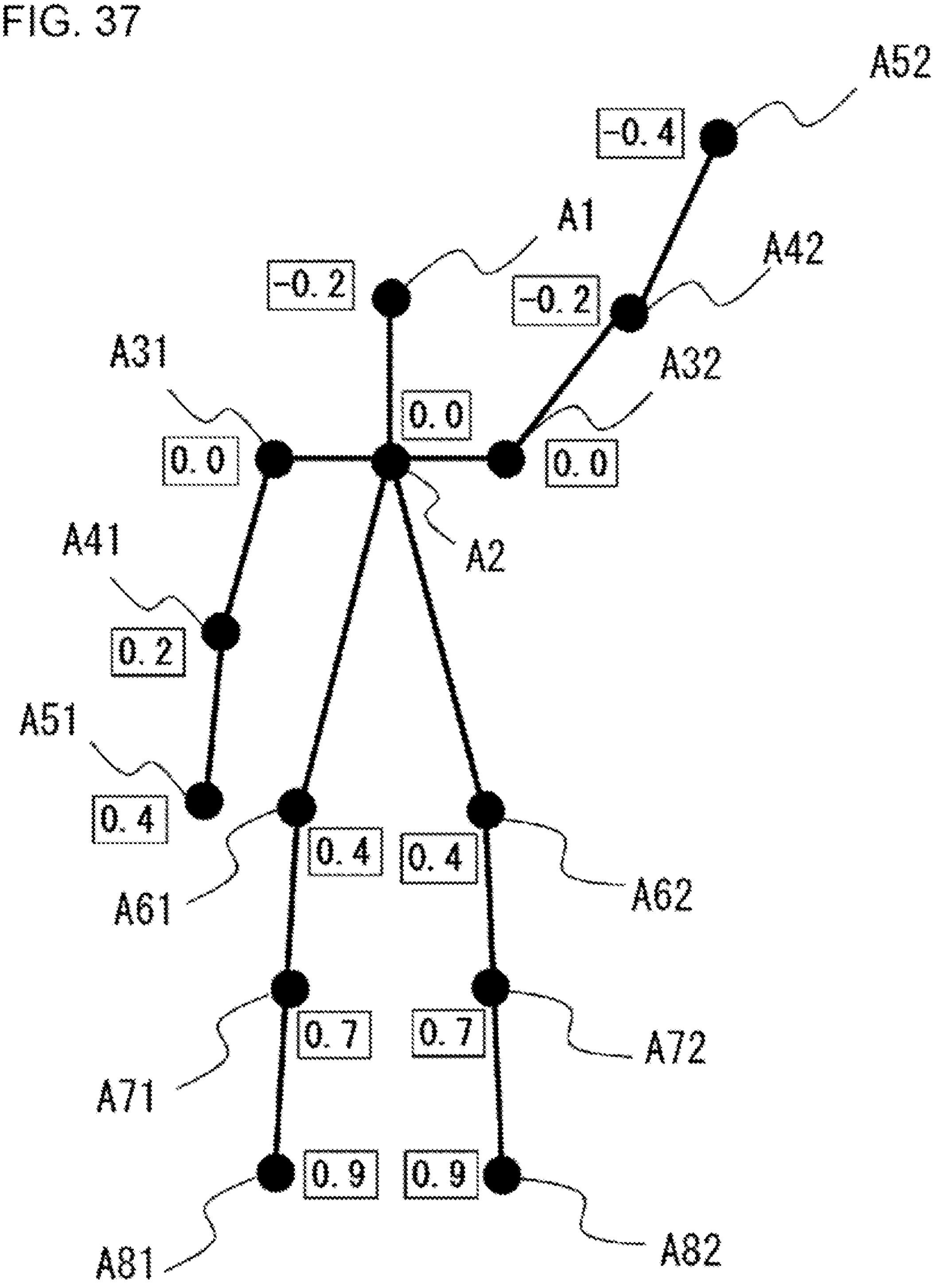
FIG. 37 is a diagram for describing the normalization method according to the example embodiment 2.
Figure 38:
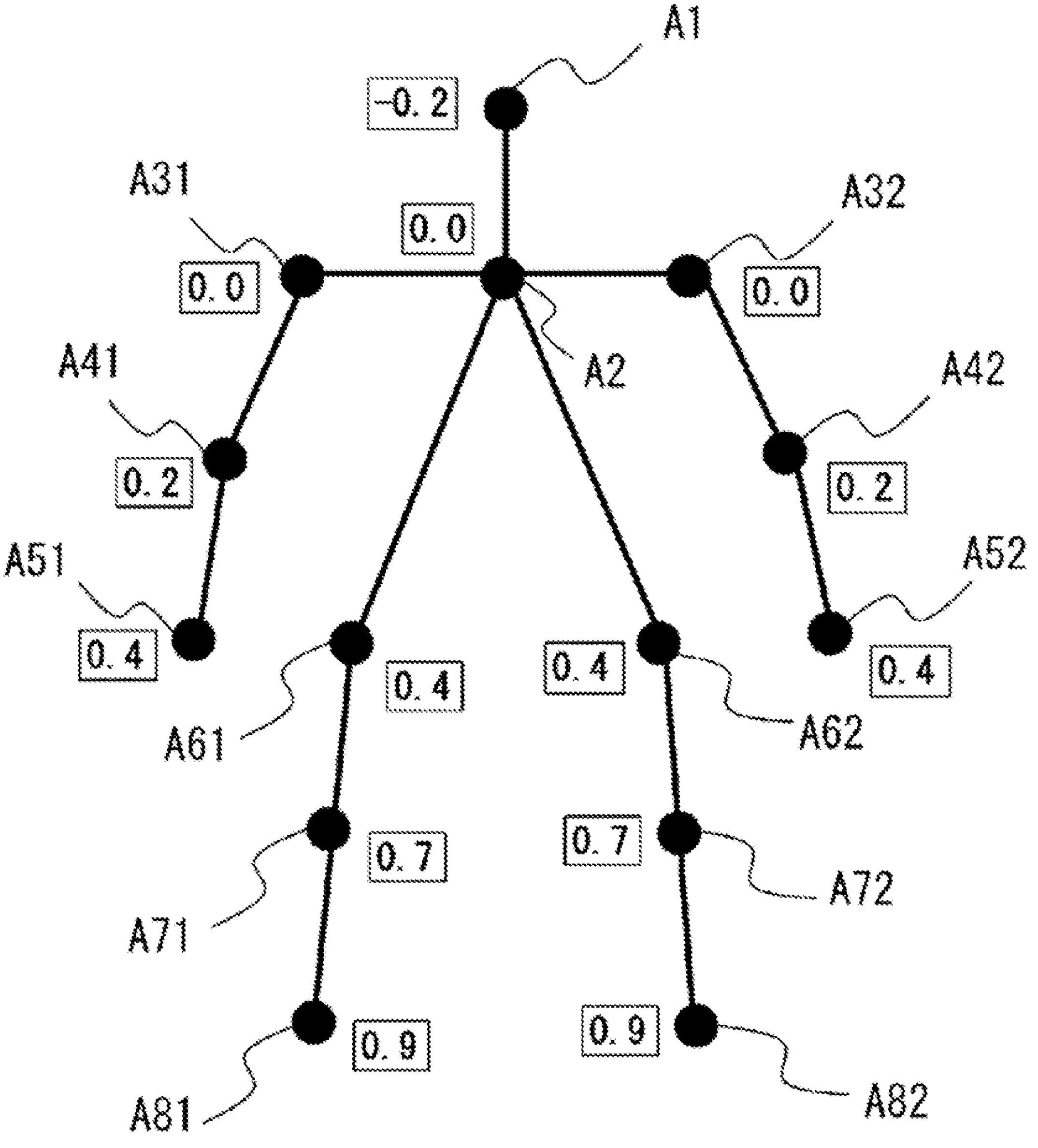
FIG. 38 is a diagram for describing the normalization method according to the example embodiment 2.

FIG. 36 illustrates an example of a feature value of each keypoint acquired by the feature value computation unit 103. In this example, since the keypoint A2 of the neck is the reference point, a feature value of the keypoint A2 is 0.0 and a feature value of a keypoint A31 of a right shoulder and a keypoint A32 of a left shoulder at the same height as the neck is also 0.0. A feature value of a keypoint A1 of a head higher than the neck is −0.2. Feature values of a keypoint A51 of a right hand and a keypoint A52 of a left hand lower than the neck are 0.4, and feature values of the keypoint A81 of the right foot and the keypoint A82 of the left foot are 0.9. When the person raises the left hand from this state, the left hand is higher than the reference point as in FIG. 37, and thus a feature value of the keypoint A52 of the left hand is −0.4. Meanwhile, since normalization is performed by using only a coordinate of the Y axis, as in FIG. 38, a feature value does not change as compared to FIG. 36 even when a width of the skeleton structure changes. In other words, a feature value (normalization value) according to the present example embodiment indicates a feature of a skeleton structure (keypoint) in the height direction (Y direction), and is not affected by a change of the skeleton structure in the horizontal direction (X direction).

As described above, in the present example embodiment, a skeleton structure of a person is detected from a two-dimensional image, and each keypoint of the skeleton structure is normalized by using a height pixel count (upright height on a two-dimensional image space) acquired from the detected skeleton structure. Robustness when classification, a search, and the like are performed can be improved by using the normalized feature value. In other words, since a feature value according to the present example embodiment is not affected by a change of a person in the horizontal direction as described above, robustness with respect to a change in orientation of the person and a body shape of the person is great.

Furthermore, the present example embodiment can be achieved by detecting a skeleton structure of a person by using a skeleton estimation technique such as Open Pose, and thus learning data that learn a pose and the like of a person do not need to be prepared. Further, classification and a search of a pose and the like of a person can be achieved by normalizing a keypoint of a skeleton structure and storing the keypoint in advance in a database, and thus classification and a search can also be performed on an unknown pose. Further, a clear and simple feature value can be acquired by normalizing a keypoint of a skeleton structure, and thus persuasion of a user for a processing result is high unlike a black box algorithm as in machine learning.

While the example embodiments of the present invention have been described with reference to the drawings, the example embodiments are only exemplification of the present invention, and various configurations other than the above-described example embodiments can also be employed.

Further, the plurality of steps (pieces of processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

A part or the whole of the above-described example embodiment may also be described in supplementary notes below, which is not limited thereto.

1. An image selection apparatus, including:
   - a query acquisition unit that acquires a plurality of pieces of query information that are information generated for each of a plurality of query images and indicate a feature of the query image;
   - a similar image selection unit that selects, by using the plurality of pieces of query information, a plurality of similar images whose degree of similarity to at least one of the query images satisfies a reference; and
   - a display control unit that displays the plurality of similar images on a display unit, and also sets a display position or a display order of each of the plurality of similar images on the display unit by using a number of the query images in which the similar image satisfies the reference.
2. The image selection apparatus according to supplementary note 1 described above, wherein
   - the display control unit displays, on the display unit, the plurality of similar images together with information that can determine a number of the query images in which the similar image satisfies the reference.
3. An image selection apparatus, including:
   - a query acquisition unit that acquires a plurality of pieces of query information that are information generated for each of a plurality of query images and indicate a feature of the query image;

a similar image selection unit that selects, by using the plurality of pieces of query information, a plurality of similar images whose degree of similarity to at least one of the query images satisfies a reference; and a display control unit that displays, on a display unit, the plurality of similar images together with information that can determine a number of the query images in which the similar image satisfies the reference or determine the query image.

4. An image selection apparatus, including:

a query acquisition unit that acquires a plurality of pieces of query information that are information generated for each of a plurality of query images and indicate a feature of the query image;

a similar image selection unit that selects, by using the plurality of pieces of query information, a similar image whose degree of similarity to a reference number or more of the query images satisfies a reference; and a display control unit that displays the similar image on a display unit.

5. The image selection apparatus according to any one of supplementary notes 1 to 4 described above, wherein the display control unit displays, on the display unit, each of the plurality of similar images together with the query image in which the similar image satisfies the reference.

6. The image selection apparatus according to any one of supplementary notes 1 to 5 described above, wherein the display control unit displays the plurality of query images on the display unit, and displays, when at least one of the similar images is selected, the query image in which the at least one of the similar images satisfies the reference on the display unit in an identifiable state from another of the query image.

7. The image selection apparatus according to any one of supplementary notes 1 to 6 described above, wherein the display control unit displays the plurality of query images on the display unit, and displays, when at least one of the query images is selected, the similar image whose degree of similarity to the selected query image satisfies a reference on the display unit in an identifiable state from another of the similar images.

8. The image selection apparatus according to any one of supplementary notes 1 to 7 described above, wherein the plurality of pieces of query information are similar to each other.

9. The image selection apparatus according to any one of supplementary notes 1 to 7 described above, wherein a type of a feature indicated by first query information is a type different from that of second query information.

10. The image selection apparatus according to supplementary note 9 described above, wherein the query information indicates a pose of a person included in the query image, and the first query information indicates a pose of a whole body of the person, and the second query information indicates a state of a specific portion of the body of the person.

11. An image selection method, including, executing by a computer:

query acquisition processing of acquiring a plurality of pieces of query information that are information generated for each of a plurality of query images and indicate a feature of the query image;

similar image selection processing of selecting, by using the plurality of pieces of query information, a plurality of similar images whose degree of similarity to at least one of the query images satisfies a reference; and display control processing of displaying the plurality of similar images on a display unit, and also setting a display position or a display order of each of the plurality of similar images on the display unit by using a number of the query images in which the similar image satisfies the reference.

12. The image selection method according to supplementary note 11 described above, further including, by the computer, in the display control processing, displaying, on the display unit, the plurality of similar images together with information that can determine a number of the query images in which the similar image satisfies the reference.

13. An image selection method, including, executing by a computer:

query acquisition processing of acquiring a plurality of pieces of query information that are information generated for each of a plurality of query images and indicate a feature of the query image;

similar image selection processing of selecting, by using the plurality of pieces of query information, a plurality of similar images whose degree of similarity to at least one of the query images satisfies a reference; and display control processing of displaying, on a display unit, the plurality of similar images together with information that can determine a number of the query images in which the similar image satisfies the reference or determine the query image.

14. An image selection method, including, by a computer:

query acquisition processing of acquiring a plurality of pieces of query information that are information generated for each of a plurality of query images and indicate a feature of the query image;

similar image selection processing of selecting, by using the plurality of pieces of query information, a similar image whose degree of similarity to a reference number or more of the query images satisfies a reference; and display control processing of displaying the similar image on a display unit.

15. The image selection method according to any one of supplementary notes 11 to 14 described above, further including, by the computer, in the display control processing, displaying, on the display unit, each of the plurality of similar images together with the query image in which the similar image satisfies the reference.

16. The image selection method according to any one of supplementary notes 11 to 15 described above, further including, by the computer:

in the display control processing, displaying the plurality of query images on the display unit; and displaying, when at least one of the similar images is selected, the query image in which the at least one of the similar images satisfies the reference on the display unit in an identifiable state from another of the query image.

17. The image selection method according to any one of supplementary notes 11 to 16 described above, further including, by the computer:

in the display control processing, displaying the plurality of query images on the display unit; and displaying, when at least one of the query images is selected, the similar image whose degree of similarity to the selected query image satisfies a reference on the display unit in an identifiable state from another of the similar image.

18. The image selection method according to any one of supplementary notes 11 to 17 described above, wherein the plurality of pieces of query information are similar to each other.

19. The image selection method according to any one of supplementary notes 11 to 17 described above, wherein a type of a feature indicated by first query information is a type different from that of second query information.

20. The image selection method according to supplementary note 19 described above, wherein the query information indicates a pose of a person included in the query image, and the first query information indicates a pose of a whole body of the person, and the second query information indicates a state of a specific portion of the body of the person.

21. A program causing a computer to include:

a query acquisition function of acquiring a plurality of pieces of query information that are information generated for each of a plurality of query images and indicate a feature of the query image;

a similar image selection function of selecting, by using the plurality of pieces of query information, a plurality of similar images whose degree of similarity to at least one of the query images satisfies a reference; and a display control function of displaying the plurality of similar images on a display unit, and also setting a display position or a display order of each of the plurality of similar images on the display unit by using a number of the query images in which the similar image satisfies the reference.

22. The program according to supplementary note 21 described above, wherein the display control function displays, on the display unit, the plurality of similar images together with information that can determine a number of the query images in which the similar image satisfies the reference.

23. A program causing a computer to include:

a query acquisition function of acquiring a plurality of pieces of query information that are information generated for each of a plurality of query images and indicate a feature of the query image;

a similar image selection function of selecting, by using the plurality of pieces of query information, a plurality of similar images whose degree of similarity to at least one of the query images satisfies a reference; and a display control function of displaying, on a display unit, the plurality of similar images together with information that can determine a number of the query images in which the similar image satisfies the reference or determine the query image.

24. A program causing a computer to include:

a query acquisition function of acquiring a plurality of pieces of query information that are information generated for each of a plurality of query images and indicate a feature of the query image;

a similar image selection function of selecting, by using the plurality of pieces of query information, a similar image whose degree of similarity to a reference number or more of the query images satisfies a reference; and a display control function of displaying the similar image on a display unit.

25. The program according to any one of supplementary notes 21 to 24 described above, wherein the display control function displays, on the display unit, each of the plurality of similar images together with the query image in which the similar image satisfies the reference.

26. The program according to any one of supplementary notes 21 to 25 described above, wherein the display control function displays the plurality of query images on the display unit, and displays, when at least one of the similar images is selected, the query image in which the at least one of the similar images satisfies the reference on the display unit in an identifiable state from another of the query image.

27. The program according to any one of supplementary notes 21 to 26 described above, wherein the display control function displays the plurality of query images on the display unit, and displays, when at least one of the query images is selected, the similar image whose degree of similarity to the selected query image satisfies a reference on the display unit in an identifiable state from another of the similar image.

28. The program according to any one of supplementary notes 21 to 27 described above, wherein the plurality of pieces of query information are similar to each other.

29. The program according to any one of supplementary notes 21 to 27 described above, wherein a type of a feature indicated by first query information is a type different from that of second query information.

30. The program according to supplementary note 29 described above, wherein the query information indicates a pose of a person included in the query image, and the first query information indicates a pose of a whole body of the person, and the second query information indicates a state of a specific portion of the body of the person.

REFERENCE SIGNS LIST

1 Image processing system
10 Image processing apparatus (image selection apparatus)
11 Skeleton detection unit
12 Feature value computation unit
13 Recognition unit
100 Image processing apparatus (image selection apparatus)
101 Image acquisition unit
102 Skeleton structure detection unit
103 Feature value computation unit
104 Classification unit
105 Search unit
106 Input unit

107 Display unit
108 Height computation unit
110 Database
200 Camera
300, 301 Human model
401 Two-dimensional skeleton structure
610 Query acquisition unit
620 Similar image selection unit
630 Display control unit

What is claimed is:

1. An image selection apparatus, comprising:
at least one memory storing instructions; and
at least one processor configured to execute the instructions to perform operations comprising:
outputting a display illustrating a plurality of candidate images clustered respectively into ones of a first cluster and one or more second clusters, the first cluster being determined as representing a first pose, and the one or more second clusters being determined as representing one or more second poses;
identifying a plurality of query images based on a user input that is to the display and is a selection of the cluster;
acquiring, based on computing a feature value of a detected skeleton structure of a person in a query image stored in a database, a plurality of pieces of query information that are information generated for each of the plurality of query images, from the query image, and indicate a feature of the query image;
searching for, from a plurality of images, a plurality of similar images whose degree of similarity to at least one of the query images satisfies a reference by computing a degree of similarity between a first feature value of a first skeleton structure included in the one or more of the plurality of pieces of query information of the first cluster of the selection by the user input, and a second feature value of a second skeleton structure included in the plurality of images;
displaying the plurality of similar images on a display, and also setting a display position or a display order of each of the plurality of similar images on the display by using a number of the query images in which the similar image satisfies the reference; and
displaying, on the display, the plurality of similar images together with information indicating respective counts of the query images in which the similar image satisfies the reference.

2. The image selection apparatus according to claim 1, wherein
the operations comprise displaying, on the display, each of the plurality of similar images together with the query image in which the similar images satisfy the reference.

3. The image selection apparatus according to claim 1, wherein
the operations comprise
displaying the plurality of query images on the display, and
displaying, when at least one of the similar images is selected, the query image in which the at least one of the similar images satisfies the reference on the display in an identifiable state from another of the query images.

4. The image selection apparatus according to claim 1, wherein
the operations comprise
displaying the plurality of query images on the display, and
displaying, when at least one of the query images is selected, the similar image whose degree of similarity to the selected query image satisfies a reference on the display in an identifiable state from another of the similar image.

5. The image selection apparatus according to claim 1, wherein
the plurality of pieces of query information are similar to each other.

6. The image selection apparatus according to claim 1, wherein
a type of a feature indicated by first query information is a type different from that of second query information.

7. The image selection apparatus according to claim 6, wherein
the query information indicates a pose of a person included in the query image, and
the first query information indicates a pose of a whole body of the person, and the second query information indicates a state of a specific portion of the body of the person.

8. An image selection method, comprising,
by a computer:
outputting a display illustrating a plurality of candidate images clustered respectively into ones of a first cluster and one or more second clusters, the first cluster being determined as representing a first pose, and the one or more second clusters being determined as representing one or more second poses;
identifying a plurality of query images based on a user input that is to the display and is a selection of the cluster;
acquiring, based on computing a feature value of a detected skeleton structure of a person in a query image stored in a database, a plurality of pieces of query information that are information generated for each of the plurality of query images, from the query image, and indicate a feature of the query image, and acquiring the plurality of pieces of query information comprises storing the feature value and the plurality of pieces of query information in the database;
searching for, from a plurality of images, a plurality of similar images whose degree of similarity to at least one of the query images satisfies a reference by computing a degree of similarity between a first feature value of a first skeleton structure included in the one or more of the plurality of pieces of query information of the first cluster of the selection by the user input, and a second feature value of a second skeleton structure included in the plurality of images;
displaying the plurality of similar images on a display, and also setting a display position or a display order of each of the plurality of similar images on the display by using a number of the query images in which the similar image satisfies the reference; and
displaying, on the display, the plurality of similar images together with information indicating respective counts of the query images in which the similar image satisfies the reference.

9. A non-transitory computer-readable medium storing a program causing a computer to perform the image selection method according to claim 8.

10. The image selection apparatus according to claim 1, wherein acquiring the plurality of pieces of query information comprises acquiring the query image from a camera and acquiring the plurality of pieces of query information based on the plurality of query images being identified based on the query image from the camera, and wherein searching for the plurality of similar images comprises obtaining the plurality of similar images as a result of an image search query input of the first cluster of the selection by the user input.

11. The image selection apparatus according to claim 1, wherein the first cluster is obtained based on determining that the one or more of the plurality of pieces of query information and ones of the plurality of images of the first cluster share the first pose, wherein the one or more second clusters is obtained based on determining that the others the plurality of pieces of query information and others of the plurality of images of the one or more second clusters share the one or more second poses.

12. An image selection method, comprising:

controlling a display to display a plurality of candidate images on a first display window, the plurality of candidate images being a part of all images stored in a database in association with respective pieces of first feature information indicating a feature of a corresponding image;

extracting, from among the displayed plurality of candidate images, a plurality of query images based on a user input;

generating second feature information indicating a feature of the extracted plurality of query images;

selecting, from among the images stored in the database, a plurality of similar images satisfying a predetermined reference related to the plurality of query images, based on a relationship between the first feature information and the second feature information;

controlling the display to display the plurality of similar images on a second display window, the second display window being different from the first display window; and setting a display position or a display order of each of the plurality of similar images on the second display window based on the relationship between the first feature information and the second feature information.

* * * * *